United States Patent [19]

Naoi et al.

[11] Patent Number: 5,907,630

[45] Date of Patent: *May 25, 1999

[54] IMAGE EXTRACTION SYSTEM

[75] Inventors: Satoshi Naoi; Atsuko Asakawa; Maki Yabuki; Yoshinobu Hotta, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/697,501

[22] Filed: Aug. 26, 1996

Related U.S. Application Data

[63] Continuation of application No. 08/271,495, Jul. 7, 1994, abandoned.

[30] Foreign Application Priority Data

Jul. 7, 1993 [JP] Japan .................. 5-168253

[51] Int. Cl.[6] .................................................... G06K 9/34
[52] U.S. Cl. .......................... 382/173; 382/177; 382/178
[58] Field of Search ................................ 382/173, 317, 382/100, 199, 204, 193, 176, 177, 178, 190, 185, 229, 268; 348/126

[56] References Cited

U.S. PATENT DOCUMENTS

| | | |
|---|---|---|
| 4,850,095 | 7/1989 | Abe .................................... 382/177 |
| 5,033,104 | 7/1991 | Amano ................................ 382/177 |
| 5,129,012 | 7/1992 | Abe ................................... 382/204 |
| 5,138,668 | 8/1992 | Abe ................................... 382/177 |
| 5,235,653 | 8/1993 | Nakano et al. ........................ 382/61 |
| 5,253,305 | 10/1993 | Lin ................................... 382/185 |
| 5,384,864 | 1/1995 | Spitz .................................. 382/177 |

*Primary Examiner*—Jose L. Couso
*Assistant Examiner*—Anh Hong Do
*Attorney, Agent, or Firm*—Staas & Halsey

[57] ABSTRACT

An image extraction system includes a connected pattern extracting part for extracting partial patterns respectively having connected pixels from an image which is formed by a block frame having a table format and including one-character frames or a free format frame, characters, graphics or symbols, a one-character frame extracting part for extracting one-character frames from the image based on the partial patterns extracted by the connected pattern extracting part, a straight line extracting part for extracting straight lines from the partial patterns which are extracted by the connected pattern extracting part and is eliminated of the one-character frames by the one-character frame extracting part, a frame detecting part for detecting straight lines forming the frame from the straight lines extracted by the straight line extracting part, and a frame separating part for separating the straight lines detected by the frame detecting part from the partial patterns so as to extract the characters, graphics or symbols.

31 Claims, 85 Drawing Sheets

FIG. 6

| ROW NUMBER | | PROJECTION VALUE | ADJACENT PROJECTION VALUE |
|---|---|---|---|
| i−1 | ▨▨▨▨▨▨▨▨ | p(i−1) | P(i)= |
| i | ▨▨▨▨▨▨ | p(i) | |
| i+1 | ▨▨▨▨▨▨ | p(i+1) | p(i−1)+p(i)+p(i+1) |

EXTRACTED FRAME

ORIGINAL PATTERN

FIG. 18A

FRAME ELIMINATION

FIG. 18B

AFTER ASSOCIATING PROCESS

BLOCK FRAME WITH        BLOCK FRAME WITH         FREE FORMAT FRAME
REGULAR TABLE FORMAT    IRREGULAR TABLE FORMAT

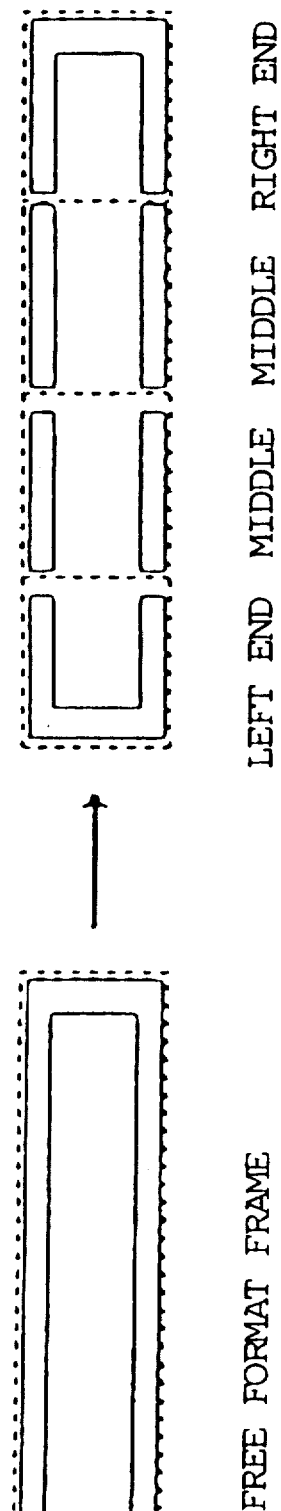
FIG. 22A
FREE FORMAT FRAME
FIG. 22B
LEFT END  MIDDLE  MIDDLE  RIGHT END
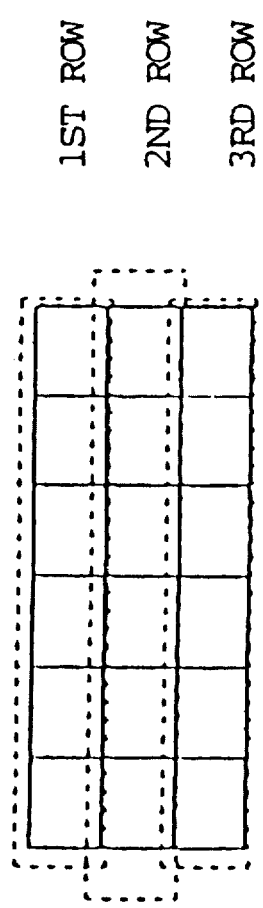
FIG. 23
1ST ROW
2ND ROW
3RD ROW 1 2 3 4 5 6 7 8 9 0 1 2 5 7
3 1 9 3 0 2 2 4 1 1 2 7 6
2 8 6 6 1 8 3 2 4 6 8 9 0 1

1 2 3 4 5 6 7 8 9 0 1 2 3 4 5
1 3 5 7 9 0 2 4 1 2 3 4 5

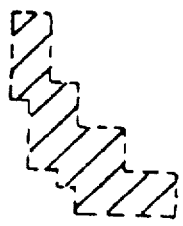
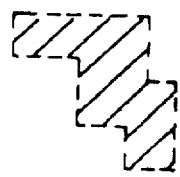
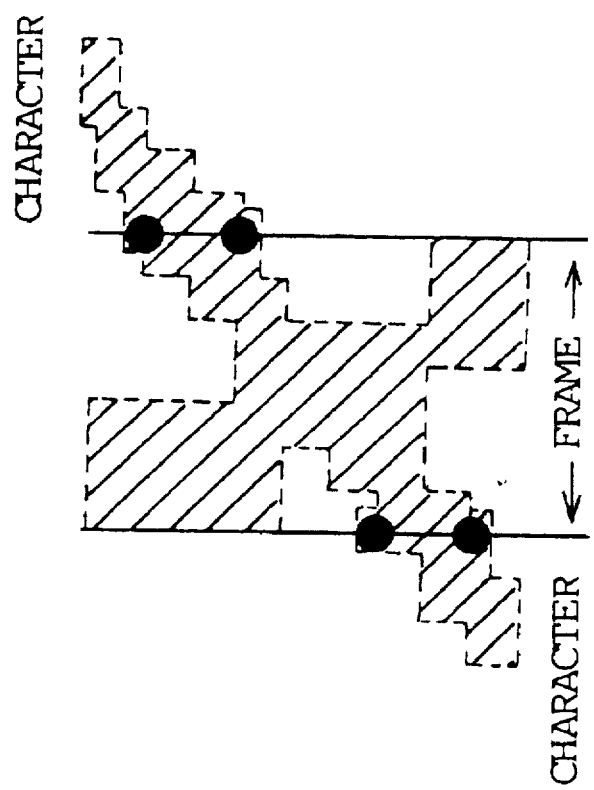
FIG. 35B
FIG. 35A

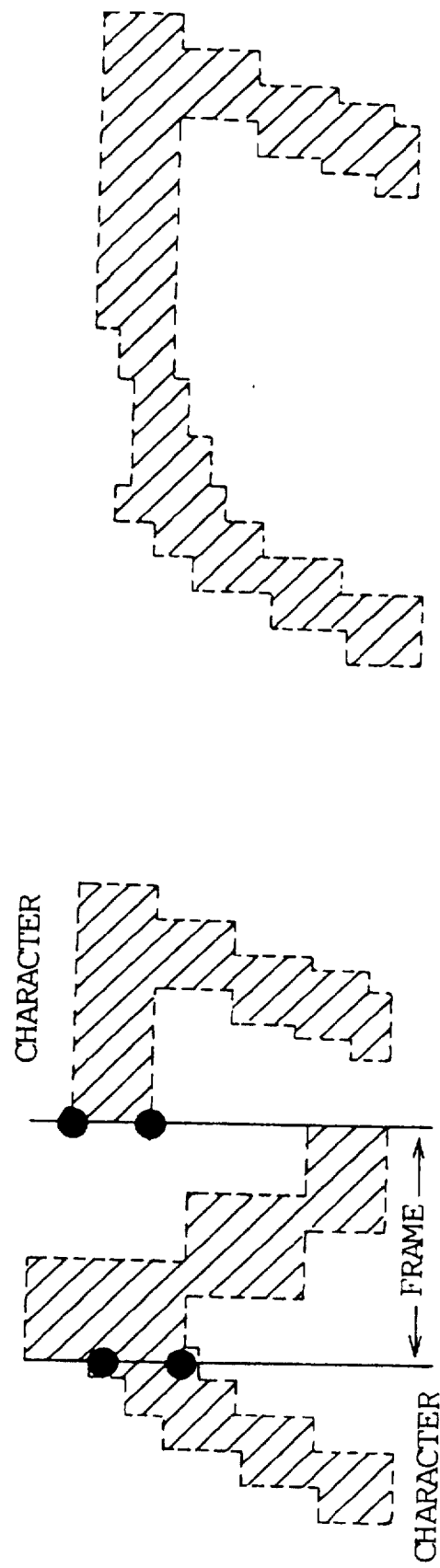

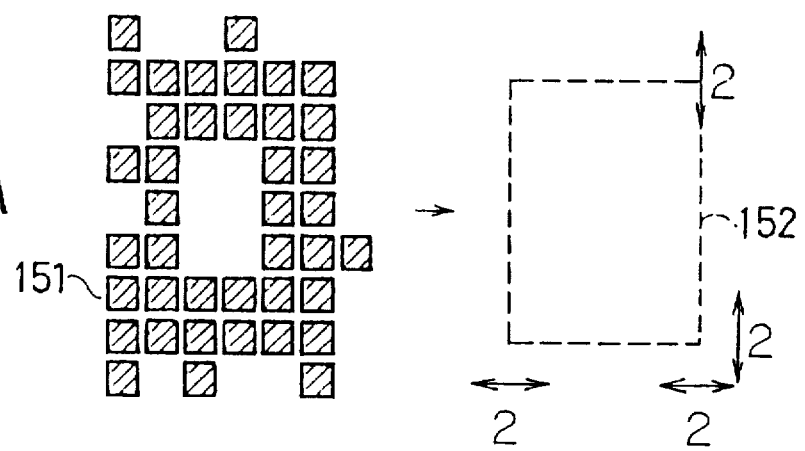
FIG. 49A
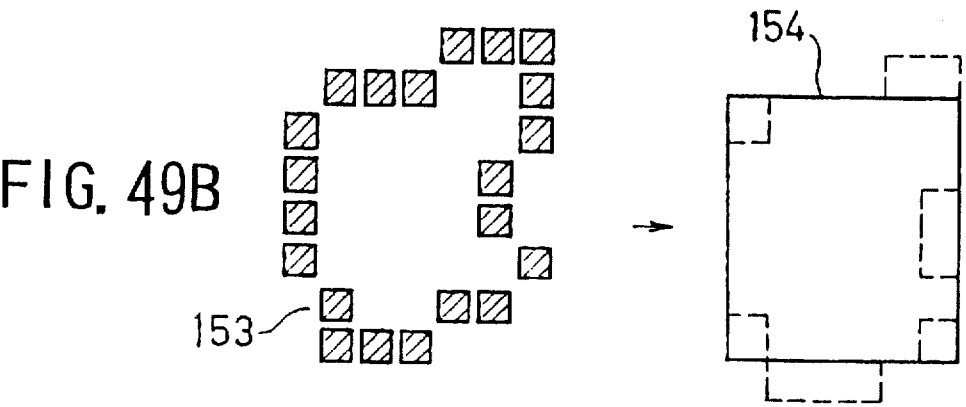
FIG. 49B
FIG. 50

NUMBER OF CONNECTED
COMPONENTS = 1
NUMBER OF HOLES = 1
EULER NUMBER = 0

NUMBER OF CONNECTED
COMPONENTS = 1
NUMBER OF HOLES = 0
EULER NUMBER = 1

NUMBER OF CONNECTED
COMPONENTS = 1
NUMBER OF HOLES = 1
EULER NUMBER = 0

FIG. 90A    FIG. 90B
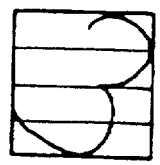 LINE DENSITY = 1
LINE DENSITY = 2    LINE DENSITY = 2 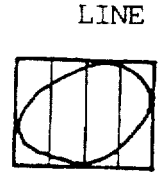
FIG. 91
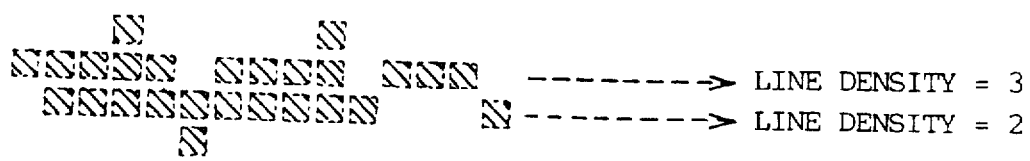 ------> LINE DENSITY = 3
------> LINE DENSITY = 2
FIG. 92A    FIG. 92B    FIG. 92C
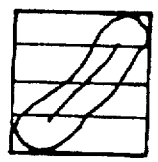        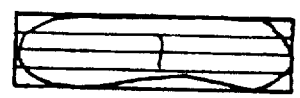

FIG. 95
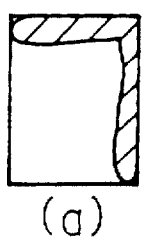
(a)
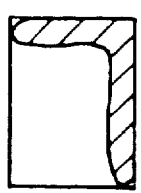 V. LINE DENSITY = 1
H. LINE DENSITY = 1
(b)
 V. LINE DENSITY = 1
H. LINE DENSITY = 1
(d)
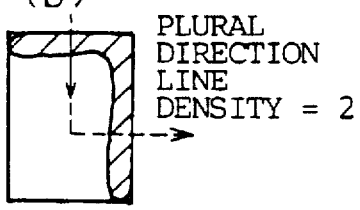 PLURAL DIRECTION LINE DENSITY = 2
(c)
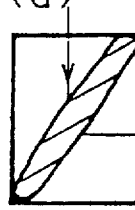 PLURAL DIRECTION LINE DENSITY = 1
(e)
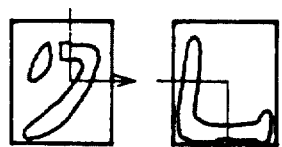
(f)   (g)   (h)

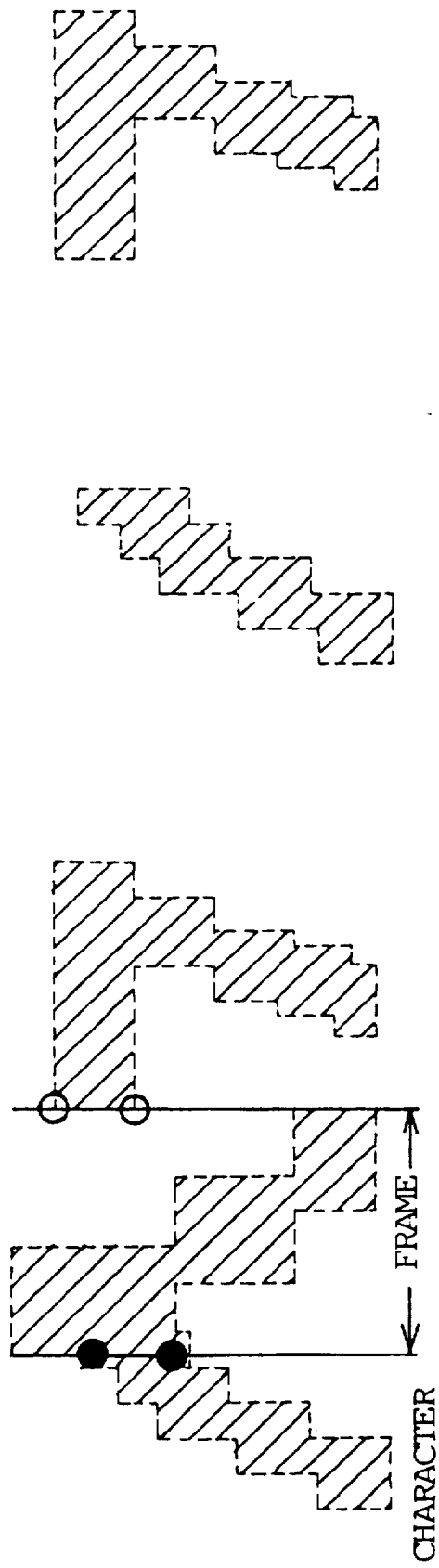

IMAGE EXTRACTION SYSTEM

This application is a continuation of application Ser. No. 08/271,495, filed Jul. 7, 1994, now abandoned.

BACKGROUND OF THE INVENTION

The present invention generally relates to image extraction systems, and more particularly to an image extraction system for extracting characters, graphics and the like which touch a character frame, a rule and the like in a hand-written character recognition apparatus such as an optical character reader (OCR).

As more input/output devices are designed for hand-written characters, the demands for hand-written character recognition apparatuses are increasing. In order to achieve a high recognition rate of individual characters in a hand-written character recognition apparatus, it is important that the process of extracting the character is carried out accurately prior to the recognition stage.

As many kinds of document are the subject of character recognition, there are documents such as form sheets which specify the positions where characters should be written. In such documents, a frame or the like which specifies the position where the character should be written is printed not in faded color, but in the same color and density as the character. That is, a black frame, a black rule or the like is printed on such a document. Accordingly, if characters are clearly written within specified ranges, it is possible to automatically recognize characters at a relatively high recognition rate. However, if the hand-written character exceeds the specified range and touches or penetrates the frame or rule which indicates the specified range, there was a problem in that the recognition rate greatly deteriorates.

FIG. 1 shows an image extraction system previously proposed in a U.S. patent application Ser. No. 192,592 filed Feb. 7, 1994. An input pattern to be subjected to the processing is a binary image that is already subjected to a preparation such as correcting extreme inclination or rotation (that is, skew), noise elimination and filling of gaps introduced by grazing or the like. In other words, with regard to the character frame, a plurality of block frames which are elongated in the horizontal direction are arranged, and the size, position and inclination of the block frames are unknown. Hand-written characters are written in such block frames, and only the block frame is eliminated even if the character touches the block frame or the character projects out from the block frame.

As shown in FIG. 1, the image extraction system includes a connected pattern extracting part 40, a line segment detector 41, a straight line detector 42, a frame detector 43, and a frame separating part 44. The connected pattern extracting part 40 extracts a partial pattern having pixels which are connected from the input pattern which is formed by the straight line portion such as the frame and rule and the character, graphic or symbol. The line segment detector 41 detects the line segment or a portion of the straight line at a predetermined length for every connected pattern using "adjacent projection". The "adjacent projection" will be described later. The straight line detector 42 detects a long straight line by integrating a plurality of line segments or portions of the straight line which are obtained. The frame detector 43 detects the straight line forming the character frame based on the intervals or the like of the plurality of straight lines which are obtained. The frame separating part 44 divides the block frame into frames of one character (that is, 1-character frames) based on the intersection of the frames to calculate the width of each frame, and separates the character frame from the connected pattern depending on the width.

On the other hand, if the frame to be eliminated from the input pattern which is to be subjected to the processing is of a kind other than the block frame described above, there are other frame extraction methods such as those proposed in Japanese Laid-Open Patent Applications No. 62-212888 and No. 3-126186. According to such frame extraction methods, format information related to information such as the position and size, and information related to the inclination are input in advance and prestored in the form or form data. The frame is eliminated based on the prestored information.

However, the previously proposed image extraction system shown in FIG. 1 has the following problems and there is still room for further improvement. First, if the frame is other than the 1-character frames or the block frames arranged in the horizontal row, that is, in the case of a block frame having a table format or a free format frame, the frame extraction process could not be carried out. Second, since the straight line detector 42 includes a thinning part and carries out a thinning process, the processing time was extremely long. In addition, when the thinning process is carried out, the linearity of the original image was lost. As a result, an original image shown in FIG. 2A, for example, became as shown in FIG. 2B after the thinning process, and it was difficult to extract the frame from the thinned image shown in FIG. 2B. Third, when one character connects to a plurality of adjacent 1-character frames and a discontinuity of the straight line is found during a search, the subsequent processes were not carried out by regarding that the frame is neither a block frame nor a 1-character frame. Fourth, because the frame extraction is made by the search when eliminating the 1-character frame, the frame extraction could not be made if the search failed.

The fourth problem described above will be described in more detail, by referring to an example shown in FIG. 3. When the search is started from a starting point A in FIG. 3, the search for the partial pattern is made from the top to bottom, and from the left to right by a predetermined number of pixels corresponding to the width of the frame, for example, if the search cannot be made in the downward direction. Hence, the search is made satisfactorily as indicated by an arrow in FIG. 3. However, if the search is started from a starting point B in FIG. 3, the search for the partial pattern cannot advance in the downward direction. In addition, even if the search advances from the left to right by the predetermined number of pixels, no partial pattern exists in the downward direction. As a result, the search started from the starting point B will fail as indicated by an arrow in FIG. 3. Therefore, in the latter case where the search is started from the starting point B, it is impossible to extract the frame.

On the other hand, according to the frame extraction methods proposed in the Japanese Laid-Open Patent Applications No. 62-212888 and No. 3-126186, it is possible to extract the frame even if the frame to be subjected to the processing is the block frame or the like having the table format. However, the format information related to the position, size and the like and the information related to the inclination must be input and stored in advance in the form of the form data. For this reason, there was a fifth problem in that the process is easily affected by even the slight inclination or unevenness of the character frame itself. In other words, there were cases where the character frame projecting from a predetermined position is regarded as a character and not extracted during the character extraction or, on the contrary, the character portion is extracted as the frame. Furthermore, it takes an extremely long time for a user to input all of the information related to each of the frames, and there was a problem in that the load on the user is extremely large.

SUMMARY OF THE INVENTION

Accordingly, it is a general object of the present invention to provide a novel and useful image extraction system in which the problems described above are eliminated.

Another and more specific object of the present invention is to provide an image extraction system which accurately extracts a straight line portion such as a frame and rule from characters, graphics, symbols and the like touching the straight line portion such as the frame and rule, so that the characters, graphics, symbols and the like can be accurately extracted, and the characters, graphics, symbols and the like touching the straight line portion such as the frame and rule can be restored with a high quality. According to the image extraction system of the present invention, it is possible to greatly improve the recognition rate of a character recognition apparatus and the like.

Still another object of the present invention is to provide an image extraction system comprising connected pattern extracting means for extracting partial patterns respectively having connected pixels from an image which is formed by a block frame having a table format and including 1-character frames or a free format frame, characters, graphics or symbols, 1-character frame extracting means for extracting 1-character frames from the image based on the partial patterns extracted by the connected pattern extracting means, straight line extracting means for extracting straight lines from the partial patterns which are extracted by the connected pattern extracting means and is eliminated of the 1-character frames by the 1-character frame extracting means, frame detecting means for detecting straight lines forming the frame from the straight lines extracted by the straight line extracting means, and frame separating means for separating the straight lines detected by the frame detecting means from the partial patterns so as to extract the characters, graphics or symbols, where the straight line extracting means comprises means for scanning an entire image of the partial patterns eliminated of the 1-character frames within two kinds of masks which are respectively elongated in horizontal and vertical directions, for each of the partial patterns extracted by the connected pattern extracting means and eliminated of the 1-character frames by the 1-character frame extracting means, means for calculating a rate of an area occupied by the pattern within the mask, and means for extracting vertical and horizontal components by judging that inside of the mask in its entirety is a pattern when the calculated rate is greater than a predetermined value and deleting the pattern within the mask when the calculated ratio is less than or equal to the predetermined value. According to the image extraction system of the present invention, the linearity of the original image will not be lost because the mask process is carried out, and it is possible to detect the line segment in a relatively short processing time.

A further object of the present invention is to provide an image extraction system comprising connected pattern extracting means for extracting partial patterns respectively having connected pixels from an image which is formed by a block frame having a table format and including 1-character frames or a free format frame, characters, graphics or symbols, 1-character frame extracting means for extracting 1-character frames from the image based on the partial patterns extracted by the connected pattern extracting means, straight line extracting means for extracting straight lines from the partial patterns which are extracted by the connected pattern extracting means and is eliminated of the 1-character frames by the 1-character frame extracting means, frame detecting means for detecting straight lines forming the frame from the straight lines extracted by the straight line extracting means, and frame separating means for separating the straight lines detected by the frame detecting means from the partial patterns so as to extract the characters, graphics or symbols, where the frame detecting means comprises means for detecting as a horizontal frame portion a candidate of a straight line which forms a horizontal frame portion detected by the straight line detecting means and has a length greater than or equal to a predetermined value, and means for detecting, based on the detected horizontal frame portion, a block frame of one horizontal line or a free format frame when two adjacent horizontal frame portions exist and a block frame having a table format when three or more horizontal frame portions exist. According to the image extraction system of the present invention, it is possible to extract the block frame having the table format and the free format frame without requiring the format information.

Another object of the present invention is to provide an image extraction system comprising connected pattern extracting means for extracting partial patterns respectively having connected pixels from an image which is formed by a block frame having a table format and including 1-character frames or a free format frame, characters, graphics or symbols, 1-character frame extracting means for extracting 1-character frames from the image based on the partial patterns extracted by the connected pattern extracting means, straight line extracting means for extracting straight lines from the partial patterns which are extracted by the connected pattern extracting means and is eliminated of the 1-character frames by the 1-character frame extracting means, frame detecting means for detecting straight lines forming the frame from the straight lines extracted by the straight line extracting means, frame separating means for separating the straight lines detected by the frame detecting means from the partial patterns so as to extract the characters, graphics or symbols, and frame extraction and elimination means for carrying out a frame extraction and elimination process with respect to a partial pattern for which the detection of the horizontal frame portion failed in the straight line extracting means. According to the image extraction system of the present invention, it is possible to extract the 1-character range and to extract the frame by carrying out a matching even if a break in the straight line is detected and the process ends.

Still another object of the present invention is to provide an image extraction system comprising connected pattern extracting means for extracting partial patterns respectively having connected pixels from an image which is formed by a block frame having a table format and including 1-character frames or a free format frame, characters, graphics or symbols, 1-character frame extracting means for extracting 1-character frames from the image based on the partial patterns extracted by the connected pattern extracting means, straight line extracting means for extracting straight lines from the partial patterns which are extracted by the connected pattern extracting means and is eliminated of the 1-character frames by the 1-character frame extracting means, frame detecting means for detecting straight lines forming the frame from the straight lines extracted by the straight line extracting means, and frame separating means for separating the straight lines detected by the frame detecting means from the partial patterns so as to extract the characters, graphics or symbols, where the straight line extracting means comprises means for starting a search of a line segment for detecting the straight lines from the partial patterns from a starting point located at a narrowest portion within a rectangular line segment that is detected as the frame. According to the image extraction system of the present invention, it is possible to improve the success rate of the search for the line segment.

A further object of the present invention is to provide an image extraction system for extracting a frame from an image which is formed by a rectangular frame having separated rectangles, characters, graphics or symbols, comprising connected pattern extracting means for extracting partial patterns respectively having connected pixels from patterns forming the image, frame extracting means for extracting the frame based on each partial pattern extracted by the connected pattern extracting means, intersection calculating means for calculating intersections of a character and a frame based on the partial pattern extracted by the connected pattern extracting means and the frame extracted by the frame extracting means, intersection associating means for associating the intersections based on a distance between character line segments containing the frame inbetween and a continuity of an inclination of the character line segments, by adaptively changing a judging reference of the distance and the continuity of the inclination depending on a line width of the frame, and frame interior character extracting means for extracting character line segments inside the frame based on the intersections associated by the intersection associating means. According to the image extraction system of the present invention, it is possible to accurately associate the intersections and to improve the precision of the character extraction, even if the frame width is greater than the character width of the character touching the frame or the frame is inclined.

Other objects and further features of the present invention will be apparent from the following detailed description when read in conjunction with the accompanying drawings.

BRIEF DESCRIPTION OF THE DRAWINGS

FIG. 6 is a diagram for explaining an adjacent projection;

FIGS. 18A and 18B respectively are diagrams for explaining character extraction and interpolation;

FIG. 22 is a diagram for explaining division of a free format frame;

FIG. 23 is a diagram for explaining an overlap of block frames having a table format;

FIGS. 34A and 33B respectively are diagrams for explaining a process for a case where the frame is inclined;

FIGS. 35A and 35B respectively are diagrams for explaining a process for a case where a numeral "1" is separated to the right and left and an association is not possible;

FIGS. 36A and 36B respectively are diagrams for explaining an example where numerals "1" and "7" are erroneously associated;

FIGS. 49A and 49B respectively are diagrams for explaining a frame having a large line width and a frame having a small line width;

FIG. 50 is a diagram for explaining a method of searching the frame in the second embodiment;

FIG. 55 is a diagram showing a coordinate system used in a side width calculator 24a;

FIG. 57 is a flow chart for explaining a process of an intersection calculator 25a;

FIG. 74 is a flow chart for explaining a process of a simple interpolator 32a;

FIGS. 90A and 90B respectively are diagrams for explaining a method of calculating the line density;

FIG. 91 is a diagram for explaining a failed example for a case where the line density in the horizontal direction is calculated with respect to a stroke which is elongated in the horizontal direction;

FIGS. 92A, 92B and 92C respectively are diagrams for explaining a method of calculating the inclination;

FIG. 95 is a diagram having parts (a) through (h) for explaining a method of calculating the line density in plural directions;

FIGS. 97A and 97B respectively are diagrams for explaining results obtained when the second embodiment is applied to the case shown in FIGS. 36A and 36B;

DESCRIPTION OF THE PREFERRED EMBODIMENTS

Figure 4:
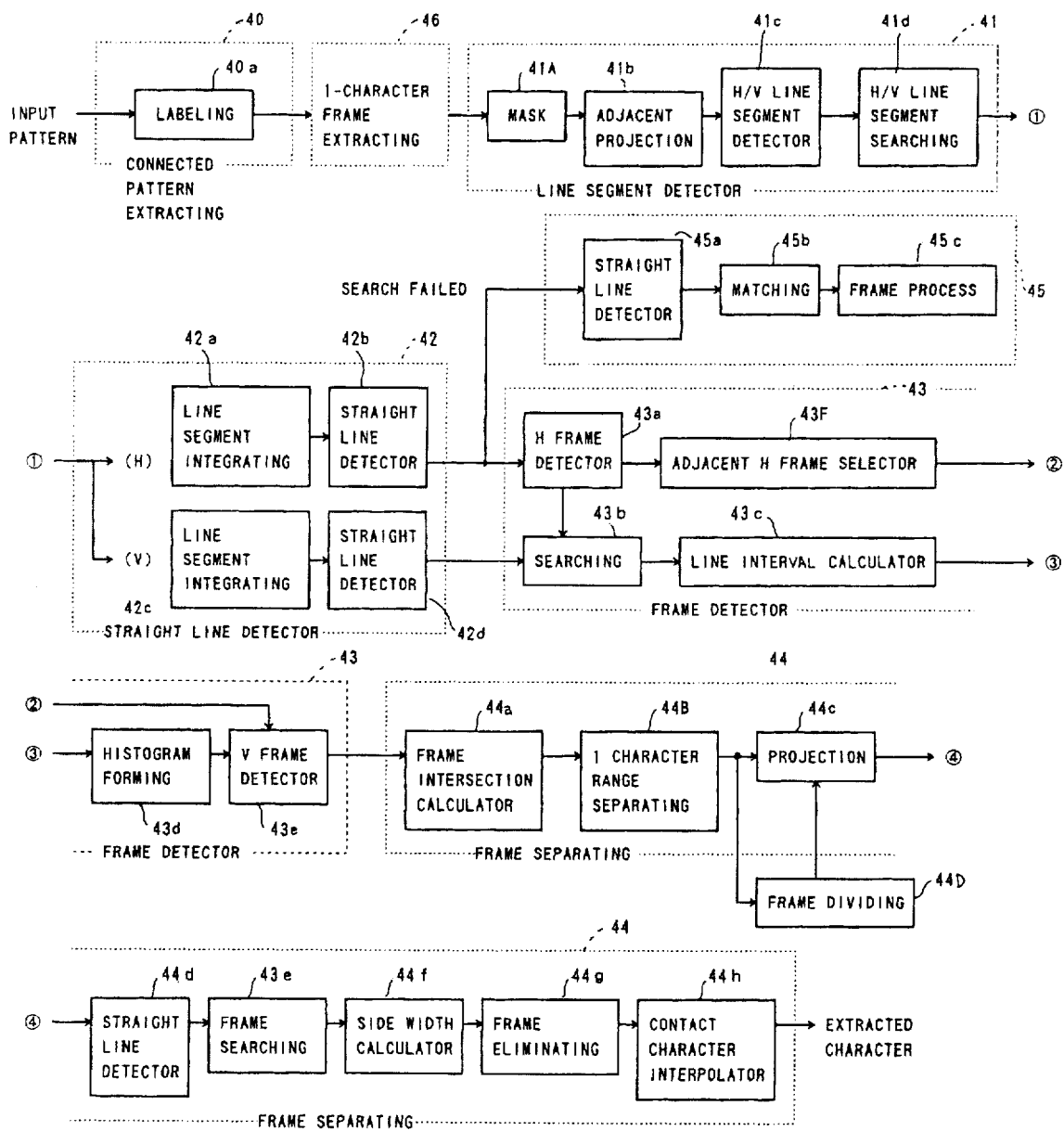
FIG. 4 is a system block diagram showing a first embodiment of an image extraction system according to the present invention.

FIG. 4 shows a first embodiment of an image extraction system according to the present invention. It is assumed in this embodiment that an input pattern to be processed is a binary image which is already subjected to a preparation such as correction of an extremely large inclination or rotation, elimination of noise, filling of gaps formed by grazing and the like. In addition, it is assumed for the sake of convenience that this embodiment eliminates a black frame from a form sheet having the black frame. In other words, the size, position and inclination of the frames are unknown, and hand-written characters are written in such frames, and only the frame is eliminated even if the character touches the frame or the character projects out from the frame. Hence, the frames to be subjected to the processing include a block frame shown in FIG. 21A having a regular format, a block frame shown in FIG. 21B having an irregular format, and a frame shown in FIG. 21C having a free format.

In this embodiment, the image extraction system includes a connected pattern extracting part 40, a 1-character frame extracting part 46, a line segment detector 41, a straight line detector 42, a frame detector 43, a frame separating part 44, and a frame extraction and elimination part 45 as shown in FIG. 4. The connected pattern extracting part 40 extracts a partial pattern having pixels which are connected from the input pattern which is formed by the straight line portion such as the frame and rule and the character, graphic or symbol. The 1-character frame extracting part 46 extracts a 1-character frame from the partial pattern. The line segment detector 41 detects a line segment or a portion of a straight line at a predetermined length for every connected pattern using "adjacent projection", with respect to the pattern which is eliminated of the 1-character frame. The "adjacent projection" will be described later. The straight line detector 42 detects a long straight line by integrating a plurality of line segments or portions of the straight line which are obtained. The frame detector 43 detects the straight line forming the character frame based on the intervals or the like of the plurality of straight lines which are obtained. The frame separating part 44 divides the block frame into frames of one character (1-character frames) based on the intersection of the frames to calculate the width of each frame, and separates the character frame from the connected pattern depending on the width. The frame extraction and elimination part 45 carries out a frame extraction and elimination process which will be described later with respect to the partial pattern for which the detection of the horizontal frame portion failed in the straight line detector 42.

Figure 39:
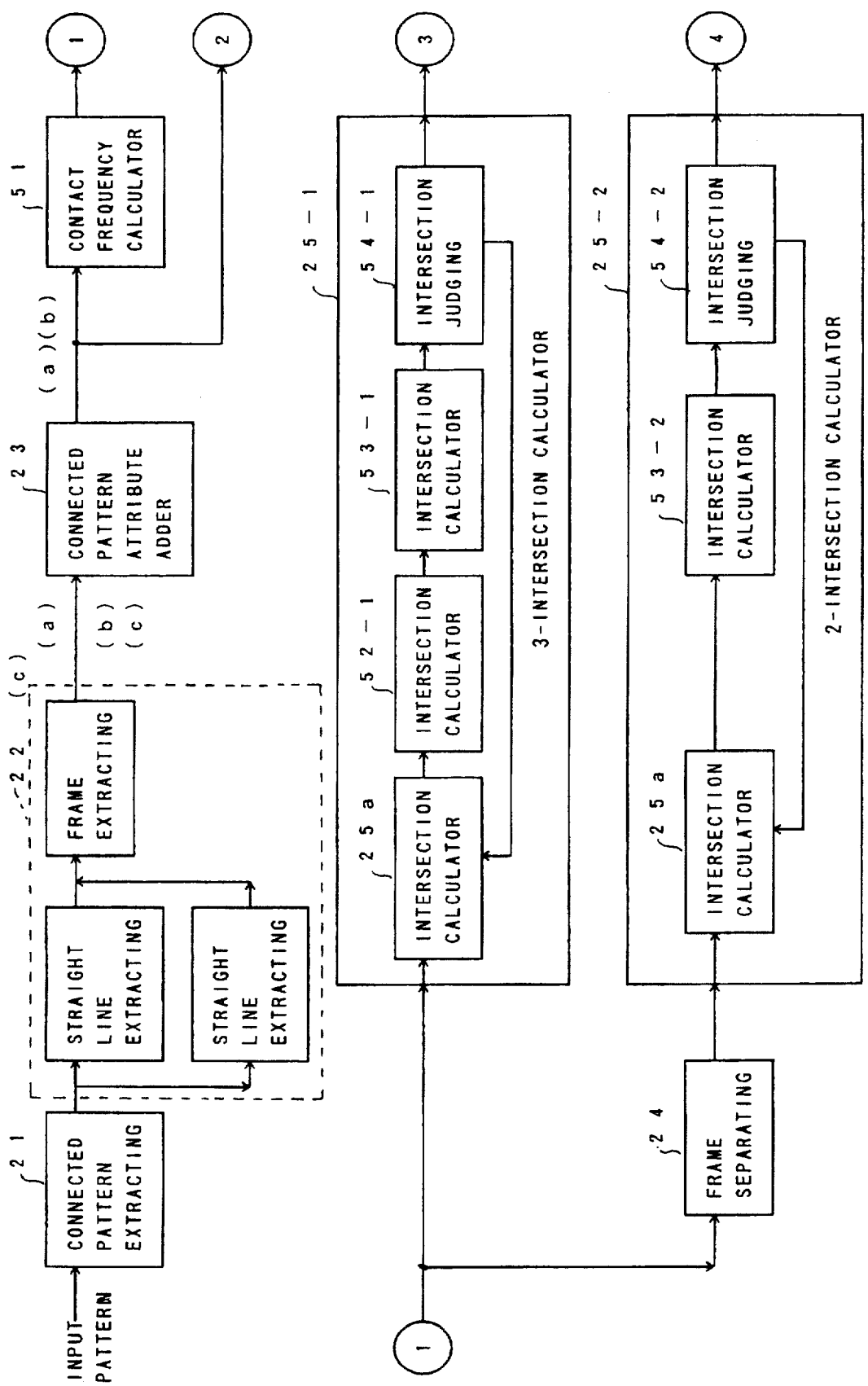
FIG. 39 is a system block diagram showing a second embodiment of the image extraction system according to the present invention.
Figure 40:
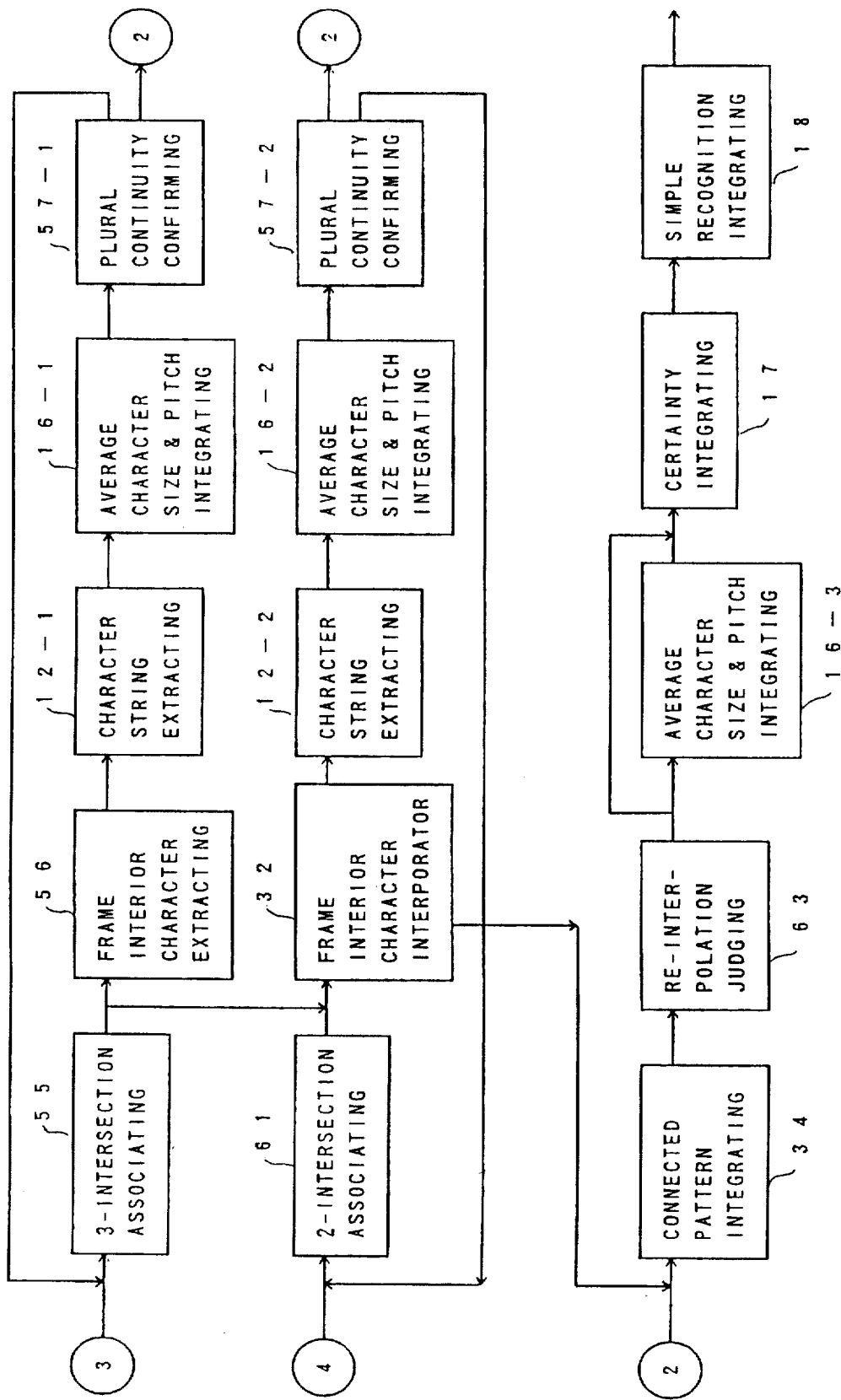
FIG. 40 is a system block diagram showing the second embodiment of the image extraction system.

After separating the frame, it is possible to carry out for example the processes of the elements shown in FIGS. 39 and 40 starting from a character/frame intersection calculator 25a shown in FIG. 39 to a connected pattern integrating part 34 shown in FIG. 40.

The connected pattern extracting part 40 includes a labeling part 40a. In order to stably extract each pattern without being dependent on the relative relationship of the positions where the plurality of block frames are arranged, the labeling part 40a extracts by labeling the pattern which is connected by the 8-connection. The pattern having the "8-connection" is defined as a pattern having a connection (or link) in any one of 8 directions which include the vertical, horizontal and oblique (or diagonal) directions. A general technique may be used for the above labeling. In this embodiment, the partial pattern which is obtained by the labeling is one of (i) a frame which does not touch a character, (ii) a character which does not touch a frame or a portion of such a character, and (iii) a frame which touches a character. Hence, such partial patterns are distinguished in order to extract the frame. In addition, since the size of the partial pattern which is obtained by the labeling becomes necessary during a latter process, corner coordinates of the rectangle which approximates the partial pattern are calculated during the labeling process.

Figure 5:
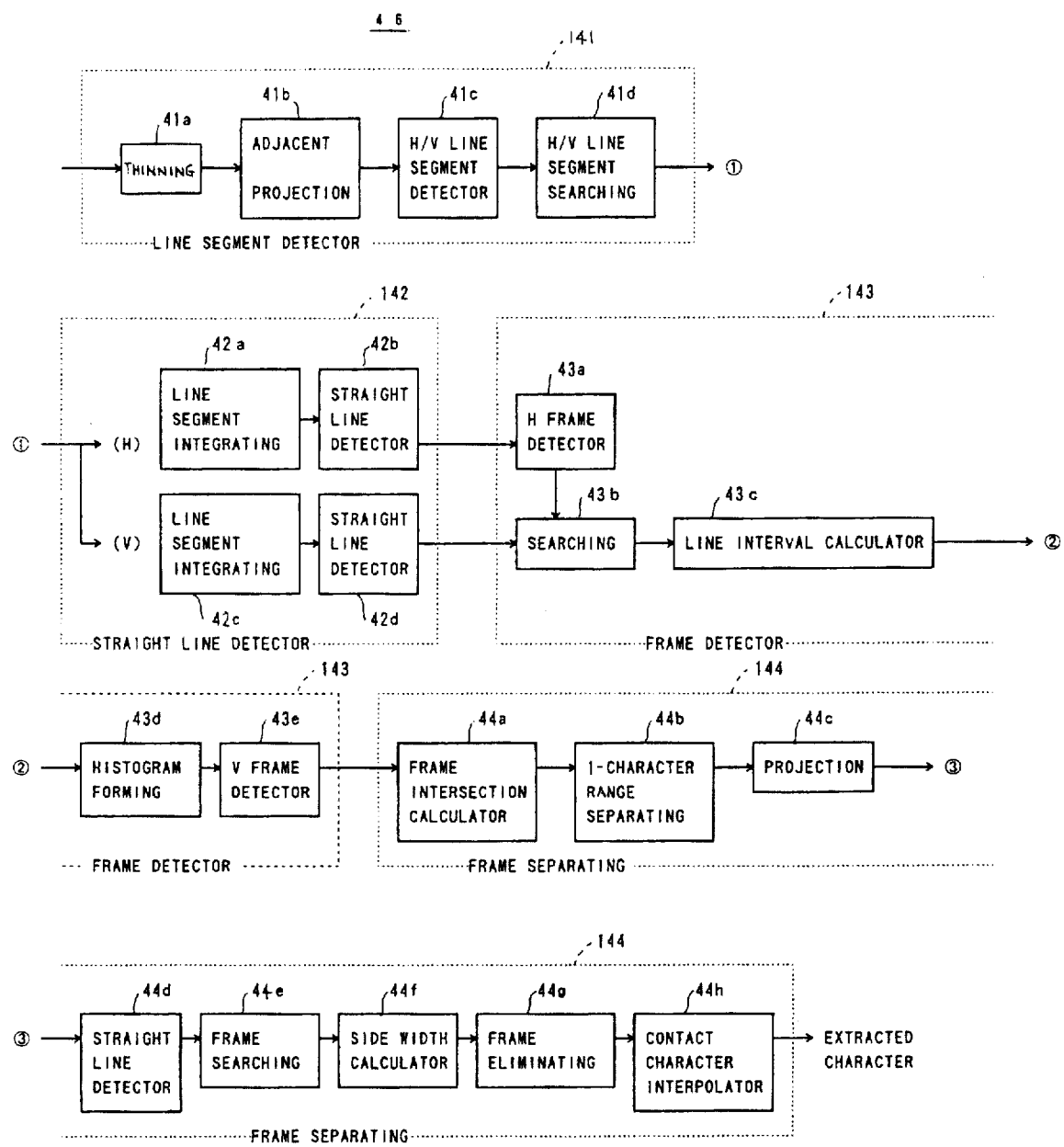
FIG. 5 is a system block diagram showing an embodiment of a 1-character frame extracting part.

The 1-character frame extracting part 56 includes a line segment detector 141, a straight line detector 142, a frame detector 143 and a frame separating part 144 as shown in FIG. 5. The line segment detector 141 detects a line segment or a portion of a straight line at a predetermined length for every connected pattern using "adjacent projection". The straight line detector 142 detects a long straight line by integrating a plurality of line segments or portions of the straight line which are obtained. The frame detector 143 detects the straight line forming the character frame based on the intervals or the like of the plurality of straight lines which are obtained. The frame separating part 144 divides the block frame into frames of one character (1-character frames) based on the intersection of the frames to calculate the width of each frame, and separates the character frame from the connected pattern depending on the width. In FIG. 5, those parts which are essentially the same as those corresponding parts in FIG. 4 are designated by the same reference numerals.

The line segment detector 141 includes a thinning part 41a, an adjacent projection part 41b, a horizontal/vertical line segment detector 41c and a horizontal line segment searching part 41d.

The thinning part 41a carries out a thinning process for every partial pattern which is obtained by the labeling. This thinning process is carried out to make the line width the same so as to facilitate extraction of the long straight line which exists only in the frame. A known technique may be used for the thinning process itself. The original pattern of the partial pattern before the thinning process is stored independently of the thinned pattern, so that both may be used in latter processes when searching the line segment and separating the frame.

The adjacent projection part 41b divides the thinned pattern vertically and horizontally into a plurality of parts, calculates the adjacent projections within the divided ranges in both the vertical and horizontal directions, and detects by rectangular approximation the line segment having a predetermined length or a portion of a straight line. The "adjacent projection" takes as the projection value a sum of the projection value of a target row or column and the projection of an adjacent (or surrounding) row or column which is adjacent to the target row or column. Accordingly, even if the straight line extends over a plurality of rows or columns due to the inclination or slope of the straight line, it is possible to detect the straight line. As a result, even if the frame is large such as the case of the block frame and the frame is inclined, it is possible to detect the straight line forming the frame by use of the adjacent projection technique. For example, if the projection value of the i-th row is denoted by p(i) as shown in FIG. 6, an adjacent projection value P(i) can be calculated from the following formula (1), where j=1 in FIG. 6. The projection value of the column can be calculated similarly to the projection value of the row.

$$P(i) = p(i-j) + p(i-j+1) + \ldots + p(i) + \ldots + p(i+j) \quad (1)$$

Figure 7:
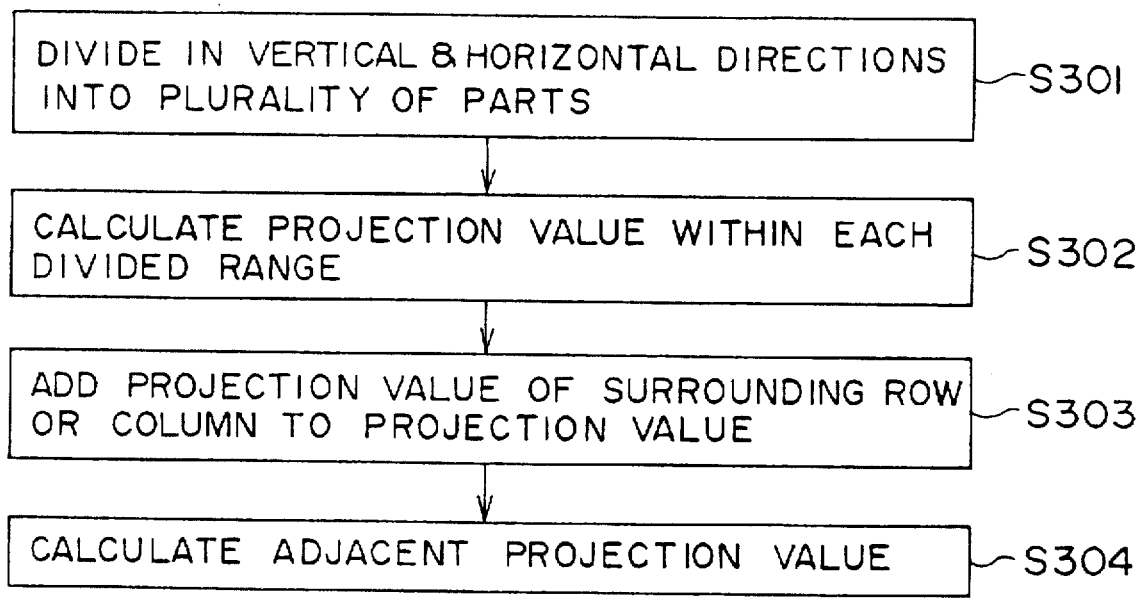
FIG. 7 is a flow chart for explaining a process of an adjacent projection part 41b.

FIG. 7 shows a flow chart for the case where the process of the adjacent projection part 41b is carried out by software, in order to describe an embodiment of the process of the adjacent projection part 41b in more detail.

In FIG. 7, a step S301 divides the partial pattern which is obtained by the connected pattern extracting part 40 in the vertical and horizontal directions into a plurality of parts. A step S302 calculates the projections within the divided ranges in both the vertical and horizontal directions. A step S303 adds the projection value of the adjacent or surrounding row or column to each projection value calculated in the step S302. In addition, a step S304 calculates the adjacent projection values based on the formula (1) described above.

Figure 8:
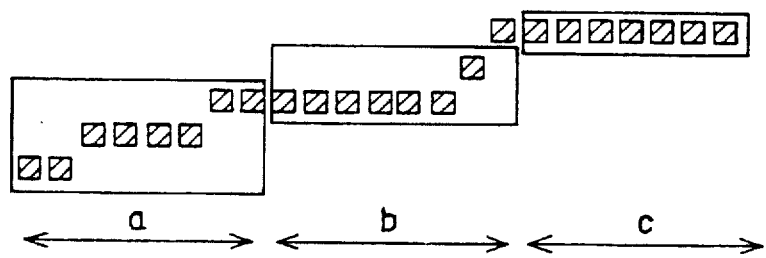
FIG. 8 is a diagram for explaining detection of a rectangular line segment.

The vertical/horizontal line segment detector 41c regards as the position where the candidate of the straight line exists the part for which the ratios of the adjacent projection value calculated in the adjacent projection part 41b and the divided lengths in both the vertical and horizontal directions are greater than or equal to a predetermined threshold value. In addition, as indicated by a part "a" in FIG. 8, when the ratios are greater than or equal to the predetermined threshold value continuously for a plurality of rows or columns, it is regarded that a straight line exists within a rectangular range which includes such rows or columns. Because the detected straight line or portion of the straight line is approximated by the rectangle, that is, subjected to rectangular approximation, such a straight line or a portion thereof will hereinafter be referred to as a "rectangular line segment".

The inclined long straight line cannot be detected if the normal (general) projection were used in place of the adjacent projection, and it would be necessary in this case to increase the number of divisions of the partial pattern and to shorten the length of the divisions. However, if the length of the divisions is short, a large number of short straight lines forming the character would also be detected. On the other hand, this embodiment uses the adjacent projection technique described above which makes it possible to also detect a relatively long straight line.

Figure 9:
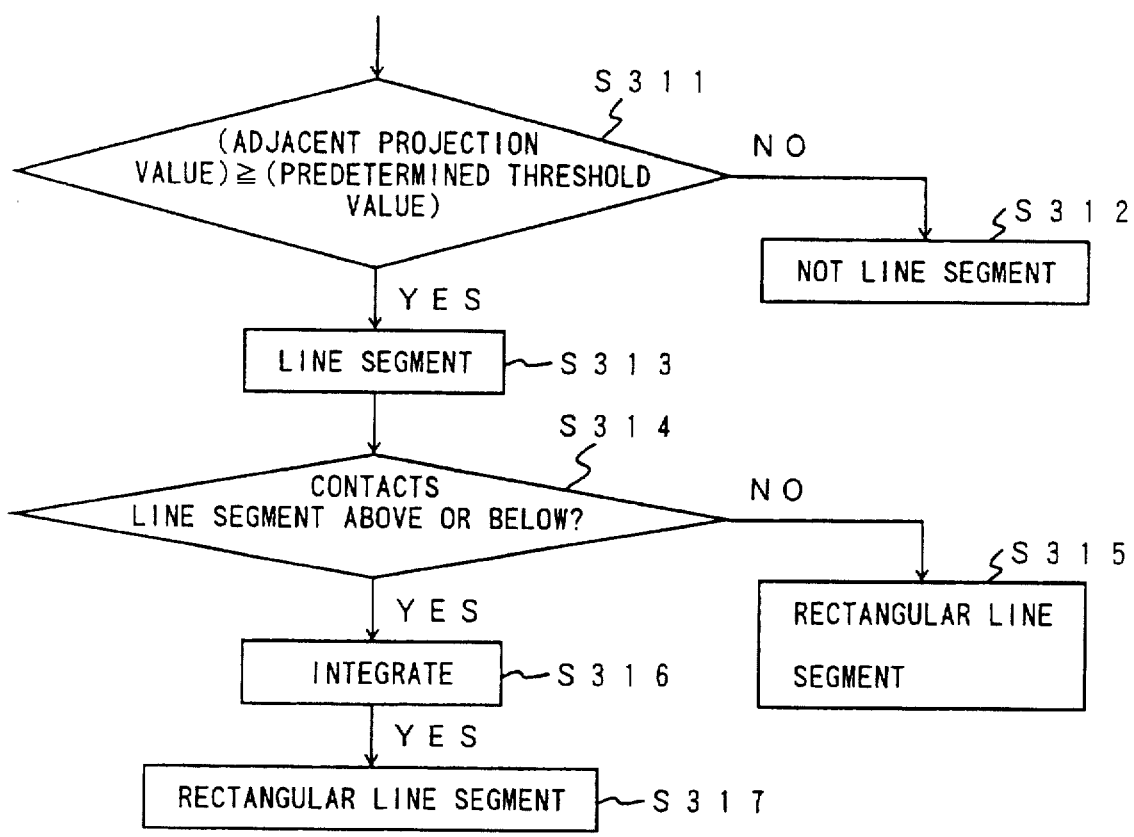
FIG. 9 is a flow chart for explaining a process of a vertical/horizontal line segment detector 41c.

FIG. 9 shows a flow chart for the case where the process of the vertical/horizontal line segment detector 41c is carried out by software, in order to describe an embodiment of the process of the vertical/horizontal line segment detector 41c in more detail.

In FIG. 9, a step S311 decides whether or not a ratio of the adjacent projection values calculated by the adjacent projection part 41b and the divided lengths in the vertical and horizontal directions are greater than or equal to a predetermined threshold value. If the decision result in the step S311 is NO, a step S312 determines that no line segment exists. On the other hand, if the decision result in the step S311 is YES, a step S313 determines that a line segment exists. In this latter case, a step S314 decides whether or not the line segment which is determined to exist in the step S313 is connected to a line segment located above and below this line segment. If the decision result in the step S314 is NO, a step S315 determines that the line segment which is determined to exist in the step S313 is a rectangular line segment. On the other hand, if the decision result in the step S314 is YES, a step S316 integrates the line segment which is determined to exist in the step S313 and the line segment existing above and below this line segment, and a step S317 determines that the integrated line segment is a rectangular line segment.

Figure 10:
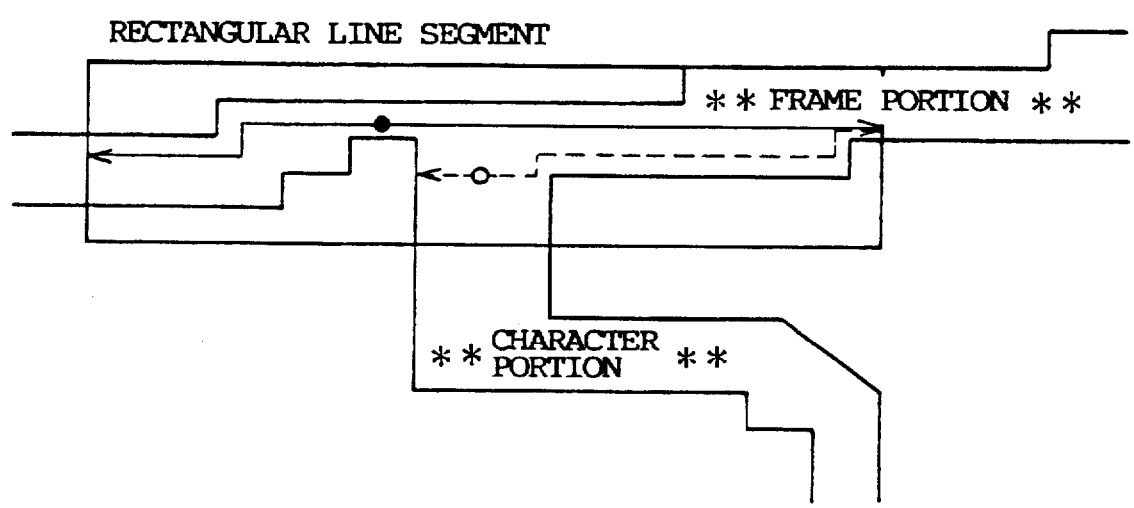
FIG. 10 is a diagram for explaining a starting point of a search.

The horizontal line segment searching part 41d carries out a search with respect to the rectangular line segment which is detected by the vertical/horizontal line segment detector 41c, so as to confirm whether or not the horizontal line segment is broken or cut at an intermediate part thereof. A narrowest portion of the rectangular line segment is used as a starting point for the search. For example, when a predetermined location such as a middle point indicated by a white circular mark in FIG. 10 is used as the starting point, the possibility of the search failing is high if the starting point is located at a portion of the character as shown and the search progresses as indicated by a dotted line with an arrow. However, the possibility that the narrowest portion indicated by the black circular mark in FIG. 10 is located at a portion of the character is low, thereby making it possible to positively carry out the search as indicated by a solid line with an arrow.

Figure 11:
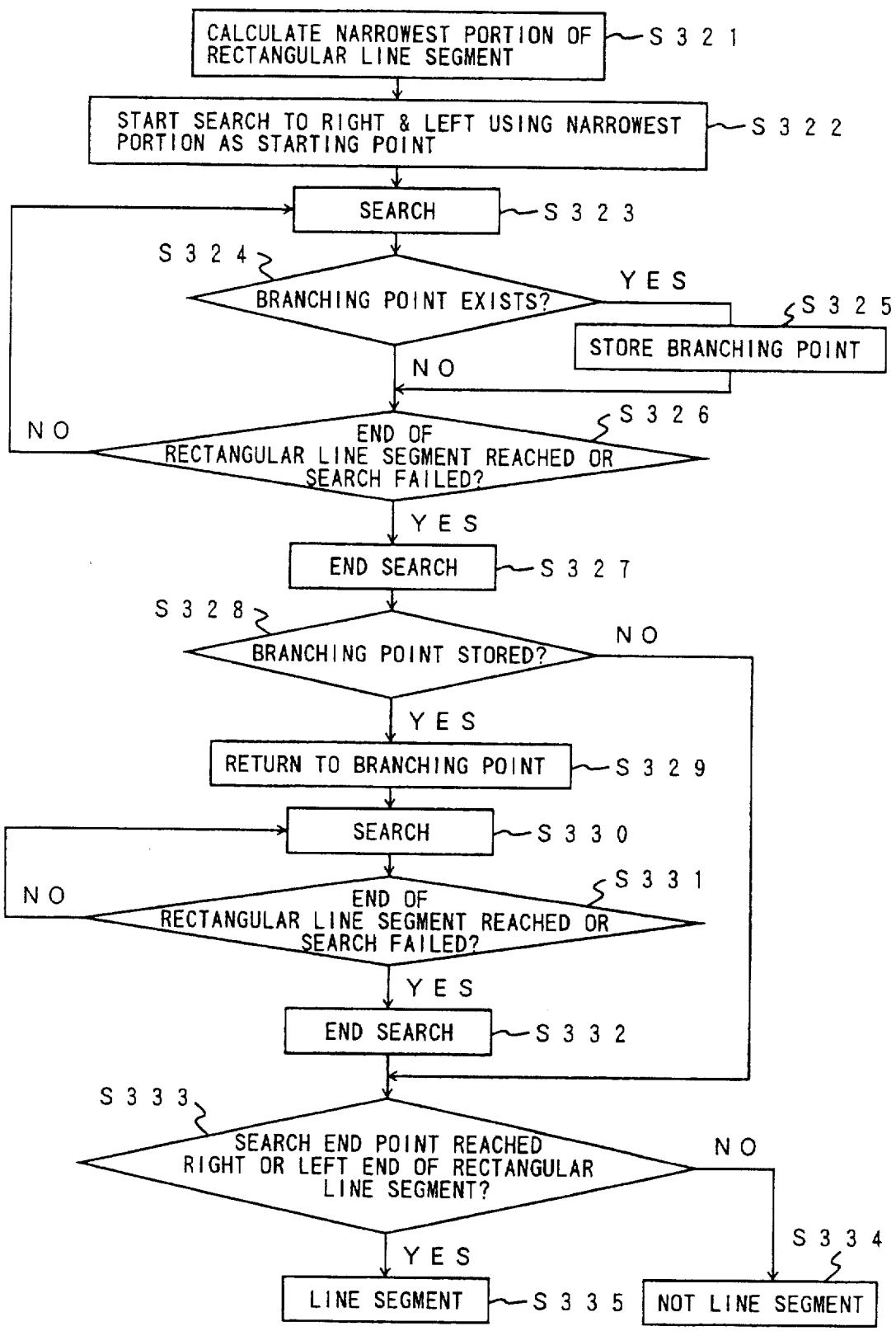
FIG. 11 is a flow chart for explaining a process of a horizontal line segment selector 41d.

FIG. 11 shows a flow chart for the case where the process of the horizontal line segment searching part 41d is carried out by software, in order to describe an embodiment of the process of the horizontal line segment searching part 41d in more detail.

In FIG. 11, a step S321 calculates a narrowest portion of the rectangular line segment which is detected by the vertical/horizontal line segment detector 41c. A step S322 starts the search to the right and left by using the narrowest portion which is calculated as the starting point. A step S323 carries out the search, and a step S324 decides whether or not a branching point exists. If the decision result in the step S324 is YES, a step S325 stores the branching point. In addition, if the decision result in the step S324 is NO or after the step S325, a step S326 decides whether or not an end of the rectangular line segment is reached or, whether or not the search has failed. If the decision result in the step S326 is NO, the process returns to the step S323.

On the other hand, if the decision result in the step S325 is YES, a step S327 ends the search, and a step S328 decides whether or not the branching point is stored. If the decision result in the step S328 is NO, the process advances to a step S333 which will be described later. If the decision result in the step S328 is YES, a step S329 returns to the stored branching point, and a step S330 carries out the search. A step S331 decides whether or not the end of the rectangular line segment is reached or, whether or not the search has failed. If the decision result in the step S311 is NO, the process returns to the step S330. On the other hand, if the decision result in the step S331 is YES, a step S332 ends the search, and the step S333 decides whether or not the end point of the search has reached the right and left end of the rectangular line segment. If the decision result in the step S333 is NO, a step S334 determines that the rectangular line segment is not a horizontal line segment. In addition, if the decision result in the step S333 is YES, a step S335 determines that the rectangular line segment is a horizontal line segment.

Returning now to the description of FIG. 5, the straight line detector 142 includes a line segment integrating part 42a, a straight line detector 42b, a line segment integrating part 42c, and a straight line detector 42d. The line segment integrating part 42a and the straight line detector 42b are provided with respect to the horizontal line segment, and the line segment integrating part 42c and the straight line detector 42d are provided with respect to the vertical line segment. The line segment integrating part 42a integrates the rectangular line segments to form a long straight line if the rectangular line segments touch or are connected without being broken at an intermediate part thereof, such as the case of line segments y and z shown in FIG. 12A. In addition, even when the rectangular line segments are not connected to each other, such as the case of line segments x and y shown in FIG. 12A, the line segment integrating part 42a integrates these rectangular line segments to form a long straight line if the distance in the vertical direction between the rectangular line segments is within the number j of columns or rows added during the adjacent projection described above. The straight line detector 42b determines that the integrated straight line is a candidate of the straight line forming the horizontal frame portion if a ratio of the length of the integrated straight line and the length of the rectangle approximating the partial pattern is greater than or equal to a predetermined threshold value. In addition, the straight line detector 42b obtains the slope of the integrated straight line, that is, the inclination of the partial pattern, from the slope of a straight line connecting a coordinate at the top left of the line segment x and a coordinate at the top right of the line segment z which are integrated in the line segment integrating part 42a, as shown in FIG. 12B. This inclination of the partial pattern is used at a latter process which will be described later. With regard to the vertical line segment, the line segment integrating part 42c and the straight line detector 42d carry out processes similar to those of the line segment integrating part 42c and the straight line detector 42d described above with respect to all of the detected rectangular line segments. In other words, the line segment integrating part 42c detects the straight line by integrating the rectangular line segments, and the straight line detector 42d approximates the detected straight line by the rectangle and determines that it is a candidate of the straight line forming the vertical frame portion.

Figure 13:
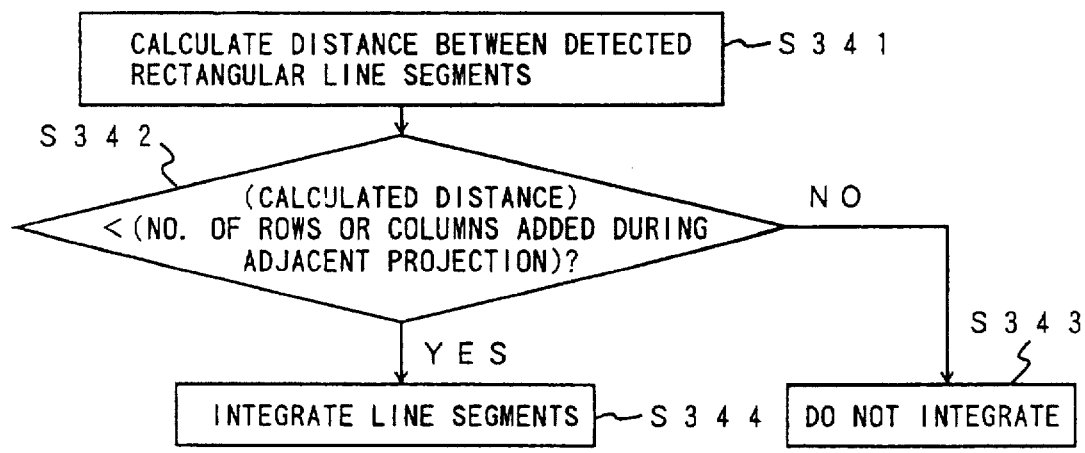
FIG. 13 is a flow chart for explaining a process of line segment integrating parts 42a and 42c.

FIG. 13 shows a flow chart for the case where the process of the line segment integrating part 42a or the line segment integrating part 42c of the straight line detector 142 is carried out by software, in order to describe an embodiment of the process of the line segment integrating part 42a or the line segment integrating part 42c in more detail.

In FIG. 13, a step S341 calculates the distance between the detected rectangular line segments. A step S342 decides whether or not the calculated distance is within the number of rows or columns added during the adjacent projection described above. If the decision result in the step S342 is NO, a step S343 carries out no integration of the rectangular line segments. On the other hand, if the decision result in the step S342 is YES, a step S344 integrates the rectangular line segments.

Returning now to the description of FIG. 5, the frame detector 143 includes a horizontal frame detector 43a, a searching part 43b, a line interval calculator 43c, a histogram forming part 43d, and a vertical frame detector 43e. The horizontal frame detector 43a detects the horizontal frame portion from the candidates of the straight line forming the horizontal frame portion and which are detected by the straight line detector 42b of the straight line detector 142.

In this embodiment, the image to be processed has the block frame in which the frames are arranged at constant intervals one character at a time in 1 horizontal row. Hence, out of the straight lines which are obtained and extending in the horizontal direction, the straight line existing at the outermost part is regarded as the horizontal frame portion. The searching part 43b searches for the vertical line segment based on the candidates of the straight line forming the vertical frame portion which are detected by the straight line detector 42d of the straight line detector 142 and the horizontal frame portion detected by the horizontal frame detector 43a, in order to detect the vertical frame portion. More particularly, a search is carried out to check whether or not the straight line which is the candidate of the vertical frame portion reaches the horizontal frame portion located above and below and obtained in the horizontal frame detector 43a or, whether or not the straight line which is the candidate of the vertical frame portion is broken at an intermediate part thereof. Similarly as in the case of the horizontal line, the search is carried out from a starting point which is located at a narrowest portion within the rectangular range (rectangular line segment). As a result of the search, the vertical straight line which reaches both the horizontal frame portion located above and below is regarded as a candidate of the vertical frame portion, while other vertical straight lines are regarded as portions of the character and omitted. Next, the line interval calculator 43c calculates the interval of the vertical straight lines which remain as the candidates of the vertical line. In addition, the histogram forming part 43d forms a histogram of the calculated line interval and the appearing frequency thereof. The vertical frame detector 43e excludes from the candidate of the vertical frame portion the vertical line which forms an interval greatly different from others, and detects the vertical straight line which is not excluded from the candidate of the vertical frame portion as the vertical frame portion.

Figure 14:
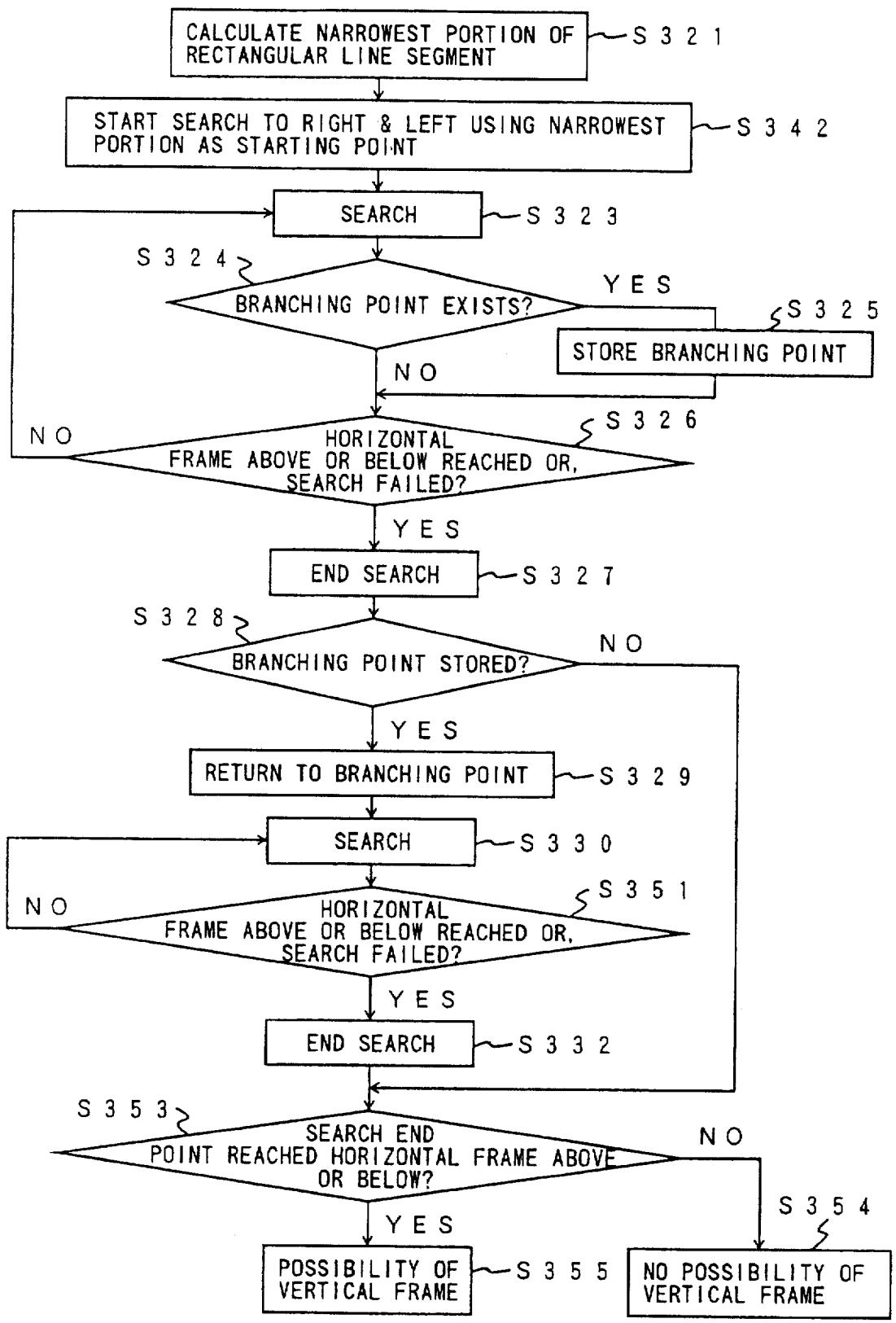
FIG. 14 is a flow chart for explaining a process of a searching part 43b.

FIG. 14 shows a flow chart for the case where the process of the searching part 43b of the frame detector 143 is carried out by software, in order to describe an embodiment of the process of the searching part 43b in more detail. In FIG. 14, those steps which are basically the same as those corresponding steps in FIG. 11 are designated by the same reference numerals, and a description thereof will be omitted.

In FIG. 14, a step S342 starts the search upwards and downwards by taking the narrowest portion as the starting point. Steps S346 and S351 respectively decide whether or not the horizontal frame portion above and below is reached or, whether or not the search has failed. A step S353 decides whether or not the end point of the search has reached the horizontal frame portion above and below. If the decision result in the step S353 is NO, a step S354 determines that there is no possibility of the detected straight line forming the vertical frame portion. On the other hand, if the decision result in the step S353 is YES, a step S355 determines that there is a possibility that the detected straight line forms the vertical frame portion.

Figure 1:
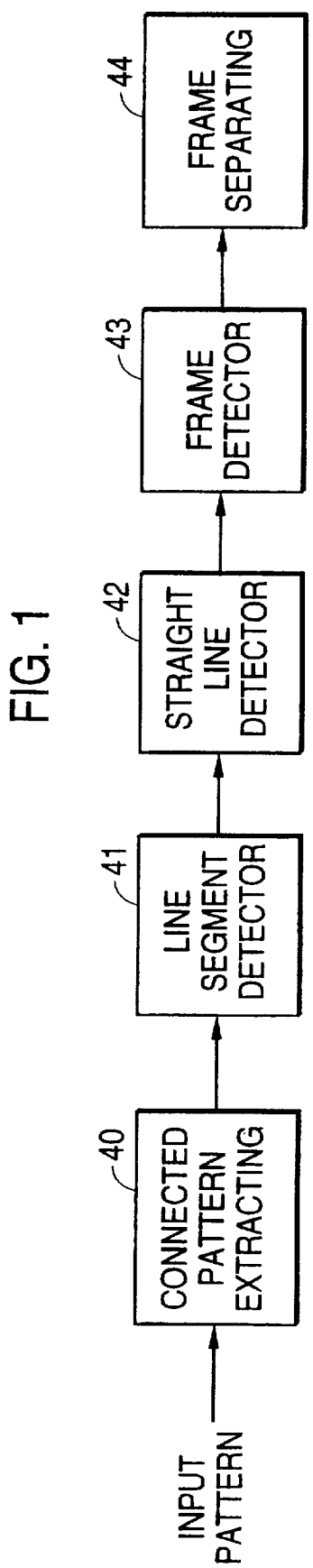
FIG. 1 is a system block diagram showing a previously proposed image extraction system.
Figure 2A:
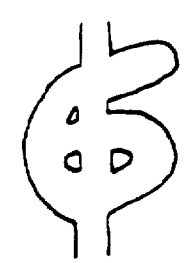
FIGS. 2A and 2B respectively are diagrams for explaining the problem introduced by a thinning process.
Figure 2B:
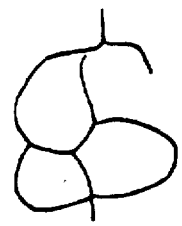

Next, a description will be given of the frame separating part 144 shown in FIG. 2. The frame separating part 144 includes a frame intersection calculator 44a, a 1 character range separating part 44b, a projection part 44c, a straight line detector 44d, a frame searching part 44e, a side width calculator 44f, a frame eliminating part 44g, and a contact character interpolator 44h.

Figure 15:
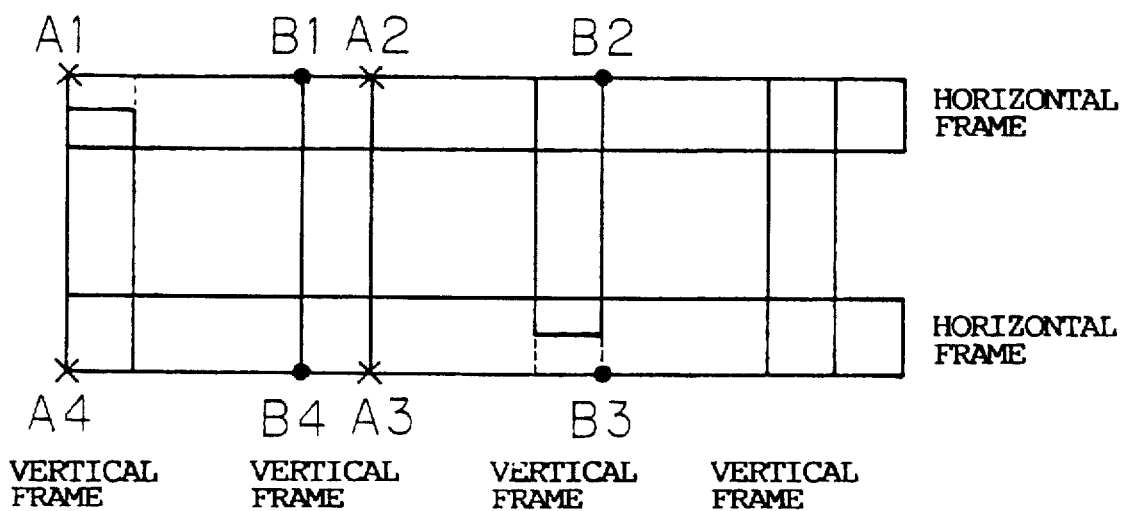
FIG. 15 is a diagram for explaining a separation into 1-character frames.

The frame intersection calculator 44a calculates the intersections of the vertical frame portion and the horizontal frame portion which are obtained from the frame detector 143. In a particular case shown in FIG. 15, the frame intersection calculator 44a calculates intersections A1, B1, A2, B2, . . . . The 1 character range separating part 44b uses the calculated intersections and divides the frame portions in to ranges of 1 character each starting from the left in FIG. 15, to separate the ranges (A1, A2, A3, A4), (B1, B2, B3, B4), . . . . As a result, each separated portion corresponds to 1 character frame.

The projection part 44c calculates the projections of each of the separated portions, and the straight line detector 44d detects the straight lines from the calculated projections. More particularly, the straight line detector 44d calculates the ratios of the projection values of each row and column of each of the separated portions and the rectangles which are obtained by approximating each of the separated portions by the rectangles, and obtains the candidates of the straight line forming the character frame based on the calculated ratios.

The frame searching part 44e calculates the distance between the straight lines from the candidates of the straight line forming the character frame, and extracts the straight line at the outermost part forming the character frame, so as to search each character frame and obtain the position of each character frame. The side width calculator 44f obtains the candidate of the straight line adjacent to the straight line at the outermost part, and calculates the line width of each side of the searched character frame. The frame eliminating part 44g eliminates the character frames one character frame at a time based on the position of the straight line at the outermost part of each side and the calculated line width of each side. The contact character interpolator 44h interpolates the character portion which drops out or chips when the character frame is eliminated. As a result, the character frame is eliminated and the characters are extracted one character at a time.

Figure 16:
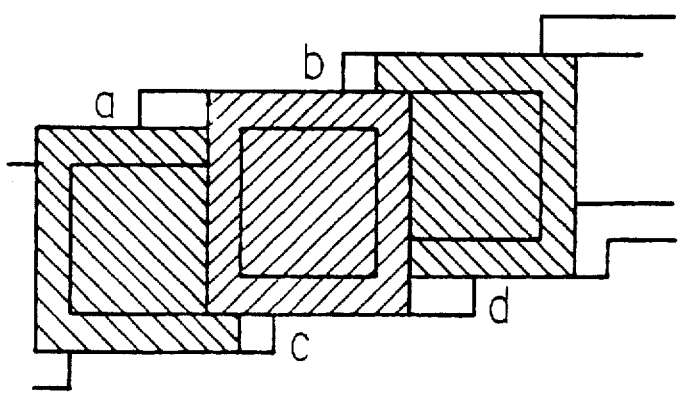
FIG. 16 is a diagram for explaining an elimination range of the frame.

When the frame is inclined as shown in FIG. 16, portions ra, rb, rc and rd may not be eliminated and remain above and below each frame even after the frames are eliminated. Hence, if the slope or inclination obtained in the straight line detector 142 described above is relatively large, the frame eliminating part 44g may slightly increase the eliminating range of the frame.

Figures 17A, 17B:
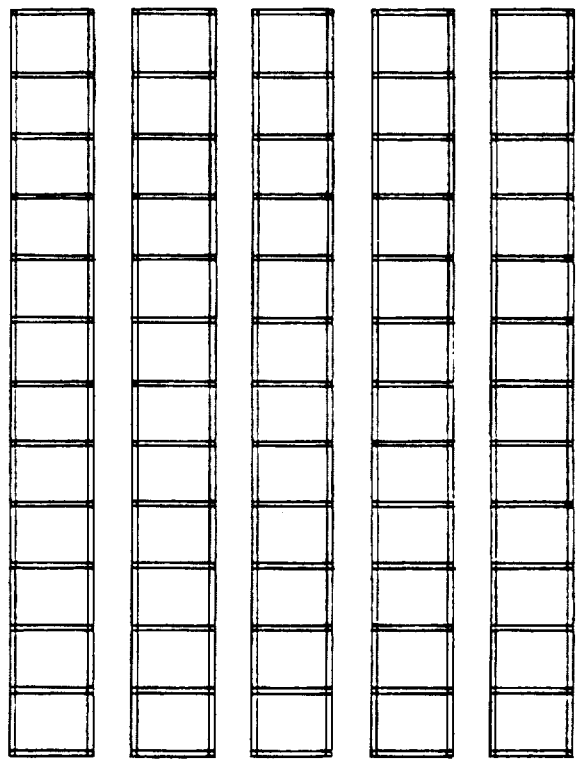
FIG. 17A and 17B respectively are diagrams for explaining extraction of the frame.

FIGS. 17A, 17B, 18A and 18B are diagrams for explaining an example of the character extraction made in this embodiment. FIG. 17A shows the original pattern, and FIG. 17B shows the frames which are extracted by the frame eliminating part 44g of the frame separating part 144 shown in FIG. 5. FIG. 18A shows the characters which are extracted by extracting the frame in the frame eliminating part 44g of the frame separating part 144, and FIG. 18B shows the characters which are interpolated by the contact character interpolator 44h of the frame separating part 144.

As described above, out of the extracted partial pattern, this embodiment decides whether or not the extracted straight line forms the frame and erases the frame portion to leave the character region with respect to the 1-character frames which partition the characters one by one.

The method of extracting the 1-character frame is of course not limited to that described with reference to FIG. 5. For example, it is possible to extract the 1-character frame by a part shown in FIG. 32 which will be described later and including a connected pattern extracting part 1, a straight line extracting part 2 for extracting straight lines having a wide line width, a straight line extracting part 3 for extracting straight lines having a narrow line width, and a frame extracting part 4.

Returning now to the description of FIG. 4, the line segment detector 41 includes a mask process part 41A, an adjacent projection part 41b, a horizontal/vertical line segment detector 41c and a horizontal line segment searching part 41d.

The mask process part 41A carries out a mask process which will be described hereunder for each partial pattern which is obtained by eliminating the 1-character frame from the partial pattern that is obtained as a result of the labeling. The mask process makes a scan within 2 kinds of masks which are respectively elongated in the horizontal direction and in the vertical direction with respect to the entire image of the original partial pattern that is eliminated of the 1-character frame, and calculates the ratios between the area occupied by the pattern within the respective masks and the area of the respective masks. The inside of the mask is regarded as a pattern if the calculated ratio is greater than a predetermined value. On the other hand, if the calculated ratio is less than or equal to the predetermined value, the pattern within the mask is deleted so as to extract the vertical or horizontal component. When a plurality of rows or columns continue and the ratio becomes greater than the predetermined value, a rectangular range is formed by integrating the plurality of rows or columns, and a center line of this rectangular range is regarded as the result of the mask process.

Figure 19A:
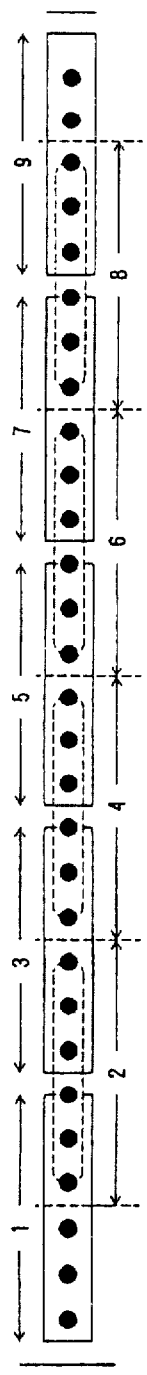
FIGS. 19A, 19B and 19C respectively are diagrams for explaining extraction of a horizontal line segment using a mask.
Figure 19B:
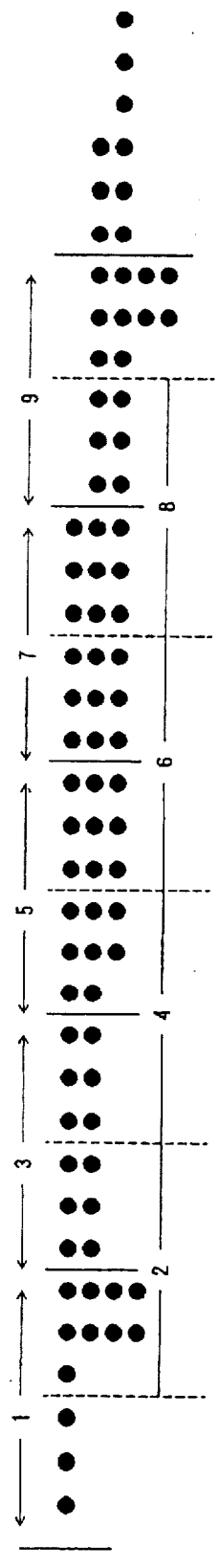
Figure 19C:
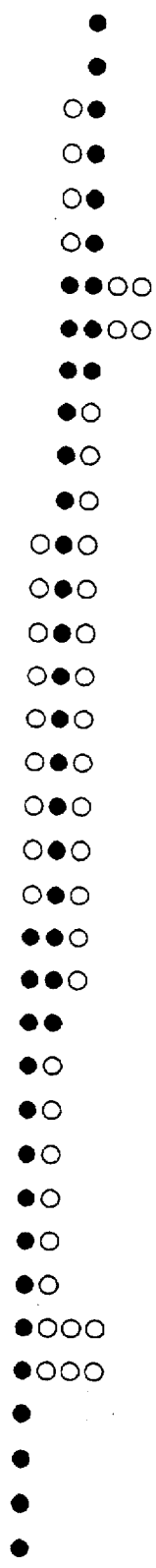

In order to prevent a gap from being formed between line segments which are obtained as a result of the mask process, an overlap is provide between the ranges in which the mask process is made. FIGS. 19A through 19C are diagrams for explaining a case where a horizontal component is extracted using a mask which specifies a rectangular range of 1×6 pixels, that is, 1 pixel in the vertical direction and 6 pixels in the horizontal direction. FIG. 19A shows masks "1" through "9" the adjacent ones of which overlap. FIG. 19B shows a particular example of an image of the original partial pattern. FIG. 19C shows a horizontal component that is extracted when the mask process is carried out using the mask shown in FIG. 19A. In FIGS. 19A through 19C, black circular marks indicate the pixels of the extracted horizontal component.

Figure 20:
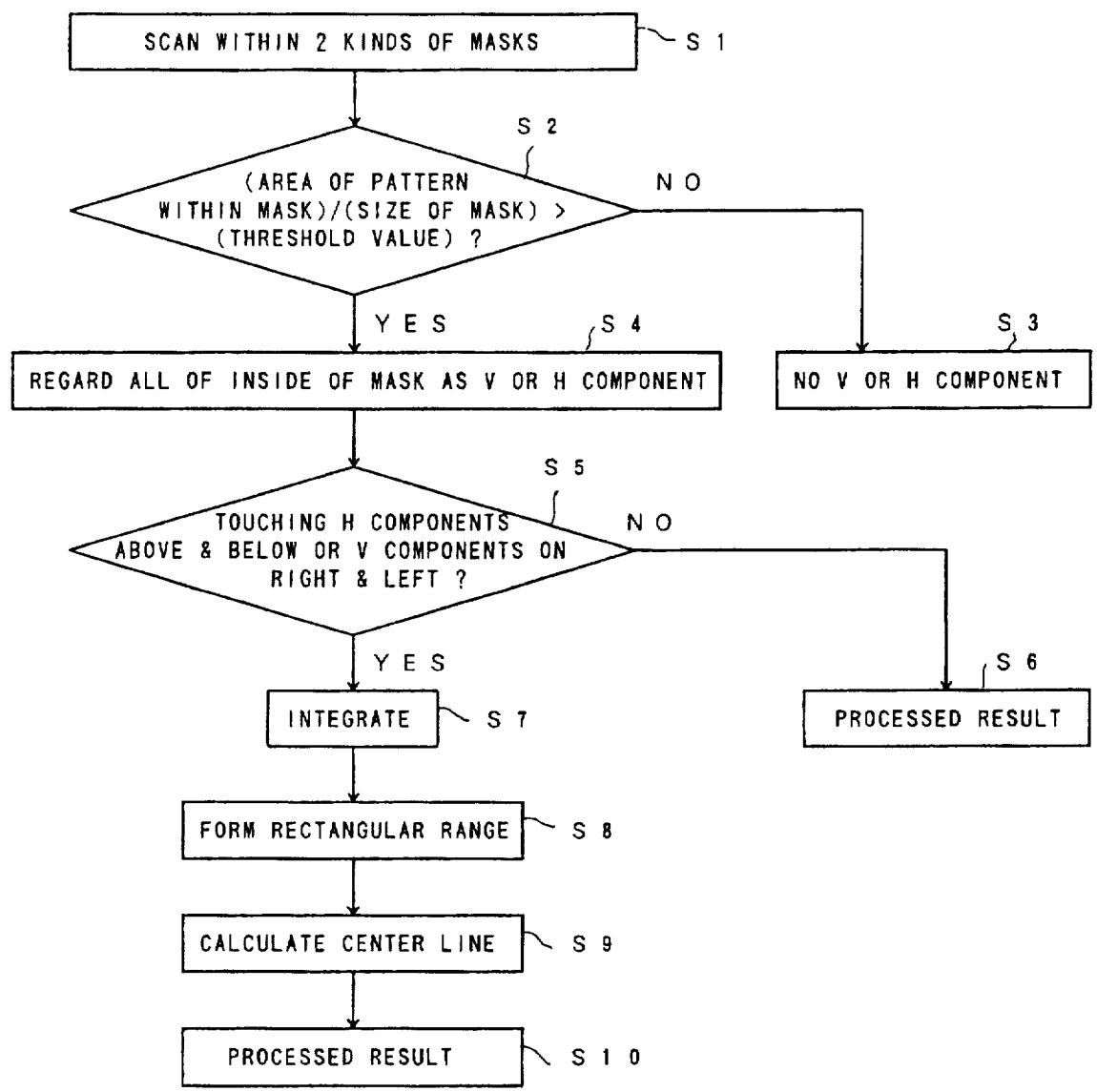
FIG. 20 is a flow chart for explaining a process of a mask process part 41A.

FIG. 20 shows a flow chart for the case where the process of the mask process part 41A within the line segment detector 41 is carried out by software, in order to describe an embodiment of the process of the mask process part 41A in more detail.

In FIG. 20, a step S1 makes a scan within 2 kinds of masks which are respectively elongated in the horizontal direction and in the vertical direction, with respect to the entire image of the original partial pattern. A step S2 calculates the ratios between the area occupied by the pattern within the respective masks and the area of the respective masks, and decides whether or not the ratios are greater than a predetermined value. If the decision result in the step S2 is NO, a step S3 determines that there is no vertical component or horizontal component, and the process ends. On the other hand, if the decision result in the step S2 is YES, a step S4 regards all of the inside of the mask as a pattern, and regards this pattern as the vertical component or horizontal component. A step S5 decides whether or not the obtained vertical or horizontal component touches a component above or below, or a component on the right or left. If the decision result in the step S5 is NO, a step S6 outputs the obtained component as the result of the mask process.

If the decision result in the step S5 is YES, a step S7 integrates the obtained component and the component above or below, or on the right of left touching the obtained component. Then, a step S8 forms a rectangular range from the integrated components. A step S9 calculates a center line of the formed rectangular range, and a step S10 outputs this center line as the result of the mask process.

The original partial pattern before the mask process is stored independently of the pattern which has been subjected to the mask process, and are used in the processes which will be described later, such as searching for the line segment and separating the frame.

The adjacent projection part 41b of the line segment detector 41 shown in FIG. 4 divides the pattern which has been subjected to the mask process vertically and horizontally into a plurality of parts, calculates the adjacent projections within the divided ranges in both the vertical and horizontal directions, and detects by rectangular approximation the line segment having a predetermined length or a portion of a straight line, similarly to the adjacent projection part 41b of the line segment detector 141 shown in FIG. 5. Accordingly, even if the straight line extends over a plurality of rows or columns due to the inclination or slope of the straight line, it is possible to detect the straight line. As a result, even if the frame is large such as the case of the block frame and the frame is inclined, it is possible to detect the straight line forming the frame by use of the adjacent projection technique.

The vertical/horizontal line segment detector 41c of the line segment detector 41 shown in FIG. 4 regards as the position where the candidate of the straight line exists the part for which the ratios of the adjacent projection value calculated in the adjacent projection part 41b and the divided lengths in both the vertical and horizontal directions are greater than or equal to a predetermined threshold value, similarly to the vertical/horizontal line segment detector 41c of the line segment detector 141 shown in FIG. 5. In addition, as indicated by a part "a" in FIG. 8 described above, when the ratios are greater than or equal to the predetermined threshold value continuously for a plurality of rows or columns, it is regarded that a straight line exists within a rectangular range which includes such rows or columns. Because the detected straight line or portion of the straight line is approximated by the rectangle, that is, subjected to rectangular approximation, such a straight line or a portion thereof will hereinafter be referred to as a "rectangular line segment".

The inclined long straight line cannot be detected if the normal (general) projection were used in place of the adjacent projection, and it would be necessary in this case to increase the number of divisions of the partial pattern and to shorten the length of the divisions. However, if the length of the divisions is short, a large number of short straight lines forming the character would also be detected. On the other hand, this embodiment uses the adjacent projection technique described above which makes it possible to also detect a relatively long straight line.

The horizontal line segment searching part 41d of the line segment detector 41 shown in FIG. 4 carries out a search with respect to the rectangular line segment which is detected by the vertical/horizontal line segment detector 41c, so as to confirm whether or not the horizontal line segment is broken at an intermediate part thereof, similarly to the horizontal line segment searching part 41d of the line segment detector 141 shown in FIG. 5. A narrowest portion of the rectangular line segment is used as a starting point for the search. For example, when a predetermined location such as a middle point indicated by a white circular mark in FIG. 10 described above is used as the starting point, the possibility of the search failing is high if the starting point is located at a portion of the character as shown and the search progresses as indicated by a dotted line with an arrow.

However, the possibility that the narrowest portion indicated by the black circular mark in FIG. 10 is located at a portion of the character is low, thereby making it possible to positively carry out the search as indicated by a solid line with an arrow.

The straight line detector 42 shown in FIG. 4 includes a line segment integrating part 42a, a straight line detector 42b, a line segment integrating part 42c, and a straight line detector 42d. The line segment integrating part 42a and the straight line detector 42b are provided with respect to the horizontal line segment, and the line segment integrating part 42c and the straight line detector 42d are provided with respect to the vertical line segment.

Figure 12A:
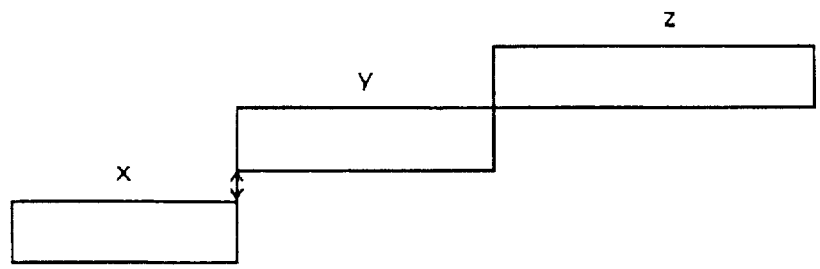
FIGS. 12A and 12B respectively are diagrams for explaining a connection of rectangular line segments and an inclination of a straight line.
Figure 12B:
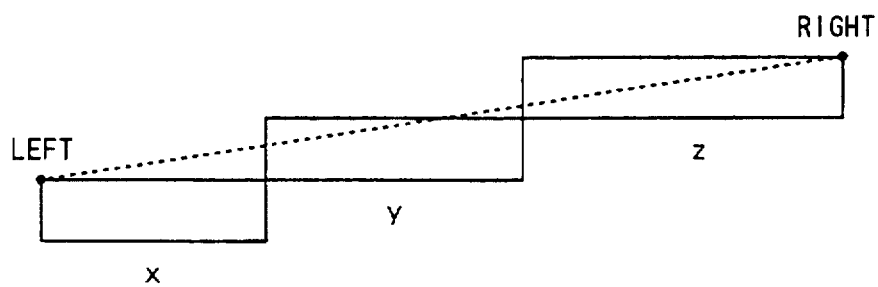

The line segment integrating part 42a integrates the rectangular line segments to form a long straight line if the rectangular line segments touch or are connected without being broken at an intermediate part thereof, such as the case of line segments y and z shown in FIG. 12A described above. In addition, even when the rectangular line segments are not connected to each other, such as the case of line segments x and y shown in FIG. 12A, the line segment integrating part 42a integrates these rectangular line segments to form a long straight line if the distance in the vertical direction between the rectangular line segments is within the number j of columns or rows added during the adjacent projection described above. The straight line detector 42b determines that the integrated straight line is a candidate of the straight line forming the horizontal frame portion if a ratio of the length of the integrated straight line and the length of the rectangle approximating the partial pattern is greater than or equal to a predetermined threshold value. In addition, the straight line detector 42b obtains the slope of the integrated straight line, that is, the inclination of the partial pattern, from the slope of a straight line connecting a coordinate at the top left of the line segment x and a coordinate at the top right of the line segment z which are integrated in the line segment integrating part 42a, as shown in FIG. 12B described above. This inclination of the partial pattern is used at a latter process which will be described later. With regard to the vertical line segment, the line segment integrating part 42c and the straight line detector 42d carry out processes similar to those of the line segment integrating part 42c and the straight line detector 42d described above with respect to all of the detected rectangular line segments. In other words, the line segment integrating part 42c detects the straight line by integrating the rectangular line segments, and the straight line detector 42d approximates the detected straight line by the rectangle and determines that it is a candidate of the straight line forming the vertical frame portion.

The frame detector 43 shown in FIG. 4 includes a horizontal frame detector 43a, a searching part 43b, a line interval calculator 43c, a histogram forming part 43d, and a vertical frame detector 43e, similarly to the frame detector 143 shown in FIG. 5. The frame detector 43 shown in FIG. 4 additionally includes an adjacent horizontal frame selector 43F.

Figure 21A:
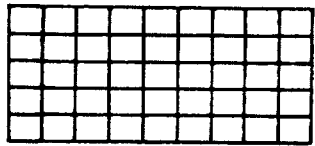
FIGS. 21A, 21B and 21C respectively are diagrams showing kinds of frames to be processed.
Figure 21B:
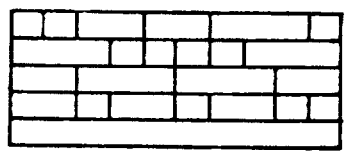
Figure 21C:

The horizontal frame detector 43a detects the horizontal frame portion from the candidates of the straight line forming the horizontal frame portion and which are detected by the straight line detector 42b of the straight line detector 42. In this embodiment, the image to be processed has the block frame in which the frames are arranged at constant intervals one character at a time in 1 horizontal row, as shown in FIGS. 21A through 21C, for example. Hence, out of the straight lines which are obtained and extending in the horizontal direction, the straight line having a length greater than or equal to a predetermined value relative to the label size is regarded as the horizontal frame portion. The adjacent horizontal frame selector 43F selects 2 adjacent horizontal frame portions based on the horizontal frame portion detected by the horizontal frame detector 43a. For example, it is found that the frame is a block frame having the 1-character frames arranged in a horizontal row or is a frame having the free format in a case where 2 horizontal frame portions exist, and it is found that the frame is the block frame having the table format in a case where 3 or more horizontal frame portions exist.

The searching part 43b searches for the vertical line segment based on the candidates of the straight line forming the vertical frame portion which are detected by the straight line detector 42d of the straight line detector 42 and the horizontal frame portion detected by the horizontal frame detector 43a, in order to detect the vertical frame portion. More particularly, a search is carried out to check whether or not the straight line which is the candidate of the vertical frame portion reaches the horizontal frame portion located above and below and obtained in the horizontal frame detector 43a or, whether or not the straight line which is the candidate of the vertical frame portion is broken at an intermediate part thereof. Similarly as in the case of the horizontal line, the search is carried out from a starting point which is located at a narrowest portion within the rectangular range (rectangular line segment). As a result of the search, the vertical straight line which reaches both the horizontal frame portion located above and below is regarded as a candidate of the vertical frame portion, while other vertical straight lines are regarded as portions of the character and omitted.

Next, the line interval calculator 43c calculates the interval of the vertical straight lines which remain as the candidates of the vertical line. In addition, the histogram forming part 43d forms a histogram of the calculated line interval and the appearing frequency thereof. The vertical frame detector 43e excludes from the candidate of the vertical frame portion the vertical line which forms an interval greatly different from others, and detects the vertical straight line which is not excluded from the candidate of the vertical frame portion as the vertical frame portion. In the case where the block frame shown in FIG. 21A having the table format is to be subjected to the processing, for example, the vertical frame detector 43e excludes from the candidate of the vertical frame portion the vertical line which forms the interval greatly different from others out of the vertical line portions within the range between the 2 horizontal frame portions selected by the adjacent horizontal frame selector 43F, and detects the vertical straight line which is not excluded from the candidate of the vertical frame portion as the vertical frame portion.

In this embodiment, when there are 2 horizontal frame portions and only 2 vertical frame portions on the right and left, it is regarded that the frame to be extracted is the frame having the free format. However, when extracting the frame, the long straight line is difficult to detect if it is inclined, and the free format frame is divided into portions having a predetermined length as shown in FIG. 22. In addition, the number and position of the frame portions to be deleted are varied depending on the position within the free format frame to which each divided portion corresponds. In other words, if the divided portion corresponds to the left end position of the free format frame, the left, top and bottom frame portions are deleted. If the divided portion corresponds to the right end position of the free format frame, the right, top and bottom frame portions are deleted. Furthermore, if the divided portion corresponds to an intermediate position within the free format frame, only the top and bottom frame portions are deleted.

On the other hand, when the frame to be extracted is the block frame having the table format, the adjacent horizontal frame selector 43F selects 2 adjacent horizontal frame portions, and regards that rows of the block frame each having the 2 adjacent horizontal frame portions as the top and bottom frame portions overlap in the vertical direction as shown in FIG. 23. Accordingly, the processing can be made 1 row at a time, similarly to the processing of 1 block frame.

When the frame to be processed is the block frame having the irregular table format shown in FIG. 21B, the vertical frame detector 43e excludes from the candidate of the vertical frame portion the candidates of the vertical lines which have an extremely small interval (that is, are separated by an extremely short distance) compared to the character size, and detects the vertical straight line which is not excluded from the candidate of the vertical frame portion as the vertical frame portion. In addition, when the frame to be processed is the block frame having the regular table format shown in FIG. 21A, the vertical frame detector 43e excludes from the candidate of the vertical frame portion the vertical line which forms the interval greatly different from others out of the vertical line portions within the range between the 2 horizontal frame portions selected by the adjacent horizontal frame selector 43F, and detects the vertical straight line which is not excluded from the candidate of the vertical frame portion as the vertical frame portion.

Figure 24:
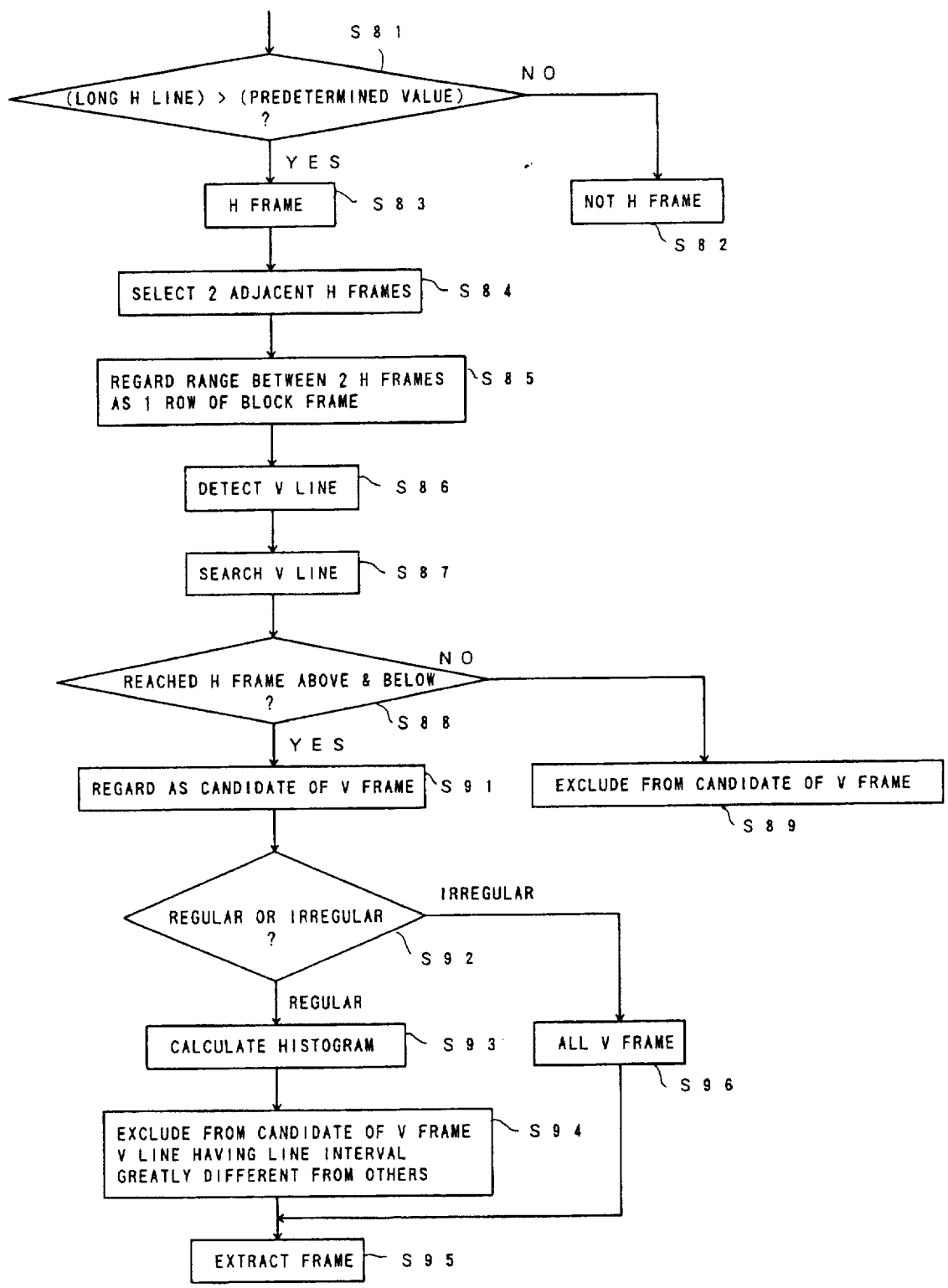
FIG. 24 is a flow chart for explaining a process of a frame detector 43 as a whole.

FIG. 24 shows a flow chart for the case where the process of the entire frame detector 43 shown in FIG. 4 is carried out by software, in order to describe an embodiment of the process of the frame detector 43 in more detail.

In FIG. 24, a step S81 decides whether or not the candidate of the straight line forming the horizontal frame portion detected by the straight line detector 42b of the straight line detector 42 has a length greater than or equal to a predetermined value. If the decision result in the step S81 is NO, a step S82 determines that the candidate of the straight line forming the horizontal frame portion is not a horizontal frame portion, and the process ends. On the other hand, if the decision result in the step S81 is YES, a step S83 detects the horizontal frame portion from the candidate of the straight line forming the horizontal frame portion. A step S84 selects 2 adjacent horizontal frame portions based on the detected horizontal frame portion. In addition, a step S85 regards a range between the 2 selected adjacent horizontal frame portions as 1 block.

Next, in order to detect the vertical frame portion, a step S86 detects the vertical line based on the candidate of the straight line forming the vertical frame portion detected by the straight line detector 42d of the straight line detector 42. In addition, a step S87 searches the vertical line segment based on the detected vertical frame portion and horizontal frame portion. A step S88 decides whether or not the straight line which is the candidate of the vertical frame portion reaches the detected horizontal frame portions located above and below. If the decision result in the step S88 is NO, a step S89 excludes the detected vertical line which is the candidate of the vertical frame portion from the candidate of the vertical frame portion, and the process ends. On the other hand, if the decision result in the step S88 is YES, a step S91 regards the detected vertical line which is the candidate of the vertical frame portion as the candidate of the vertical frame portion.

A step S92 decides whether the frame to be subjected to the processing is the block frame having the regular table format or the block frame having the irregular table format. If the frame to be subjected to the processing is the block frame having the regular frame format, a step S93 calculates the interval of the vertical lines which remain as the candidates of the vertical line, and calculates a histogram describing the relationship of the calculated line interval and the appearing frequency thereof. When the block frame having the regular table format shown in FIG. 21A is to be processed, a step S94 excludes from the candidate of the vertical frame portion the vertical line forming an interval greatly different from others, out of the vertical lines within the range between the 2 adjacent horizontal frame portions which are detected, and regards the vertical line that is not excluded from the candidate of the vertical frame portion as the vertical frame portion. A step S95 extracts the frame based on the horizontal frame portions and the vertical frame portions which are obtained in the above described manner, and the frame extraction process ends.

On the other hand, if the step S92 decides that the block frame having the irregular table format is to be processed, a step S96 regards all of the vertical lines that are candidates of the vertical frame portion as the vertical frame portion, and the process thereafter advances to the step S95.

Next, a description will be given of the frame separating part 44 shown in FIG. 4. The frame separating part 44 includes a frame intersection calculator 44a, a separating part 44B, a projection part 44c, a frame dividing part 44D, a straight line detector 44d, a frame searching part 44e, a side width calculator 44f, a frame eliminating part 44g, and a contact character interpolator 44h.

The frame intersection calculator 44a calculates the intersections of the vertical frame portion and the horizontal frame portion which are obtained from the frame detector 43. In a particular case shown in FIG. 25, the frame intersection calculator 44a calculates intersections corresponding to the intersections A1, B1, A2, B2, . . . shown in FIG. 15 described above. The separating part 44B uses the calculated intersections and divides the frame into portions surrounded on 4 sides by the frame portions, starting from the left in FIG. 25, so as to separate the portions (A1, A2, A3, A4), (B1, B2, B3, B4), . . . . If the ratio of the lengths of the horizontal line and the vertical line is less than or equal to a predetermined value as in the case of portions C1 and C2 shown in FIG. 25, each separated portion corresponds to 1 character frame.

The projection part 44c calculates the projections of each of the separated portions, and the straight line detector 44d detects the straight lines from the calculated projections. More particularly, the straight line detector 44d calculates the ratios of the projection values of each row and column of each of the separated portions and the rectangles which are obtained by approximating each of the separated portions by the rectangles, and obtains the candidates of the straight line forming the character frame based on the calculated ratios. The method of calculating the projection values will be described later in more detail in conjunction with a second embodiment of the image extraction system according to the present invention.

The frame searching part 44e calculates the distance between the straight lines from the candidates of the straight line forming the character frame, and extracts the straight line at the outermost part forming the character frame, so as to search each character frame and obtain the position of each character frame. The side width calculator 44f obtains the candidate of the straight line adjacent to the straight line at the outermost part, and calculates the line width of each side of the searched character frame. The frame eliminating part 44g eliminates the character frames one character frame at a time based on the position of the straight line at the outermost part of each side and the calculated line width of each side. The contact character interpolator 44h interpolates the character portion which drops out or chips when the character frame is eliminated. As a result, the character frame is eliminated and the characters are extracted one character at a time.

Figure 25:
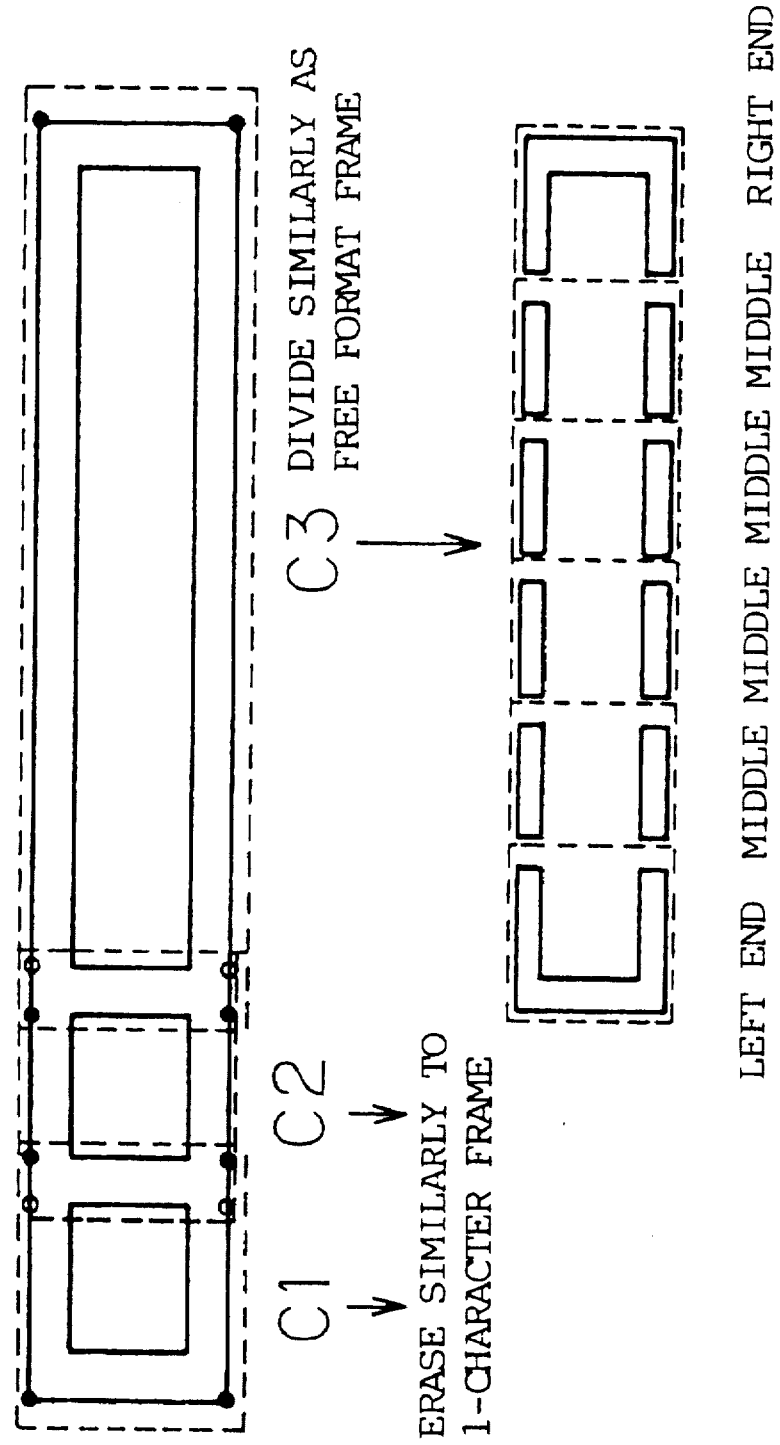
FIG. 25 is a diagram for explaining separation into rectangular portions surrounded by the frame surrounded by 4 sides of the block frame.

When the ratio of the lengths of the horizontal and vertical lines is greater than the predetermined value as in the case of a portion C3 shown in FIG. 25, the elimination of the frame portion is made by varying the number and position of the frame portion to be eliminated depending on the position of each of the separated portions as shown on the lower part of FIG. 25. More particularly, the frame dividing part 44D divides the frame into a plurality of separated portions, similarly to the case where the frame to be processed is the free format frame. In addition, the projection part 44c, the straight line detector 44d, the frame searching part 44e, the side width calculator 44f, the frame eliminating part 44g and the contact character interpolator 44h carry out the above described process with respect to each separated portion.

Figure 26:
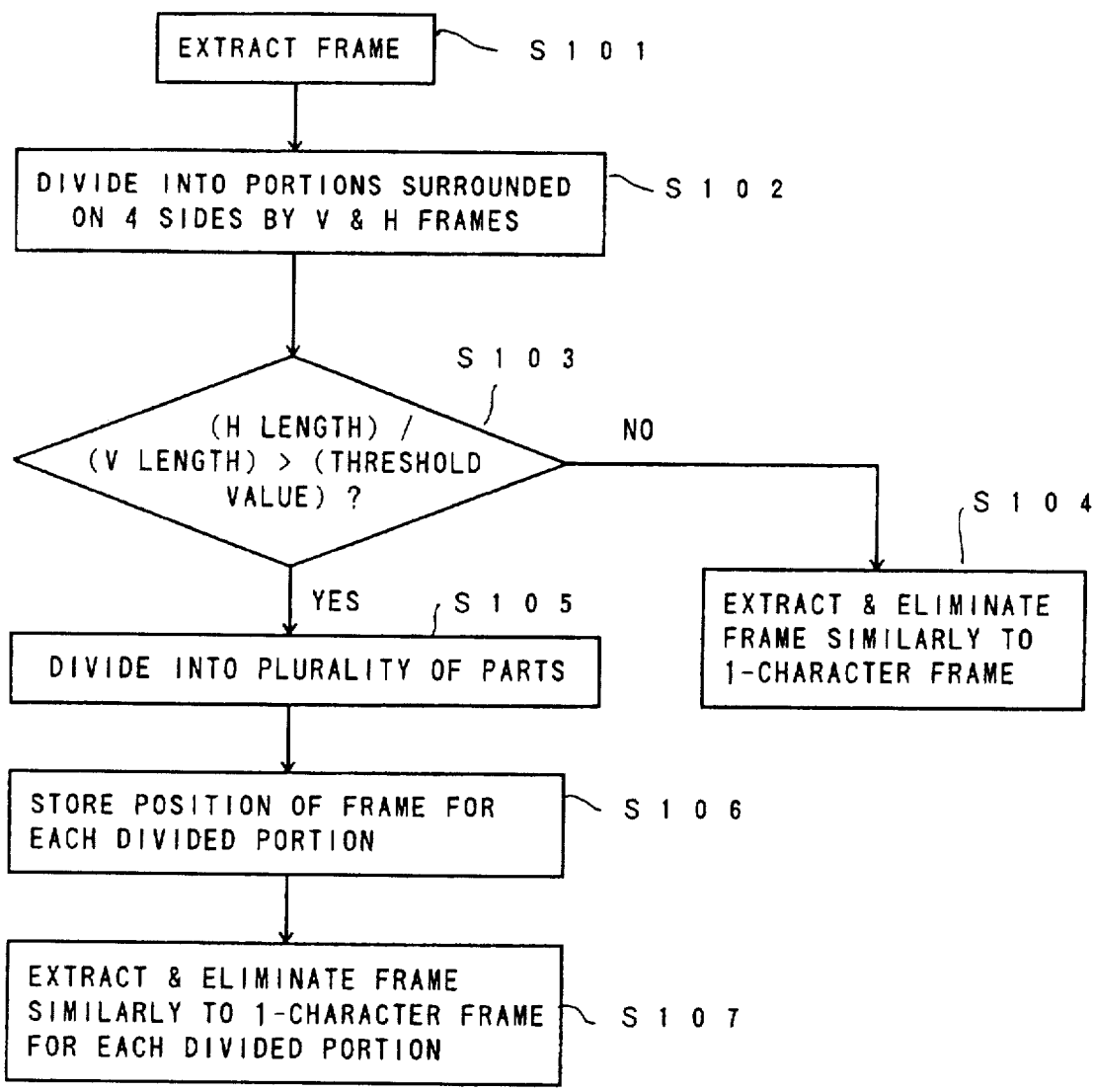
FIG. 26 is a flow chart for explaining a process of a frame separating part 44 as a whole.

FIG. 26 shows a flow chart for the case where the process of the entire frame separating part 44 shown in FIG. 4 is carried out by software, in order to describe an embodiment of the process of the frame separating part 44 in more detail.

In FIG. 26, a step S101 calculates the intersections of the vertical frame portions and the horizontal frame portions obtained from the frame detector 43. A step S102 uses the calculated intersections and separates each of the portions surrounded on 4 sides one portion at a time from the left. A step S103 decides whether or not a ratio of the lengths of the horizontal line and the vertical line is greater than a predetermined value. The decision result of the step S103 becomes NO if the ratio of the lengths of the horizontal line and the vertical line is less than or equal to the predetermined value, and each separated portion becomes similar to 1-character frame. Hence, in this case, a step S104 carries out the extraction and elimination of the frame similarly as in the case of the 1-character frame, and the frame separation process ends.

On the other hand, if the decision result in the step S103 is YES, the frame portion is deleted by varying the number and position of the frame portions to be erased depending on the position of each of the divided portions. In other words, a step S105 separates the portion surrounded by the frame portions into a plurality of separated portions, similarly to the case where the free format frame is to be processed, and a step S106 stores the position of the frame for each of the separated portions. In addition, a step S107 extracts and eliminates the frame, similarly to the case of the 1-character frame, and the frame separation process ends.

Next, a description will be given of the frame extraction and elimination part 45 shown in FIG. 4. The frame extraction and elimination part 45 includes a straight line detector 45a, a matching process part 45b, and a frame process part 45c. The straight line detector 45a integrates the line segments including the line segments which are broken at an intermediate part thereof, with respect to the partial pattern for which the search of the horizontal frame portion failed in the straight line detector 42. The matching process part 45b regards the horizontal line after the integration as the horizontal frame portion when the horizontal line after the integration has a length that is greater than or equal to a predetermined value as compared to the size of the partial pattern. In addition, out of the vertical lines between the 2 adjacent horizontal lines, the matching process part 45b regards as the candidate of the vertical frame portion those vertical lines which reach the horizontal lines located above and below. The matching process part 45b carries out a matching process between a rectangular range which is formed by the frame and the candidates of the frame obtained as described above and the 1-character frame which is within the same image and is already extracted by the 1-character frame extracting part 46, so as to extract a 1-character frame range. The frame process part 45c extracts and eliminates the frame with respect to each of the 1-character frame ranges obtained from the matching process part 45b, similarly to the extraction and elimination of the frame made with respect to the 1-character frame.

Figure 27:
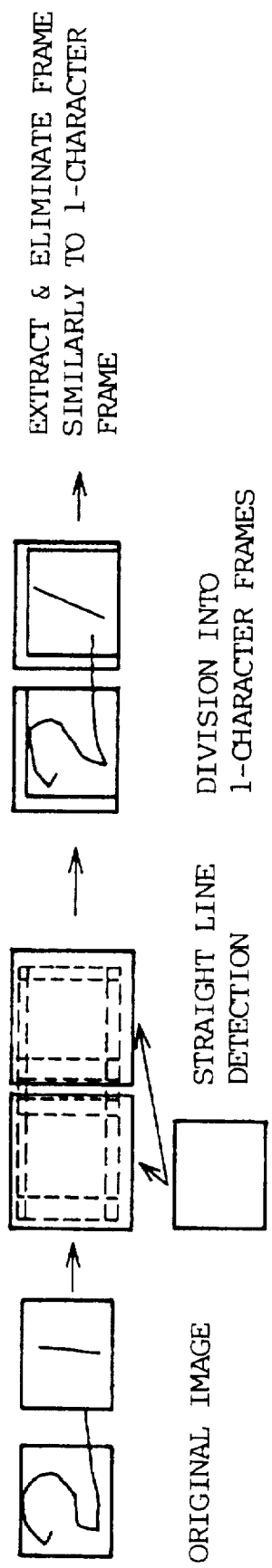
FIGS. 27A, 27B and 27C respectively are diagrams for explaining a process when adjacent 1-character frames are connected by a character.

Accordingly, even in the case where the adjacent 1-character frames are connected (or linked) by the character in the original image as shown in FIG. 27A, it is possible to satisfactorily extract and eliminate the frame. In other words, in such a case shown in FIG. 27A, it is difficult to distinguish the 1-character frame from the block frame solely from the size of the partial pattern, and for this reason, the process is carried out similarly to the case of the block frame up to the process of the line segment detector 41. In addition, since the straight line detector 42 detects from the search that the horizontal line is broken at an intermediate part thereof, this horizontal line that is broken at the intermediate part thereof will not be recognized as a straight line forming the block frame. Thus, the process advances to the process of the frame extracting and eliminating part 45, and the straight line detector 45a integrates the horizontal lines including the line segments which are broken at an intermediate part thereof, with respect to the partial pattern for which the search of the horizontal line failed in the straight line detector 42. In addition, the matching process part 45b carries out a matching with respect to the 1-character frame which is already extracted as described above, as shown in FIG. 27B. Therefore, it is possible to make the separation into the 1-character frames as shown in FIG. 27C.

Figure 28:
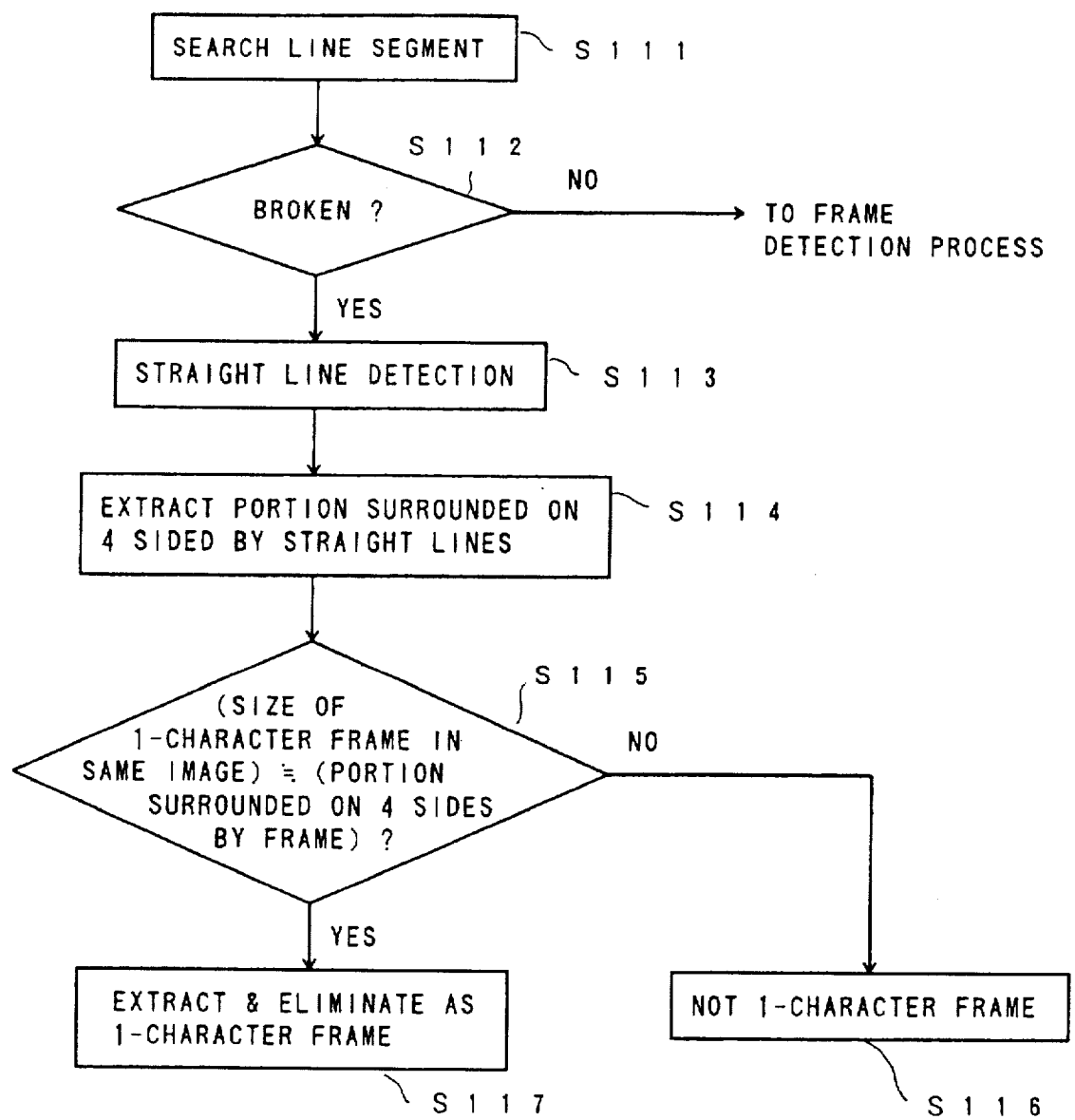
FIG. 28 is a flow chart for explaining a process of a frame extraction and elimination of part 45 as a whole.

FIG. 28 shows a flow chart for the case where the process of the entire frame extracting and eliminating part 45 shown in FIG. 4 is carried out by software, in order to describe an embodiment of the process of the frame extracting and eliminating part 45 in more detail.

In FIG. 28, a step S111 searches the line segments including the line segment that is broken at an intermediate part thereof, with respect to the partial pattern for which the search of the horizontal frame portion has failed in the straight line detector 42. A step S112 decides whether or not the line segment is broken as a result of the search. If the decision result in the step S112 is NO, the frame detection process described above in conjunction with FIG. 24 is continued. On the other hand, if the decision result in the step S112 is YES, a step S113 integrates the horizontal lines by detecting the straight lines. A step S114 extracts a portion that is surrounded by straight lines on 4 sides, and a step S115 decides whether or not the extracted portion that is surrounded by the straight lines on 4 sides has a size approximately the same as the size of the 1-character frame within the same image. If the decision result in the step S115 is NO, a step S116 determines that the portion surrounded by the straight lines on 4 sides is not a 1-character frame, and the process ends. On the other hand, if the decision result in the step S115 is YES, a step S117 recognizes that the portion surrounded by the straight lines on 4 sides as a 1-character range that is equivalent to the 1-character frame, and carries out the process of extracting and eliminating the frame similarly as in the case of the 1-character frame.

Figure 3:
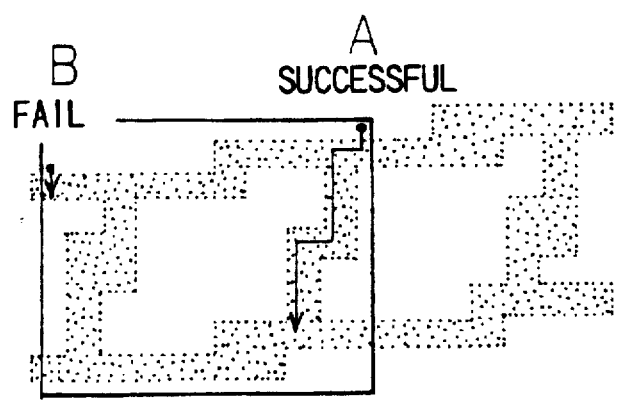
FIG. 3 is a diagram for explaining the problem introduced when searching for a line segment.
Figure 29:
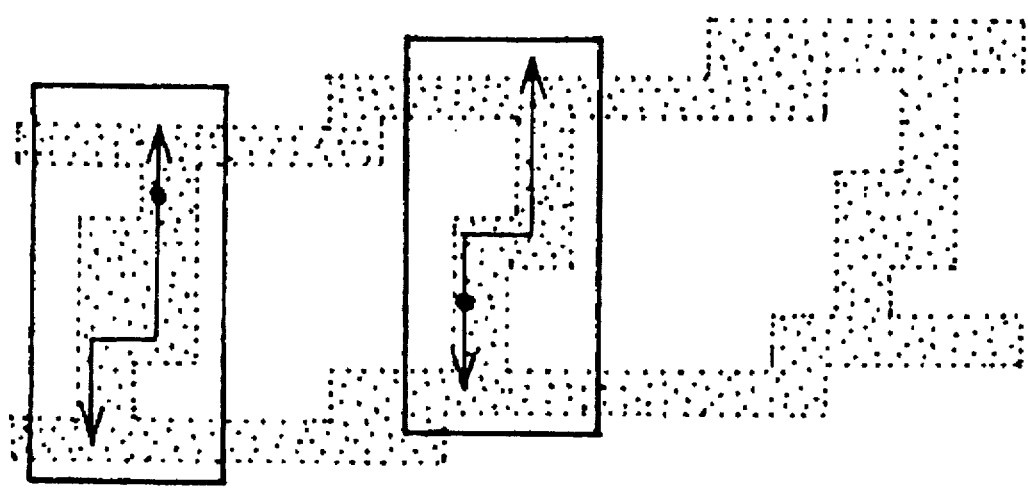
FIG. 29 is a diagram for explaining search of a line segment.

When searching the line segment by the searching part 43b within the frame detector 43, there is a possibility that the failure of the search such as that described above in conjunction with FIG. 3 occurs. Hence, when carrying out the search in the step S87 shown in FIG. 24, the narrowest portion within the rectangular line segment that is judged as being the frame is used as the starting point of the search as shown in FIG. 29, so that the success rate of the search improves. The frame shown in FIG. 29 is the same as that shown in FIG. 3, but it may be seen from FIG. 29 that the search for the line segment will be successful in the case shown in FIG. 29.

Figures 30A, 30B, 30C:
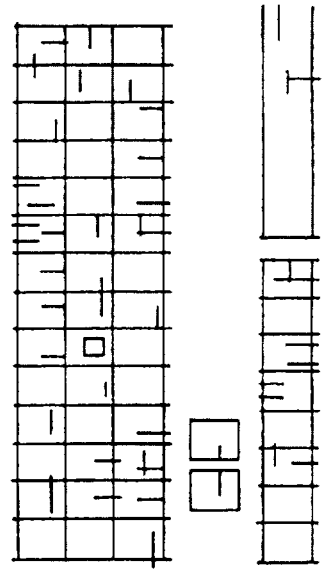
FIGS. 30A, 30B and 30C respectively are diagrams for explaining a particular example of characters extracted by the first embodiment.
Figures 31A, 31B:
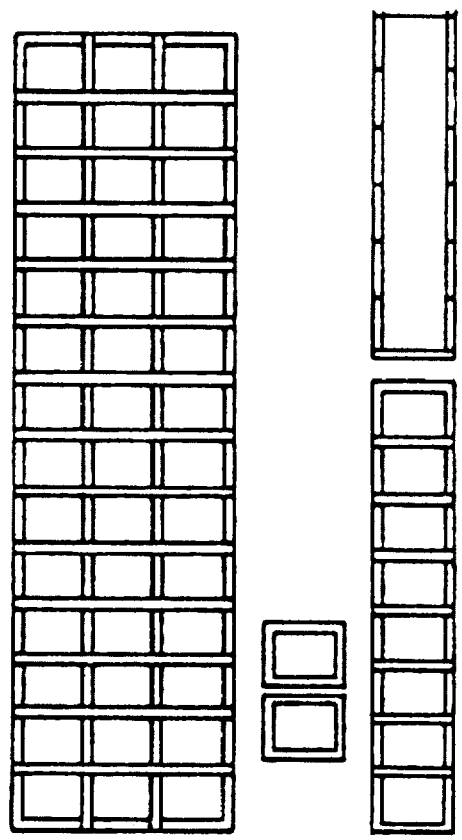
FIGS. 31A and 31B respectively are diagrams for explaining the particular example of the characters extracted by the first embodiment.

FIGS. 30A through 30C and FIGS. 31A and 31B are diagrams for explaining an example of the characters extracted in this embodiment. FIG. 30A shows the original pattern obtained from the connected pattern extracting part 46 shown in FIG. 4. FIG. 30B shows the pattern after the 1-character frames are eliminated by the 1-character frame extracting part 46 shown in FIG. 4. In addition, FIG. 30C shows the pattern after the mask process of the mask process part 41A within the line segment detector 41 shown in FIG. 4 is carried out with respect to the pattern shown in FIG. 30B. On the other hand, FIG. 31A shows the frame that is extracted by the frame eliminating part 44g of the frame separating part 44 shown in FIG. 4 based on the pattern shown in FIG. 30C. FIG. 31B shows the characters that are extracted by eliminating the frame shown in FIG. 30A by the frame eliminating part 44g.

This embodiment described heretofore is characterized by the following advantageous features 1) through 6).

1) It is possible to positively extract and eliminate the character frame even if the frame is inclined and is a block frame having the table format or a free format frame.

2) It is possible to reduce the processing time because the mask process is carried out in place of the thinning process.

3) Because the mask process is carried out in place of the thinning process, it is possible to maintain the linearity of the original image, and the detection of the straight line is therefore facilitated.

4) Out of the rectangular portions surrounded by the frame on 4 sides in the free format frame or the block frame having the table format, the portion having a ratio of the horizontal length to the vertical length greater than or equal to a predetermined value is divided into a plurality of portions. Hence, it is possible to positively extract and eliminate the same even if the frame is inclined.

5) The matching process is carried out if the search for the horizontal line fails. As a result, even if a plurality of frames are connected or linked via characters, the frames are positively separated into the ranges of the 1-character frame. For this reason, it is possible to positively extract and eliminate the frame.

6) When extracting the frame, the narrowest portion within the rectangular line segment that is detected as the frame is used as the starting point of the search for the frame. Thus, it is possible to more positively extract the frame.

Figure 32:
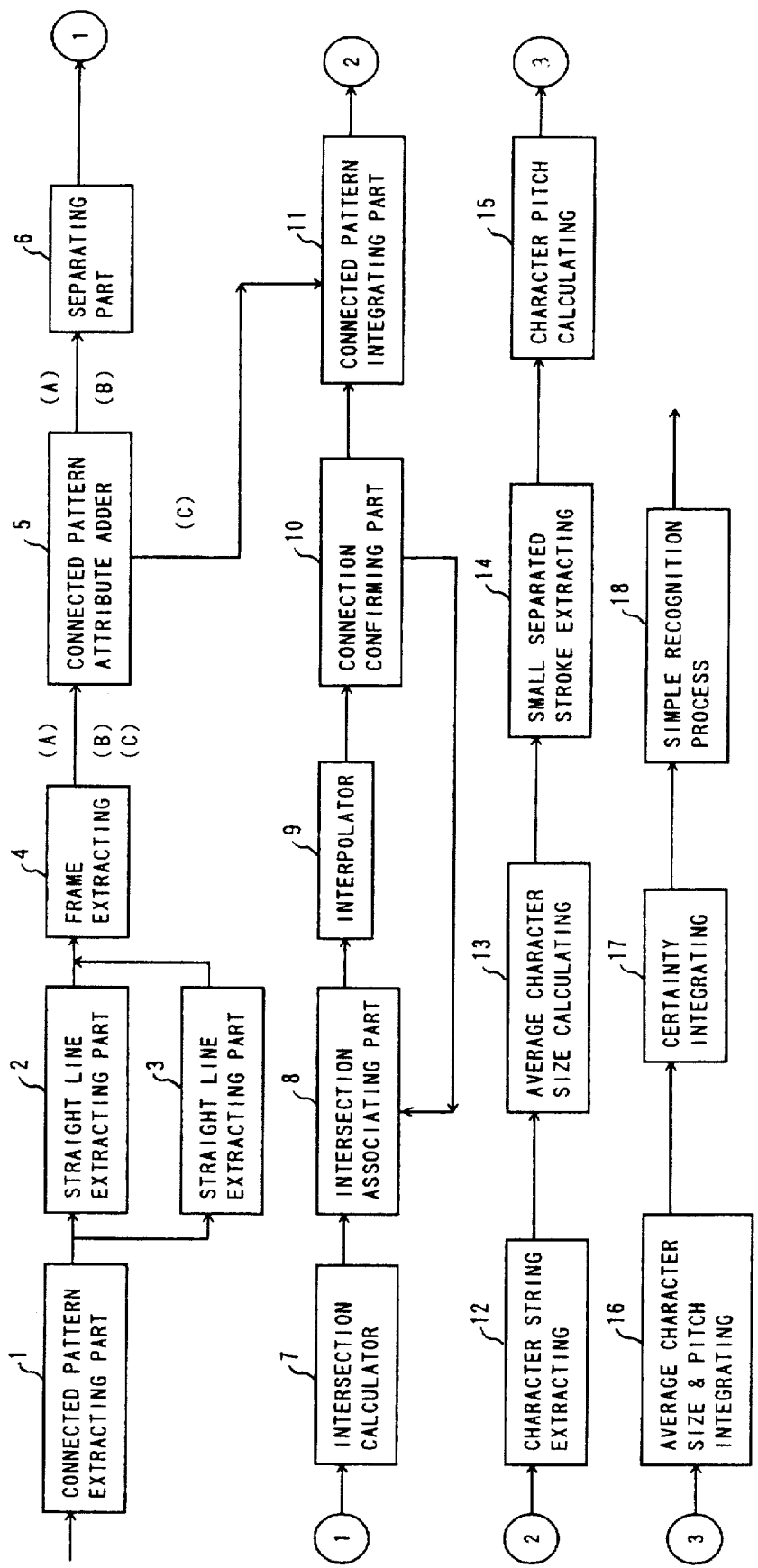
FIG. 32 is a system block diagram showing a conceivable image extraction system.

An image extraction system of the type shown in FIG. 32 was previously proposed in the U.S. patent application Ser. No. 192,592 filed Feb. 7, 1994. In FIG. 32, a connected pattern extracting part 1 extracts partial patterns of connected pixels from an image which is made up of linear portions and characters, graphics or symbols, where the straight line portion is made up of a frame, a rule or the like. A straight line extracting part 2 is provided to extract straight lines having a wide line width. In other words, the straight line extracting part 2 obtains projections of the partial patterns extracted in the connected pattern extracting part 1, and extracts for each partial pattern a straight line such as the frame and rule having a wide line width corresponding to the vertical and horizontal lengths of the size of the connected pattern. A straight line extracting part 3 is provided to extract straight lines having a narrow line width. In other words, the straight line extracting part 3 extracts the straight lines such as the frame and rule not extracted by the straight line extracting part 2. A frame extracting part 4 extracts 4 sides forming the frame from a plurality of straight lines which are extracted. In other words, the frame extracting part 4 extracts the frame by obtaining the straight lines on the outermost part of the partial pattern out of the straight lines which are extracted by the straight line extracting part 2 or the straight line extracting part 3. A connected pattern attribute adder 5 checks whether or not a straight line such as the frame and rule exists in the connected pattern, and if no such straight line exists, the connected pattern attribute adder 5 adds an attribute of a pattern (C) which is formed by a character, a graphic, a symbol, or a portion thereof. In addition, depending on whether or not the partial pattern of the character, graphic, symbol or a portion thereof exists after the straight line such as the frame and rule is separated, the connected pattern attribute adder 5 adds an attribute of a pattern (B) of the straight line such as the frame and rule or a pattern (A) of a pattern of the character, graphic, symbol or a portion thereof touching the straight line such as the frame and rule.

A separating part 6 calculates the width of the straight line such as the frame and rule, and separates the straight line such as the frame and rule from the connected pattern. An intersection calculator 7 calculates intersections where the straight line such as the frame and rule touches the character, graphic or symbol. An intersection associating part 8 associates the intersections based on conditions such as the continuity of the line segments based on the distances among the line segments forming the character, graphic or symbol and the directions of the line segments. An interpolator 9 interpolates the region of the character, graphic or symbol within the straight line such as the frame and rule, by connecting the intersections which are associated in the intersection associating part 8. A connection confirming part 10 confirms the connection of the pattern by conversely using the information which indicates that the pattern obtained in the interpolator 9 is originally connected.

In this specification, "associating" 2 intersections, for example, means that the 2 intersections are regarded as forming a related pair, that is, regarded as corresponding or linked intersections.

When the connection cannot be confirmed in the connection confirming part 10, the process returns to the process of the intersection associating part 8 so as to make the association by expanding the conditions for associating the intersections. In addition, the interpolating part 9 carries out the interpolation with respect to the associated intersections, and the connection confirming part 10 confirms the connection again. A connected pattern integrating part 11 integrates (joins or connects into one) the patterns (C) which are respectively formed by the character, graphic, symbol or a portion thereof, and extracts the character, graphic or symbol. In addition, the connected pattern integrating part 11 integrates the patterns of the characters, graphics or symbols interpolated in the interpolator 9 and the above patterns (C) by taking into consideration the size when the integration of the patterns is made.

Accordingly, the straight line such as the frame and rule is positively eliminated from the image which is made up of the linear portion such as the frame and rule and the character, graphic or symbol, and the eliminated portion is accurately interpolated, so that the character, graphic or symbol of a high quality is extracted. For this reason, it is possible to considerably improve the recognition rate of the character, graphic, symbol and the like in a character recognition apparatus or the like.

In addition to the elements 1 through 11 shown in FIG. 32, it is conceivable to provide elements 12 through 18 shown on the lower half of FIG. 32.

In FIG. 32, a character string extracting part 12 extracts a character string that is labeled and is obtained via the connected pattern integrating part 11. An average character size calculator 13 calculates an average character size based on the extracted character string. A small separated stroke extracting part 14 extracts a small separated stroke using the average character size, an area condition and a height condition. A character pitch calculator 15 calculates an average character pitch by using a distance between externally touched rectangles as the pitch, with respect to those that are not judged as being the small separated stroke. An average character size and pitch integrating part 16 integrates the character based on information related to the extracted small separated stroke, the average character pitch, the average character size, the size dispersion value and the like. A certainty integrating part 17 calculates distances between the extracted small separated stroke and character patterns located on the right and left thereof, and quantifies a ratio of these distances as a certainty of the integration, so that the integration is made when the certainty is high. In addition, a simplified recognition process part 18 carries out a process for the hand-written character (or numerals) having an overhang. In other words, the simplified recognition process part 18 integrates the character by simply identifying the line density, the inclination and the character size with respect to the patterns located at the small separated stroke and on the right and left thereof as well as the patterns obtained when such patterns are integrated.

Figure 33B:
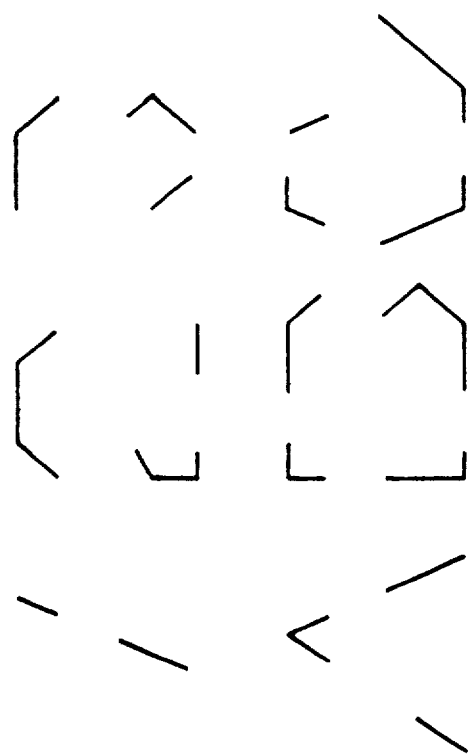
FIGS. 33A and 33B respectively are diagrams for explaining a process for a case where the frame width is considerably larger than the character width.
Figure 33A:
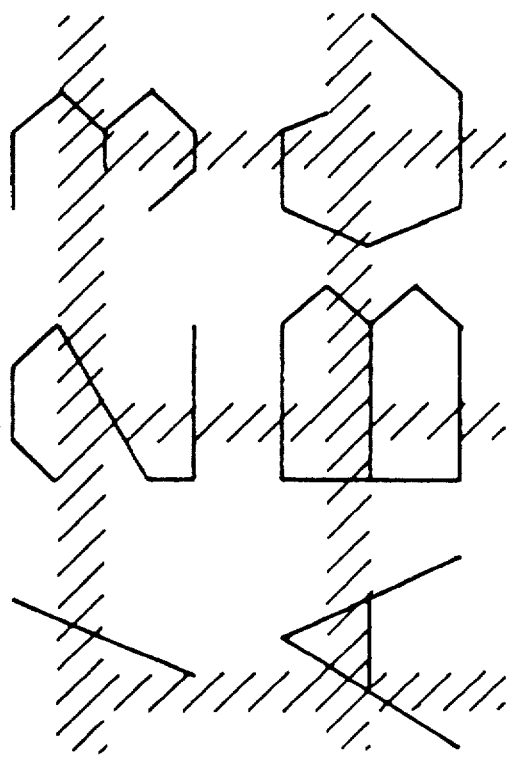
Figure 34B:
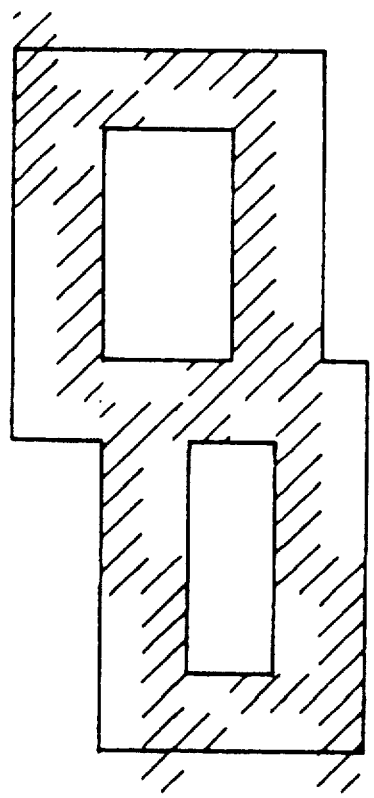
Figure 34A:
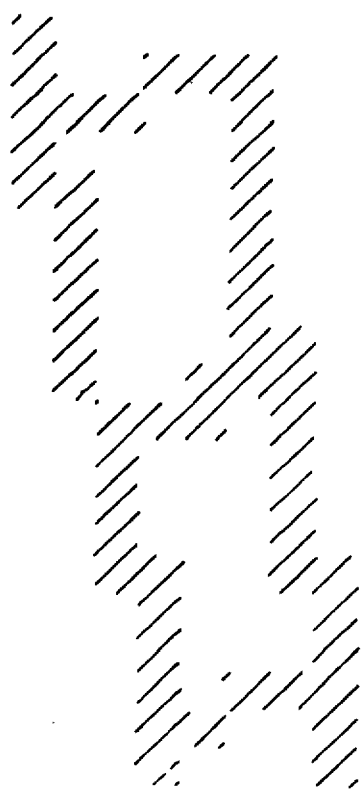

However, according to the image extraction system shown in FIG. 32, the intersections of the character and the frame are calculated and associated after elimination of the frame. For this reason, if the frame width is considerably larger than the character width of the character touching the frame as shown in FIG. 33A or, if the frame is inclined as shown in FIG. 34A, the information related to the character becomes extremely reduced. In the case shown in FIG. 33A, the information related to a large portion of the character will be lost as may be seen from FIG. 33A. On the other hand, in the case shown in FIG. 34A, the extracted frame occupies a region greater in the horizontal and/or vertical directions as compared to the region originally occupied by the frame, as may be seen from FIG. 34B. Hence, the information related to a large portion of the character will be lost in the case shown in FIG. 34B, similarly to the case shown in FIG. 33B. In FIGS. 33A, 33B, 34A and 34B, the frame is indicated by the hatching.

Accordingly, the cases shown in FIGS. 35B, 36B, 37B and 38B occur by the sole use of the conditions employed in the intersection associating part 8 shown in FIG. 32. FIGS. 35A, 36A, 37A and 38A show the original images, and FIGS. 35B, 36B, 37B and 38B show the characters that are finally extracted from the corresponding original images shown in FIGS. 35A, 36A, 37A and 38A by the association of the intersections made in the intersection associating part 8 shown in FIG. 32.

In other words, if the numeral "1" is separated to the right and left by the frame in the original image as shown in FIG.

35A, the intersections cannot be associated in the intersection associating part 8, and the character extracted by the association of the intersections in the intersection associating part 8 becomes as shown in FIG. 35B. In this case, the numeral "1" cannot be extracted. In FIG. 35A, the black circular marks indicate the intersections of the frame and the character.

If the numerals "1" and "7" are actually not connected in the original image as shown in FIG. 36A but the intersection associating part 8 makes an erroneous association of the intersections and calculates the intersections of the frame and the characters, and the extracted characters become as shown in FIG. 36B. In this case, the numerals "1" and "7" cannot be extracted. In FIG. 36A, the black circular marks indicate the intersections of the frame and the characters.

Figure 37B:
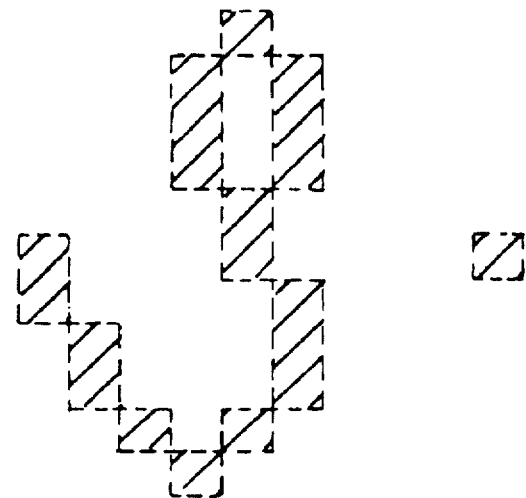
FIGS. 37A and 37B respectively are diagrams for explaining an example of an erroneous association of a numeral "9"
Figure 37A:
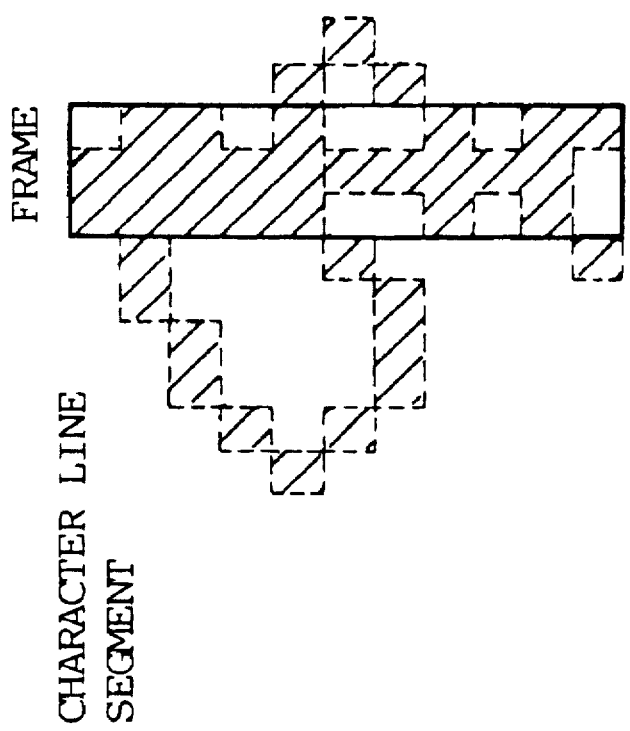

On the other hand, if the association of the intersections is erroneously made in the intersection associating part 8 with respect to the original image shown in FIG. 37A including the numeral "9", the extracted character becomes as shown in FIG. 37B.

Figure 38B:
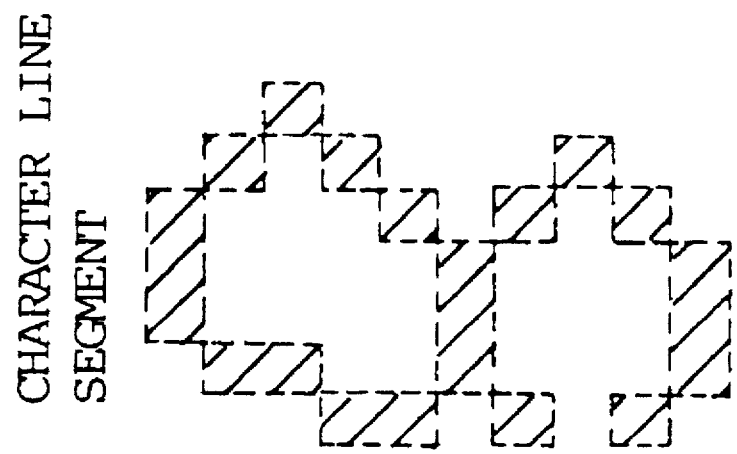
FIGS. 38A and 38B respectively are diagrams for explaining an example where no re-interpolation is made with respect to a numeral "8"
Figure 38A:
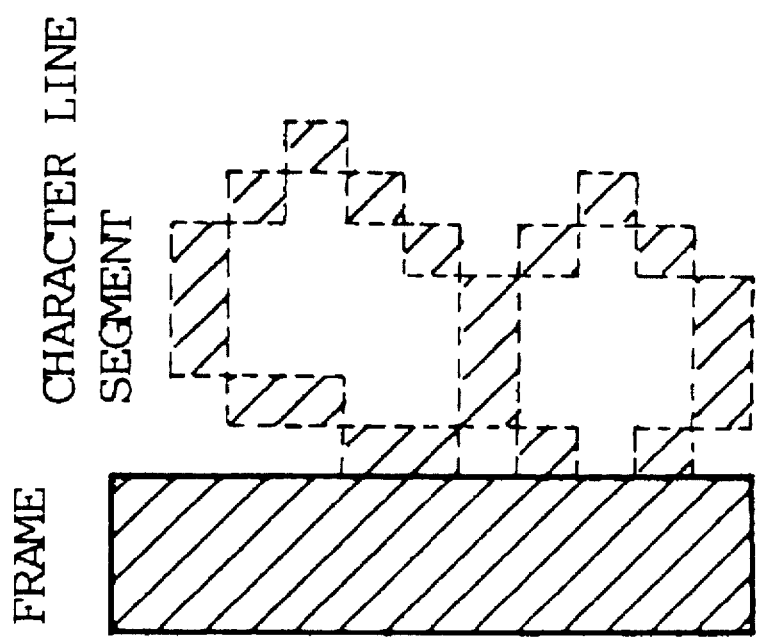

In addition, the associating conditions are insufficient if the connection is merely confirmed. In other words, with respect to the original image (pattern) shown in FIG. 38A which includes the numeral "8" and is confirmed of the connection after separation of the frame, the extracted character becomes as shown in FIG. 38B and the portion of the numeral "8" overlapping the frame is not interpolated even after the re-connection.

Next, a description will be given of a second embodiment of the image extraction system according to the present invention, by referring to FIGS. 39 and 40. In this embodiment, the present invention is applied to the process of extracting characters from a form sheet having black frames. In other words, there exist a plurality of character frames which are separated into rectangular portions forming 1-character frames with unknown size and position, and hand-written characters are made to touch the character frame or to project outside the character frame. This embodiment extracts only the character portions 1 character at a time from the pattern formed by the characters and the character frames.

In this embodiment, the image extraction system includes a connected pattern extracting part 21, a straight line/frame extracting part 22, a connected pattern attribute adder 23, a contact frequency calculator 51, a frame separating part 24, and intersection calculators 25-1 and 25-2 shown in FIG. 39, and also intersection associating parts 55 and 61, a frame interior character extracting part 56, a frame interior character interpolator 32, character string extracting parts 12-1 and 12-2, average character size and pitch integrating parts 16-1 and 16-2, plural continuity confirming parts 57-1 and 57-2, a connected pattern integrating part 34, a re-interpolation judging part 63, an average character size and pitch integrating part 16-3, a certainty integrating part 17, and a simplified recognition process part 18 shown in FIG. 40. The 3-intersection calculator 25-1 includes a character/frame intersection calculator 25a, an intersection calculator 52-2 for the frame interior character, an intersection calculator 53-1 for the frame exterior character, and a character/frame intersection judging part 54-1. The 2-intersection calculator 25-2 includes a character/frame intersection calculator 25a, an intersection calculator 53-2 for the frame exterior character, and a character/frame intersection judging part 54-2.

In FIG. 39, the connected pattern extracting part 21 includes a labeling part which extracts a pattern having a 8-connection from a prepared input pattern signal by using a labeling. The pattern having the "8-connection" is defined as a pattern having a connection (or link) in any one of 8 directions which include the vertical, horizontal and oblique (or diagonal) directions. A general technique may be used for the above labeling. In this embodiment, the partial pattern obtained by the labeling part is one of a frame which does not touch a character, a character or a portion thereof which does not touch a frame, or a character which touches the frame. In order to distinguish these partial patterns and to focus the attention to only the character touching the frame, the frame is extracted. In addition, since the size of the partial pattern obtained by the labeling is required for a process which will be described later, corner coordinates of the rectangle which are obtained by approximating the partial pattern by the rectangle are calculated during the labeling process.

Figure 41:
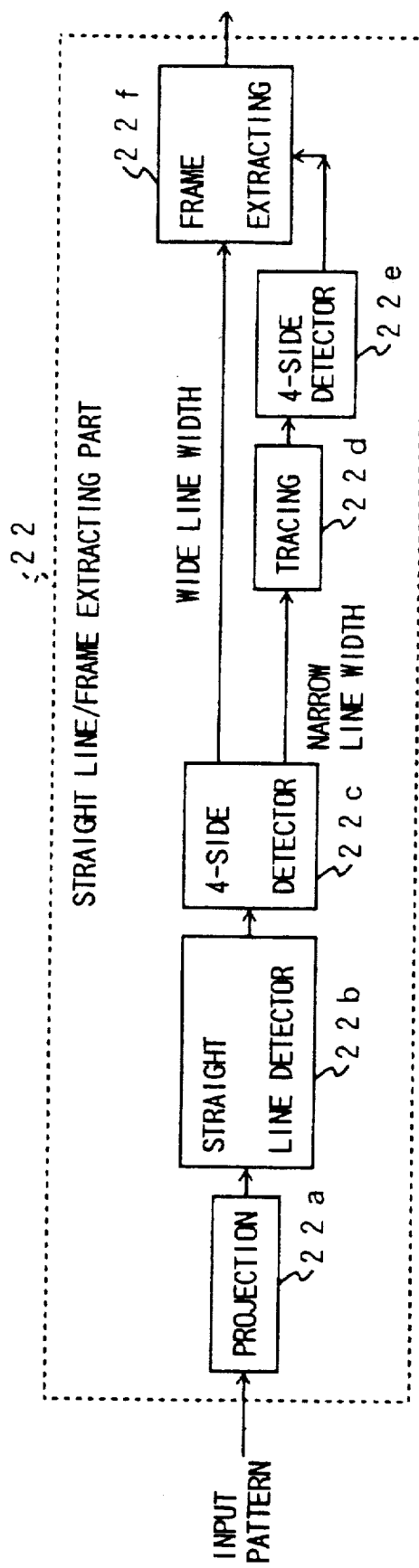
FIG. 41 is a system block diagram showing an embodiment of a straight line/frame extracting part 22.

The straight line/frame extracting part 22 extracts the straight line/frame having the wide line width and the straight line/frame having the narrow line width. As shown in FIG. 41, the straight line/frame extracting part 22 includes a projecting part 22a, a straight line detector 22b, a 4-side detector 22c, a tracing part 22d, a 4-side detector 22e and a frame extracting part 22f.

The projecting part 22a projects the partial pattern which is extracted by the connected pattern extracting part 21 in the horizontal and vertical directions. The straight line detector 22b detects horizontal lines from horizontal projections in the horizontal direction obtained in the projecting part 22a and detects vertical lines from vertical projections in the vertical direction obtained in the projecting part 22a. The 4-side detector 22c detects the 4 sides of the rectangle which is made up of the straight lines detected in the straight line detector 22b. The tracing part 22d traces the lines using an "n-line run length" which will be described later, in order to obtain straight lines which have the narrow width and are not detectable by the straight line detector 22b and the 4-side detector 22c. The 4-side detector 22e detects the 4 sides of the rectangle which is made up of the straight lines having the narrow width obtained in the tracing part 22d. The frame extracting part 22f extracts the frame based on the rectangles obtained in the 4-side detectors 22c and 22e.

The connected pattern attribute adder 23 includes an attribute adder. With respect to the connected pattern which is extracted in the connected pattern extracting part 21, the attribute adder adds the attribute of the "frame", "character pattern or a portion thereof" and "a contact pattern of the frame and the character pattern or a portion of the character pattern (hereinafter also referred to as a contact character pattern)" based on the result of the extraction made in the straight line/frame extracting part 22.

The contact frequency calculator 51 calculates a contact frequency from the widths of the frame and character and the degree of contact between the character and frame. The contact frequency is small if the character width is greater than the frame width and the contact between the character and the frame is relatively small in number. On the other hand, the contact frequency is large if the character width and the frame width are approximately the same or, the contact between the character and the frame is relatively large in number. When the contact frequency is small, the intersections of the character and the frame are calculated by the 2-intersection calculator 25-2 after separating the frame in the frame separating part 24. On the other hand, when the contact frequency is large, the intersections of the character and the frame are calculated in the 3-intersection calculator 25-1.

Figure 42:
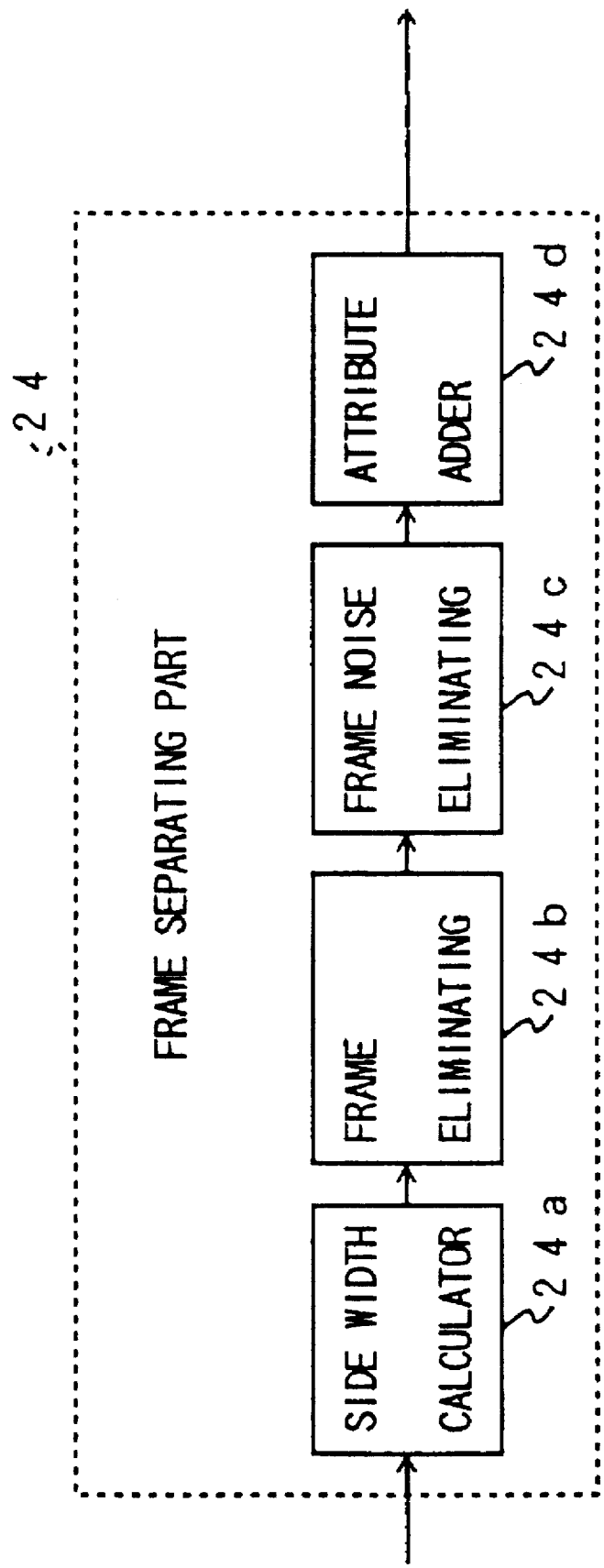
FIG. 42 is a system block diagram showing an embodiment of a frame separating part 24.

In addition, the frame separating part 24 separates the frame from the connected pattern which is added with the attribute of the frame or the contact pattern of the character and frame in the connected pattern attribute adder 23. As shown in FIG. 42, the frame separating part 24 includes a side width calculator 24a for calculating the width of the sides of the frame portion, a frame eliminating part 24b for eliminating the frame, a frame noise eliminating part 24c for labeling again the pattern which is eliminated of the frame so as to eliminate the pattern having a small area as noise, and an attribute adder 24d. Out of the patterns which are not added with the attribute in the connected pattern attribute adder 23, the attribute adder 24d adds the attribute of the contact character pattern to the pattern which remains even after the elimination of the frame, and adds the attribute of the frame (only) to the pattern which does not remain after the elimination of the frame.

When the contact frequency is large, the frame is not separated, and a character/frame intersection calculator 25a within the 3-intersection calculator 25-1 calculates the intersections of the frame and the character for the contact character pattern. A frame interior character intersection calculator 52-1 calculates the intersections inside the frame by searching the character line segment from each position towards the inside of the frame with respect to all of the intersections of the character and the frame. At the same time, the frame interior character intersection calculator 52-1 obtains the area of this searched character line segment. If the character line segment is broken during the search of the character line segment, it is judged that the calculated intersection is not an intersection of the character and the frame.

Next, a frame exterior character intersection calculator 53-1 calculates the intersections outside the frame by searching the character line segment to a certain extent and including the frame width from each position towards the outside of the frame with respect to all of the intersections of the character and the frame. At the same time, the frame exterior character intersection calculator 53-1 obtains the area of this searched character line segment. The direction towards the outside of the frame is the direction opposite to the direction towards the inside of the frame. In addition, the intersection outside the frame refers to the intersection which is distant from the frame.

If a sum of the areas of the character line segments obtained in the frame interior intersection calculator 52-1 and the frame exterior intersection calculator 53-1 is less than or equal to a predetermined threshold value, a character/frame intersection judging part 54-1 regards the line segments as noise and eliminates these character line segments. In addition, the character/frame intersection judging part 54-1 judges that the intersection obtained is not an intersection of the character and the frame.

On the other hand, when the contact frequency is small, the 2-intersection calculator 25-2 calculates the intersections after separating the frame in the frame separating part 24. A character/frame intersection calculator 25a within the 2-intersection calculator 25-2 calculates the intersections of the frame and the character for the contact character pattern. A frame exterior character intersection calculator 53-2 calculates the intersections outside the frame by searching the character line segment to a certain extent and including the frame width from each position towards the outside of the frame with respect to all of the intersections of the character and the frame. At the same time, the frame exterior character intersection calculator 53-2 obtains the area of this searched character line segment. If the area of the character line segments obtained in the frame exterior intersection calculator 53-2 is less than or equal to a predetermined threshold value, a character/frame intersection judging part 54-2 regards the line segment as noise and eliminates this character line segment. In addition, the character/frame intersection judging part 54-2 judges that the intersection obtained is not an intersection of the character and the frame.

When the contact frequency is large and the calculation of the intersections is made in the 3-intersection calculator 25-1, the intersections are associated in the 3-intersection associating part 55 shown in FIG. 40. On the other hand, when the contact frequency is small and the calculation of the intersections is made in the 2-intersection calculator 25-2, the intersections are associated in the 2-intersection associating part 61 shown in FIG. 40.

The 3-intersection associating part 55 obtains the direction of the character line segment based on the 3 kinds of intersections obtained in the 3-intersection calculator 25-1, namely, the intersection that is distant from the frame, the intersection of the character and the frame, and the intersection inside the frame. In addition, the 3-intersection associating part 55 associates the intersections of the character and the frame under conditions such as the direction and the continuity of the character line segments based on the direction and the distance among the character line segments at the intersections inside the frame. The frame interior character extracting part 56 extracts from the frame the character line segment connecting the corresponding intersections of the character and the frame. The character string extracting part 12-1 extracts the character string which is labeled and is obtained via the frame interior character extracting part 56. The average character size and pitch integrating part 16-1 temporarily integrates the character based on the information such as the extracted small separated stroke, the average character pitch, the average character size and the size dispersion value. The plural continuity confirming part 57-1 confirms the continuity based on the number of connected line segments, the number of holes, the Euler number and the like, and the process advances to the process of the connected pattern integrating part 34 when the continuity is confirmed. However, when the continuity cannot be confirmed, the process returns to the process of the 3-intersection associating part 55 to associate the intersections so that the continuity is restored, and furthermore, an interpolation process is carried out by the frame interior character interpolator 32. This interpolation process of the frame interior character interpolator 32 interpolates the character region inside the frame by connecting the associated intersections and the like so as to connect the character patterns which are separated when the character frame is eliminated. The process advances to the process of the connected pattern integrating part 34 after the process of this frame interior character interpolator 32 ends.

The 2-intersection associating part 61 obtains the direction of the character line segment based on the 2 kinds of intersections obtained in the 2-intersection calculator 25-2, namely, the intersection of the character and the frame, and the intersection inside the frame. In addition, the 2-intersection associating part 61 associates the intersections of the character and the frame under conditions such as the direction and the continuity of the character line segments based on the direction and the distance among the character line segments at the intersections inside the frame. The frame interior character interpolator 32 carries out an interpolation process to connect the character patterns which are separated by the elimination of the character frame, by connecting the associated intersections and the like. The character string extracting part 12-2 extracts the character string which is labeled and is obtained via the frame interior character interpolator 32. The average character size and pitch integrating part 16-2 temporarily integrates the character based on the information such as the extracted small separated stroke, the average character pitch, the average character size and the size dispersion value. The plural continuity confirming part 57-2 confirms the continuity based on the number of connected line segments, the number of holes, the Euler number and the like, and the process advances to the process of the connected pattern integrating part 34 when the continuity is confirmed. However, when the continuity cannot be confirmed, the process returns to the process of the 2-intersection associating part 61 to associate the intersections so that the continuity is restored, and furthermore, an interpolation process is carried out by the frame interior character interpolator 32. The interpolation process of the frame interior character interpolator 32 interpolates the character region inside the frame by connecting the associated intersections and the like so as to connect the character patterns which are separated when the character frame is eliminated. The process advances to the process of the connected pattern integrating part 34 after the process of this frame interior character interpolator 32 ends.

The re-interpolation judging part 63 judges whether or not the re-interpolated character pattern exists, and the process advances to the certainty integrating part 17 when no re-interpolated character pattern exists. On the other hand, when the re-interpolated character pattern exists, the average character size and pitch integrating part 16-3 finally calculates the average character size and pitch and integrates the character, before the process advances to the process of the certainty integrating part 17. The certainty integrating part 17 calculates the distances between the extracted small separated stroke and the character patterns located on the right and left thereof, and quantifies a ratio of these distances as the certainty of the integration, so that the integration is made when the certainty is high. In addition, the simplified recognition process part 18 carries out the process for the hand-written character (or numerals) having the overhang. In other words, the simplified recognition process part 18 integrates the character by simply identifying the line density, the inclination and the character size with respect to the patterns located at the small separated stroke and on the right and left thereof as well as the patterns obtained when such patterns are integrated.

The frame interior character interpolator 32 connects the intersections and the like associated in the intersection associating part 55 or 61, and connects the character patterns that are separated by the elimination of the character frame. The frame interior character interpolator 32 includes a simple interpolator 32a, a cross-point calculator 32b, a cross-point frame interior interpolator 32c, a cross-point frame exterior interpolator 32d, and a straight line interpolator 32e. The simple interpolator 32a carries out the interpolation by connecting the intersections having the one-to-one association. The cross-point calculator 32b calculates the cross-point of direction vectors of the contours of the character line segment at the intersection, for the intersections which have the one-to-many association and the intersections which are re-associated. The cross-point frame interior interpolator 32c connects the intersections when the obtained cross-point falls within the line width of the frame. The cross-point frame exterior interpolator 32d connects the intersections when the obtained cross-point falls outside the line width of the frame. The straight line interpolator 32e interpolates the character line segment along the frame by a straight line when the cross-point cannot be calculated.

The connected pattern integrating part 34 integrates the character patterns for which the continuity is confirmed or the character patterns which are added with the attribute of the character patterns in the connected pattern attribute adder 23 shown in FIG. 39. As shown in FIG. 34, the connected pattern integrating part 34 includes a connected pattern provisional integrating part 34a, a size confirming part 34b, and a connected pattern integrating part 34c. The connected pattern provisional integrating part 34a provisionally integrates the connected patterns. The size confirming part 34b confirms the size of the provisionally integrated character pattern. The connected pattern integrating part 34c further integrates the connected patterns if the size of the character pattern confirmed in the size confirming part 34b is not appropriate.

Next, a description will be given of a character extracting process of this embodiment.

(1) Extraction of the Connected Patterns:

The input pattern which is input to the connected pattern extracting part 21 shown in FIG. 39 is already subjected to the preparations such as correction of extreme inclination or rotation, elimination of noise, and filling of gaps caused by grazing. With respect to this input pattern, the labeling part within the connected pattern extracting part 21 selects the candidates for the contacting character regardless of the position of the frame, and thus, the pattern which is connected in one of the 8 directions including the vertical, horizontal and oblique directions is extracted by the labeling. The partial pattern which is obtained by such a labeling is one of (A) a frame which is not touched by the character, (B) a character which does not touch the frame or a portion of such a character, and (C) a character touching the frame.

The size of the partial pattern obtained by the labeling becomes necessary in the latter process. Hence, the corner coordinates of the rectangle which is obtained by approximating the partial pattern by the rectangle are obtained when carrying out the labeling process.

(2) Extraction of the Frame:

In order to focus the attention on only those characters touching the frame out of the connected patterns which are extracted as described above, the frame extracting part 22 extracts the frame. When extracting the frame, it is in general necessary that the extraction frequency is high and the extraction speed is high. Hence, the straight line/frame having the wide line width is first extracted, and if no extraction is possible, the straight line/frame having the narrow line width is next extracted.

(2a) Extraction of the Straight Line/Frame Having the Wide Line Width:

It is necessary that the frame can be extracted stably even when the size of the frame is unknown and the character touches the frame. For this reason, the projecting part 22a of the frame extracting part 22 shown in FIG. 39 obtains the projection for every partial pattern which is obtained by the labeling. Then, the straight line detector 22b calculates a ratio of the projection values and the vertical and horizontal sizes which are obtained by approximating the partial pattern into the rectangle, and judges that the partial pattern is a long straight line when this ratio is greater than or equal to a predetermined threshold value.

This straight line may not only be the frame but also the stroke of the character. For this reason, the straight line which is obtained should desirably be the straight line at the outermost part and corresponding to the 4 sides which most satisfy the rectangular shape.

Figure 45:
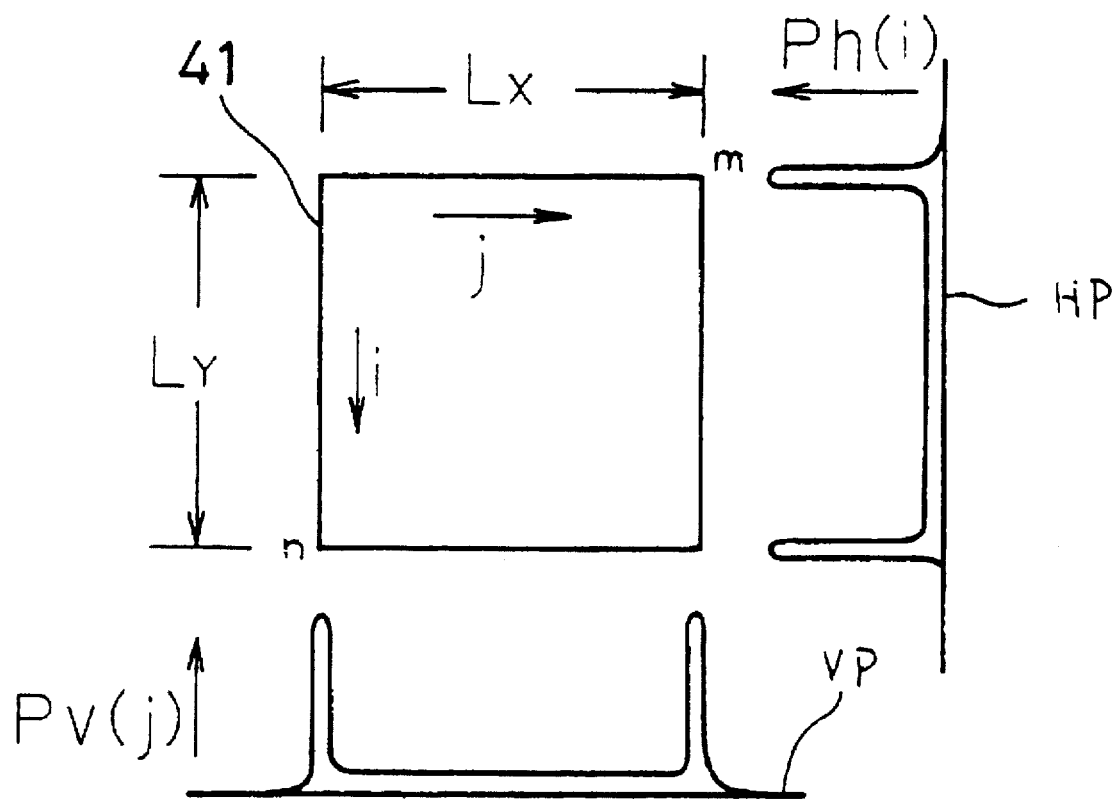
FIG. 45 is a diagram showing projections of a partial pattern in horizontal and vertical directions.

FIG. 45 is a diagram showing the horizontal and vertical projections of the partial pattern which is obtained by the labeling in the connected pattern extracting part 21 in the horizontal and vertical directions. In FIG. 45, a partial pattern 41 which is obtained by the labeling has a length $L_x$ in the horizontal direction and a length $L_y$ in the vertical direction. In addition, this partial pattern 41 includes a vertical projection VP in the vertical direction and a horizontal projection HP in the horizontal direction.

For the sake of convenience, it will be assumed that the image has a size of m columns by n rows, and the density value at a coordinate (i, j) is denoted by f(i, j), the horizontal projection of the i-th row is denoted by Ph(i), and the vertical projection of the j-th column is denoted by Pv(j). In this case, the horizontal projection Ph(i) and the vertical projection Pv(j) can respectively be described by the following formulas (2) and (3).

$$Ph(i) = \sum_{j=1}^{m} f(i, j) \qquad (2)$$

$$Pv(j) = \sum_{i=1}^{n} f(i, j) \qquad (3)$$

The straight line detector 22b obtains a ratio of the horizontal length $L_x$ and the horizontal projection Ph(i) and a ratio of the vertical length $L_y$ and the vertical projection Pv(j) using the horizontal and vertical lengths $L_x$ and $L_y$ of the rectangle in the rectangular coordinate of the partial pattern which is obtained in the connected pattern extracting part 21. In addition, the straight line detector 22b compares these ratios with a predetermined threshold value $TH_L$ as shown by the following formulas (4) and (5).

$$[Ph(i)/L_x] \geq TH_L \qquad (4)$$

$$[Pv(j)/L_y] \geq TH_L \qquad (5)$$

If the ratios in the formulas (4) and (5) are greater than or equal to the predetermined threshold value $TH_L$, it is regarded that the partial pattern is a candidate of the straight line which forms the frame. In other words, when the extracted partial pattern is a rectangle as shown in FIG. 45, the horizontal projection Ph(i) and the vertical projection Pv(j) of this straight line portion become maximum, and the ratios with the horizontal and vertical lengths $L_x$ and $L_y$ also become large. Hence, it is possible to discriminate the straight line portion using the formulas (4) and (5).

Figure 46:
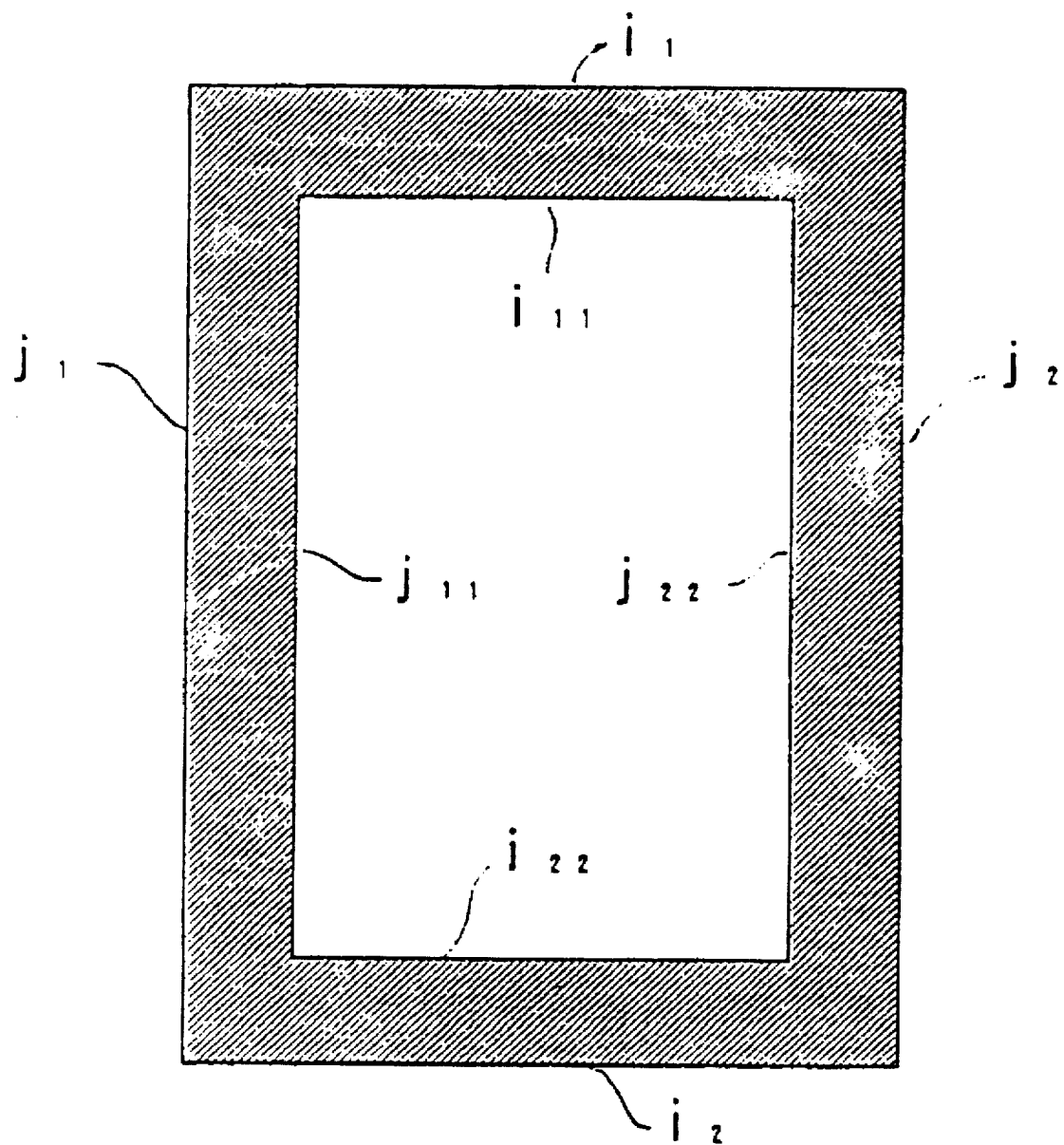
FIG. 46 is a diagram showing elements forming the frame.
Figure 47:
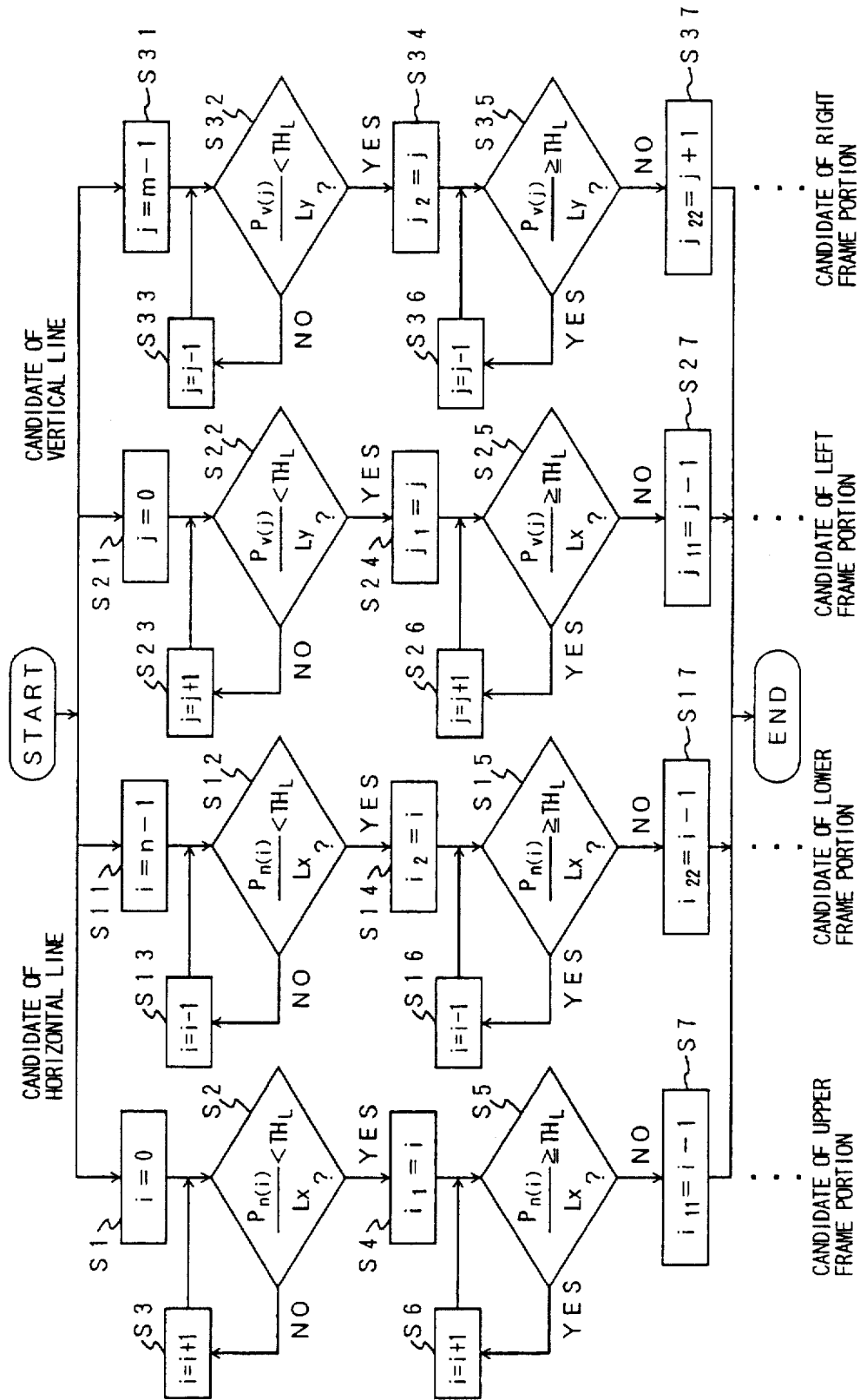
FIG. 47 is a flow chart for explaining a process of a straight line detector 22b

FIGS. 46 and 47 are diagrams for explaining an embodiment of the process of the straight line detector 22b in more detail. FIG. 46 shows the constituent elements of the frame, and this frame is formed by an upper frame portion, a lower frame portion, a right frame portion and a left frame portion. The upper frame portion is made up of line segments (straight lines) i1 and i11. The lower frame portion is made up of line segments (straight lines) i2 and i22. The right frame portion is made up of line segments (straight lines) j2 and j22. In addition, the left frame portion is made up of line segments (straight lines) j1 and j11. If the horizontal and vertical lengths of the rectangle of the partial pattern which is obtained by the labeling are respectively denoted by $L_x$ and $L_y$, the line segment (straight line) is regarded as a candidate of the line segment (straight line) forming the frame when the ratio of the projection and the corresponding length is greater than or equal to the predetermined threshold value $TH_L$.

FIG. 47 shows a flow chart for the case where the process of the straight line detector 22b is realized by software. In FIG. 47, steps S1 through S7 detect the candidates of the upper frame portion out of the horizontal lines. Steps S11 through S17 detect the candidates of the lower frame portion out of the horizontal lines. Steps S21 through S27 detect the candidates of the left frame portion out of the vertical lines. In addition, steps S31 through S37 detect the candidates of the right frame portion out of the vertical lines. For the sake of convenience, only the operation of the steps S1 through S7 will be described, and a description of the other steps will be omitted because their operations are similar thereto.

In FIG. 47, the step S1 sets i to i=0. The step S12 decides whether or not the relation $[Ph(i)/L_x] < TH_L$ stands. If the decision result in the step S2 is NO, the step S3 increments i by 1, and the process returns to the step S2. On the other hand, if the decision result in the step S2 is YES, the step S4 sets i1 to i1=1. Next, the step S5 decides whether or not the relation $[Ph(i)/L_x] \geq TH_L$ stands. If the decision result in the step S5 is YES, the step S6 increments i by 1 and the process returns to the step S5. On the other hand, if the decision result in the step S5 is NO, the step S7 sets i11 to i11=i-1, and the candidates of the upper frame portion are obtained by the above described operation.

The candidates of the lower, right and left frame portions are similarly obtained by the corresponding steps S11 through S17, steps S31 through S37, and steps S21 through S27. But in the steps S13 and S16, for example, i is decremented by 1.

The 4-side detector 22c focuses attention on the horizontal line candidates i1 and i2 and the vertical line candidates j1 and j2 at the outermost part out of the candidates of the horizontal line i and the candidates of the vertical line j which are detected in the straight line detector 22b. More particularly, the 4-side detector 22c calculates the following formulas (6) and (7) to make a comparison with a threshold value $TH_L'$.

$$|i1-i2|/L_y \geq TH_L' \qquad (6)$$

$$|j1-j2|/L_x \geq TH_L' \qquad (7)$$

Figure 48:
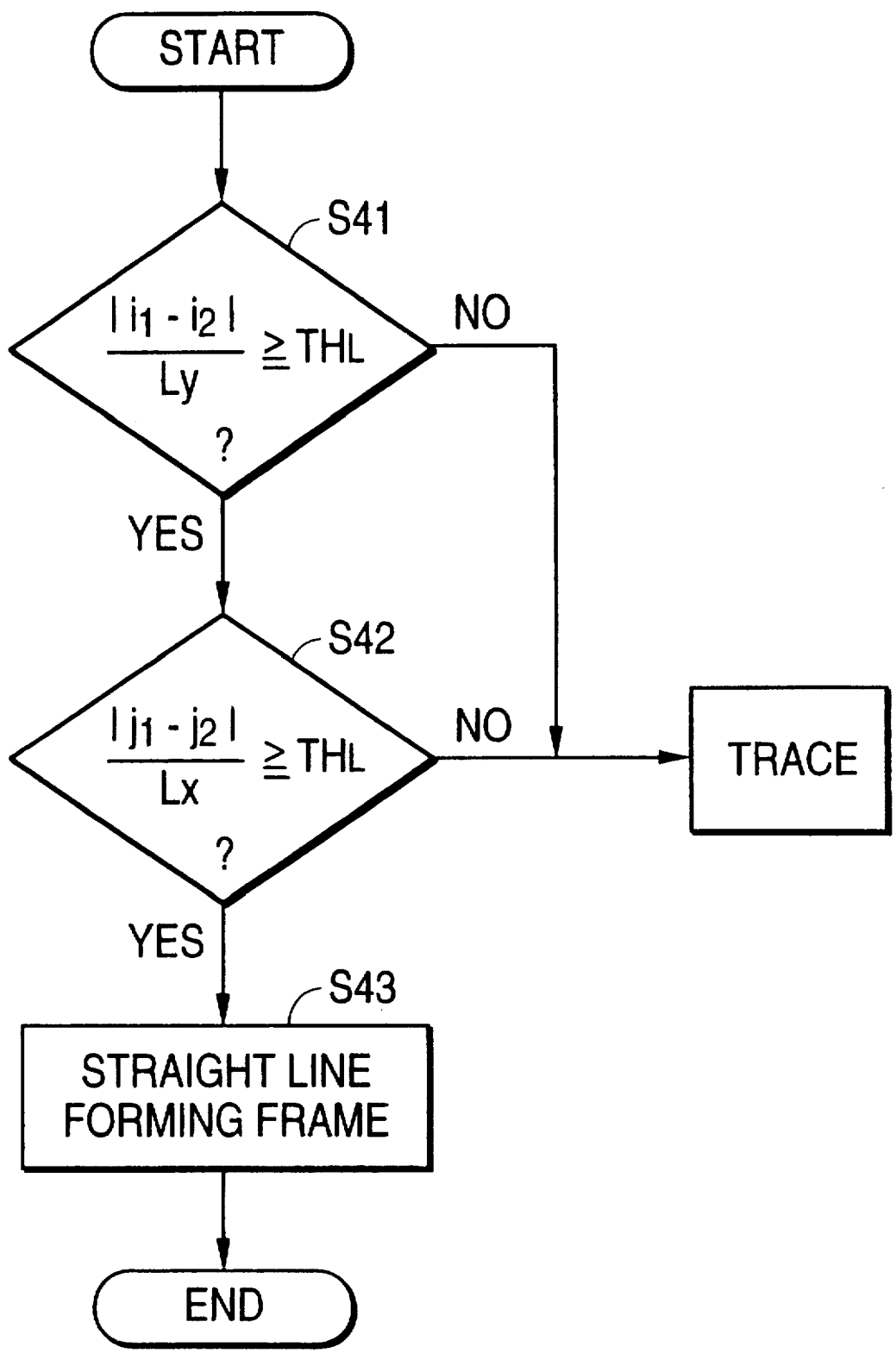
FIG. 48 is a flow chart for explaining a process of a 4-side detector 22c.

FIG. 48 shows a flow chart for the case where the process of the 4-side detector 22c is carried out by software, in order to describe an embodiment of the process of the 4-side detector 22c in more detail. In FIG. 48, a step S41 decides whether or not the formula (6) described above stands. If the decision result in the step S41 is YES, a step S42 decides whether or not the formula (7) described above stands. If the decision result in the step S41 or S42 is NO, the process advances to the process of the tracing part 22d. On the other hand, if the decision result in the step S42 is YES, a step S43 detects the straight line portion by regarding that the partial pattern is the straight line portion forming the frame.

The frame extracting part 22f extracts the frame based on the detection result of the 4-side detector 22c. In other words, when the straight line portion is detected by the 4-side detector 22c, the frame is extracted based on the detected straight line portion, and the above described process is repeated by focusing attention on another candidate if no straight line portion is detected, to thereby extract the frame. More particularly, it is regarded that the candidate is the straight line forming the frame if the above described formulas (6) and (7) are satisfied, and if not, the above described process is repeated by focusing attention on another candidate.

After the straight lines forming the skeleton of the frame are obtained as described above, attention is focused before and after the skeleton line. Calculation is made to determine how many horizontal line candidates i or vertical line candidates j exist in continuance from the skeleton line, and the calculated value is used as a reference for the line width of each side.

FIG. 49A is a diagram showing an example of the frame having the wide line width extracted in the above described manner. In FIG. 49A, a skeleton line 152 is obtained with respect to a frame 151 which is extracted, and the line width of each side amounts to 2 pixels in this example.

(2b) Extraction of the Straight Line/Frame Having the Narrow Line Width:

The straight line/frame having the narrow line width is extracted by focusing the attention to the partial pattern which could not be calculated by the process of extracting the straight line/frame having the wide line width shown in FIG. 49A.

FIG. 49B shows an example of the frame having the narrow line width, that is, a frame 153 and its skeleton line 154. The frame having the narrow line width includes a pattern which has a line width amounting to approximately 1 pixel and has unevenness caused by inclination or the like as shown in FIG. 49B. In order to stably extract the frame having the narrow line width as shown in FIG. 49B, this embodiment searches the frame as follows.

In other words, when extracting the frame, a straight line length called "n-line run length" is defined which can detect the straight line even if the unevenness occurs due to inclination, as shown in FIG. 50.

According to the normal run length, the number of pixels continuous in the horizontal or vertical direction is calculated. For this reason, the long straight line having the unevenness as shown in FIG. 49B will be divided into short straight lines. However, according to the n-line run length shown in FIG. 50, the run length connecting n lines by the 8-connection is calculated as the n-line run length. The value of n is determined by the magnitude of the inclination, and the value of n is made larger as the inclination becomes larger. When n=1, the n-line run length corresponds to the normal run length.

FIG. 50 shows the case where n=3. In this case, even though the unevenness exists, it is possible to extract the segment as the straight line, that is, a horizontal line amounting to 7 pixels.

The tracing part 22d of the frame extracting part 22 draws normals (vertical lines) from a plurality of points including both ends and middle point of the straight line forming the rectangle to the inside of the frame in the rectangular coordinate of the partial pattern which is obtained in the connected pattern extracting part 21, and regards the positions where the normals contact the partial pattern as starting points. Using the above described n-line run length, the search is made in the right and left directions or the up and down directions along the partial pattern starting from each starting point.

By using such a technique, it is possible to stably obtain the straight line having the narrow line width even if the character projects from the frame.

Figure 51:
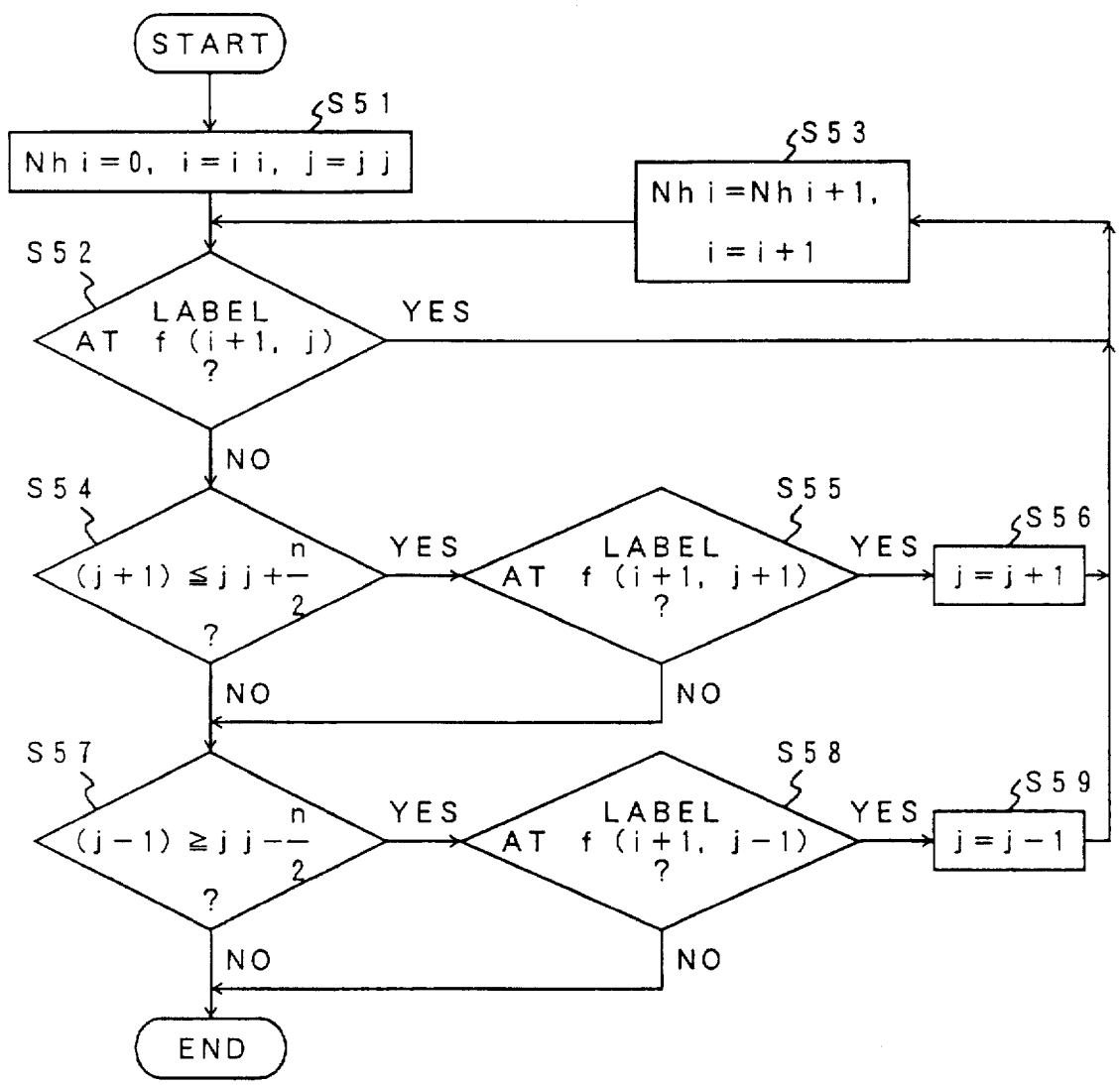
FIG. 51 is a flow chart for explaining a process of obtaining an n-line run length in the horizontal direction.
Figure 52:
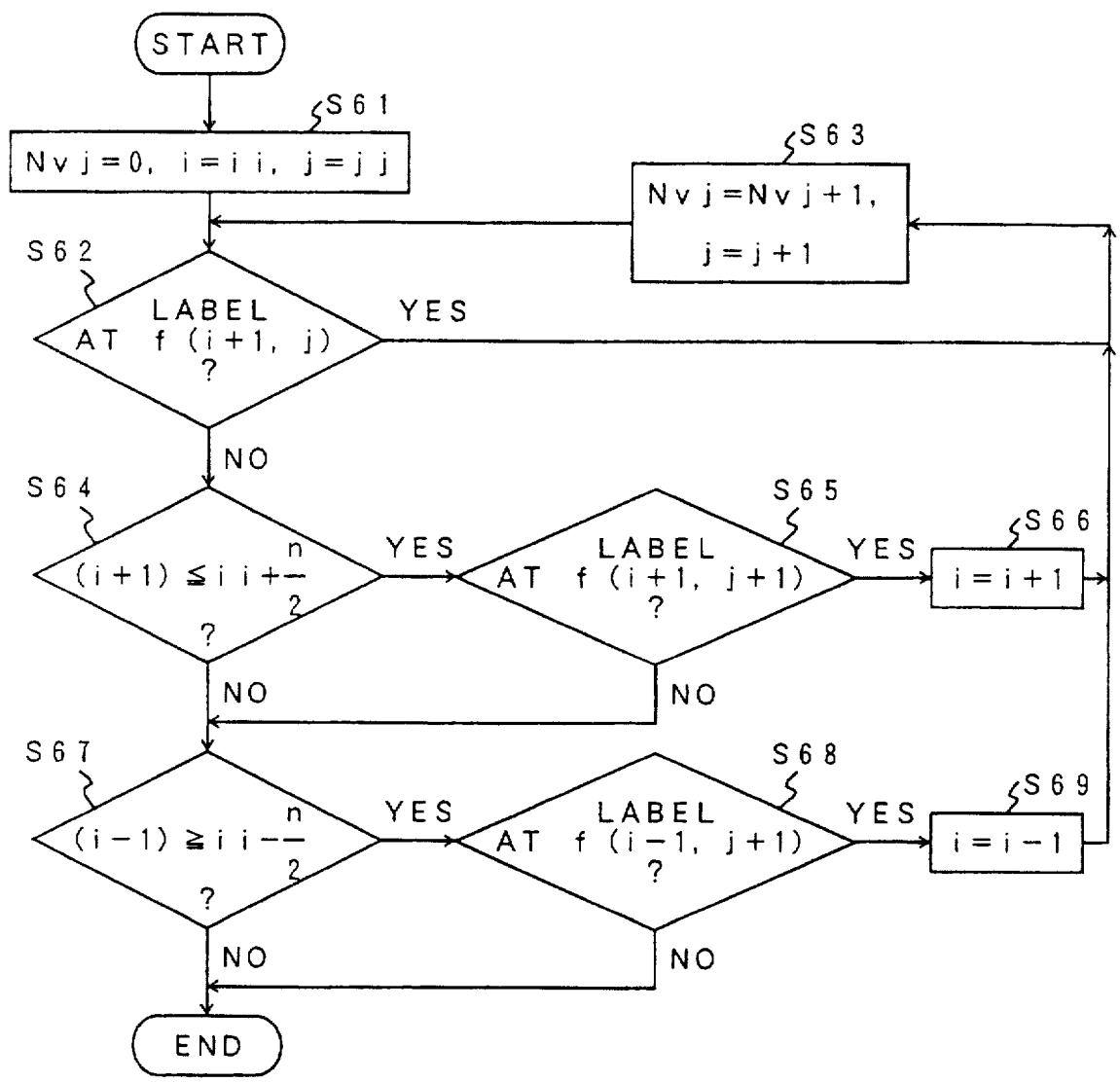
FIG. 52 is a flow chart for explaining a process of obtaining an n-line run length in the vertical direction.

FIGS. 51 and 52 respectively show flow charts for the case where the process of the tracing part 22d is carried out by software, in order to describe an embodiment of the process of the tracing part 22d in more detail. FIG. 51 shows the process of obtaining the n-line run length in the horizontal direction, and FIG. 52 shows the process of obtaining the n-line run length in the vertical direction. In FIGS. 51 and 52, it is assumed for the sake of convenience that a search starting point is (ii, jj), the horizontal line has a length Nhi, and the vertical line has a length Nvj.

In FIG. 51, a step S51 sets Nhi, i and j to Nhi=0, i=ii and j=jj, respectively. A step S52 decides whether or not f(i+1, j) has a label. If the decision result in the step S52 is YES, a step S53 increments Nhi and i by 1 and the process returns to the step S52. On the other hand, if the decision result in the step S52 is NO, a step S54 decides whether or not (j+1)≦jj+n/2. If the decision result in the step S54 is YES, a step S55 decides whether f(i+1, j+1) has a label. If the decision result in the step S55 is YES, a step S56 increments j by 1 and the process returns to the step S53. If the decision result in the step S54 or S55 is NO, a step S57 decides whether or not (j−1)≧jj−n/2. If the decision result in the step S57 is YES, a step S58 decides whether or not f(i+1, j−1) has a label. If the decision result in the step S58 is YES, a step S59 decrements j by 1 and the process returns to the step S53. If the decision result in the step S57 or S58 is NO, the process of obtaining the n-line run length in the horizontal direction ends.

In FIG. 52, a step S61 sets Nvj, i and j to Nvj=0, i=ii and j=jj, respectively. A step S62 decides whether or not f(i, j+1) has a label. If the decision result in the step S62 is YES, a step S63 increments Nvj and j by 1 and the process returns to the step S62. On the other hand, if the decision result in the step S62 is NO, a step S64 decides whether or not (i+1)≦ii+n/2. If the decision result in the step S64 is YES, a step S65 decides whether f(i+1, j+1) has a label. If the decision result in the step S65 is YES, a step S66 increments i by 1 and the process returns to the step S63. If the decision result in the step S64 or S65 is NO, a step S67 decides whether or not (i−1)≧ii−n/2. If the decision result in the step S67 is YES, a step S68 decides whether or not f(i−1, j+1) has a label. If the decision result in the step S68 is YES, a step S69 decrements i by 1 and the process returns to the step S63. If the decision result in the step S67 or S68 is NO, the process of obtaining the n-line run length in the vertical direction ends.

The 4-side detector 22e sets the candidate i of the horizontal line to Nhi and the candidate j of the vertical line to Nvj based on the length of the straight line obtained in the above described manner. In addition, using the horizontal and vertical lengths $L_x$ and $L_y$ of the rectangle in the rectangular coordinate of the partial pattern which is obtained in the labeling part 21a, the 4-side detector 22e obtains the ratio of the horizontal length $L_x$ and the horizontal line candidate Nhi and the ratio of the vertical length $L_y$ and the vertical line candidate Nvj, and compares these ratios with a predetermined threshold value $TH_L$. More particularly, the 4-side detector 22e calculates the following formulas (8) and (9) to make a comparison with the predetermined threshold value $TH_L$.

$$[Nhi/L_x] \geq TH_L \qquad (8)$$

$$[Nvj/L_y] \geq TH_L \qquad (9)$$

It is regarded that each candidate is the candidate of the straight line forming the frame if the ratios in the above formulas (8) and (9) are greater than or equal to the predetermined threshold value $TH_L$.

Figure 53A:
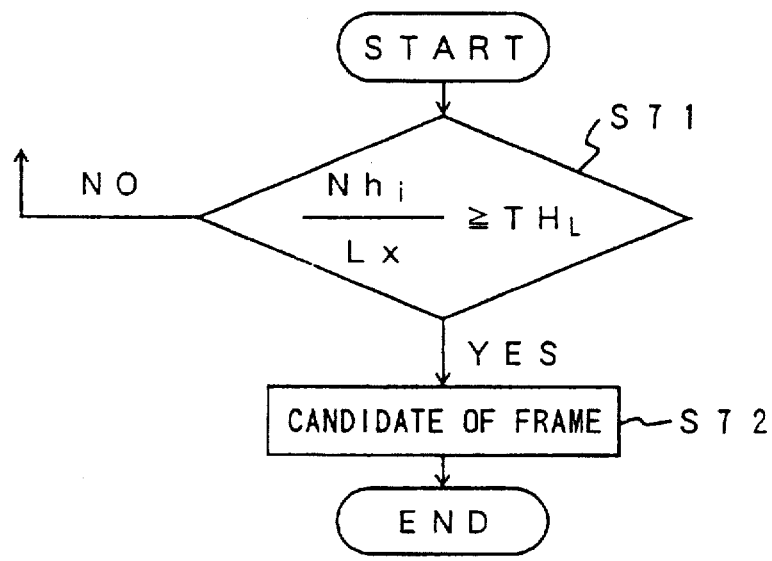
FIGS. 53A and 53B respectively are flow charts for explaining a process of a 4-side detector 22e.
Figure 53B:
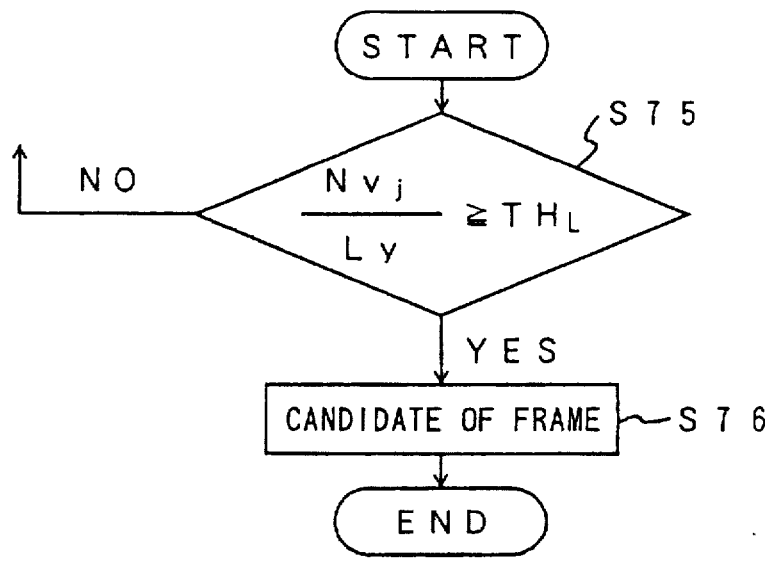

FIGS. 53A and 53B respectively show flow charts for the case where the process of the 4-side detector 22e is carried out by software, in order to describe an embodiment of the process of the 4-side detector 22e in more detail. FIG. 53A shows the process with respect to the candidate i of the horizontal line, that is, Nhi, and FIG. 53B shows the process with respect to the candidate j of the vertical line, that is, Nvj. It is assumed for the sake of convenience that in the rectangular coordinate of the partial pattern obtained by the labeling, the horizontal and vertical lengths of the rectangle respectively are $L_x$ and $L_y$.

In FIG. 53A, a step S71 decides whether or not Nhi/$L_x$>$TH_L$. If the decision result in the step S71 is YES, a step S72 judges that the candidate i is appropriate as the candidate of the straight line forming the frame. On the other hand, if the decision result in the step S71 is NO, a process is started with respect to the next candidate of the horizontal line.

In FIG. 53B, a step S75 decides whether or not $Nvj/L_y > TH_L$. If the decision result in the step S75 is YES, a step S76 judges that the candidate j is appropriate as the candidate of the straight line forming the frame. On the other hand, if the decision result in the step S75 is NO, a process is started with respect to the next candidate of the vertical line.

The 4-side detector 22e focuses attention on the horizontal line candidates i1 and i2 and the vertical line candidates j1 and j2 at the outermost part out of the candidates i of the horizontal line and the candidates j of the vertical line which are detected as described above. More particularly, the 4-side detector 22e calculates the following formulas (10) and (11) to make a comparison with the threshold value $TH_L'$.

$$|i1-i2|/L_y \geq Th_L' \quad (10)$$

$$|j1-j2|/L_x \geq TH_L' \quad (11)$$

The frame extracting part 22f extracts the frame based on the detection result of the 4-side detector 22e, similarly as described above for the wide line width. In other words, the frame extracting part 22f extracts the frame when the straight line portion is detected by the 4-side detector 22e, and the above described process is repeated by focusing the attention on the other candidates when no straight line portion is detected so as to extract the frame. More particularly, it is regarded that the candidates are the straight lines forming the frame if the above formulas (10) and (11) are satisfied, and the above described process is repeated by focusing the attention on the other candidates if these formulas are not satisfied. The reference value of the line width is obtained as a difference of the position coordinates of the maximum and minimum which are obtained during the frame extraction process.

After 1 character frame is obtained in the above described manner, it is also possible to newly extract the character frame by scanning the extracted character frame for the entire image and matching it with the partial pattern which is extracted by the connected pattern extracting part 21.

In addition, it is possible to calculate the size ratio of the extracted character frame and the rectangle approximating the partial pattern which is obtained in the connected pattern extracting part 21, extract only the partial pattern for which the calculated size ratio is within a predetermined threshold value, and newly extract the character frame by matching the extracted partial pattern with the character frame which has already been extracted.

Furthermore, it is possible to provide a means for extracting the partial pattern which exists within the horizontal or vertical range by an amount corresponding to the size of the extracted character frame, and for re-judging the extracted character frame as the character pattern if it is judged in the attribute adding means that all of the extracted partial patterns are patterns made up solely of the character. The attribute adding means will be described later. In this case where such a re-judging means is provided, it is possible to prevent a portion of the character from being erroneously judged as the frame even if the character has a rectangular portion corresponding to a frame such as the Japanese Kanji character "kuni" which means "country". More particularly, the Japanese Kanji character "kuni" is made up of a rectangular frame-shaped portion and vertical and horizontal lines within the rectangular frame-shaped portion.

(3) Adding Attributes to the Connection Pattern:

The connected pattern attribute adder 23 categorizes each of the connected patterns based on the result of the frame extraction made in the frame extracting part 22 into the following patterns (A) through (C), and adds the attributes of the frame and the character to the frame pattern, the character pattern, and the partial pattern of the character.

(A) Contact pattern of the character and frame;

(B) Frame pattern; and (C) Character pattern and Partial pattern of character.

If the frame cannot be extracted, the attribute "character pattern" or "portion of character pattern" is added. The pattern which is added with the above attribute is supplied to the connected pattern integrating part 34, where a decision is made on whether the pattern is to be extracted independently or the pattern is to be regarded as a portion of the character pattern and integrated with other patterns.

(4) Separation of the Frame:

In FIG. 42, the side width calculator 24a of the frame separating part 24 obtains as the line width a reference value of the line width obtained at the time of the frame extraction plus 2 (plus 1 to the outer contour and plus 1 to the inner contour), by taking into consideration the unevenness of the outer contour of the frame and the unevenness of the inner contour of the frame. In addition, the side width calculator 24a determines coordinate values of the outer contour and the inner contour of the frame based on the skeleton line which is calculated at the time of the frame extraction or based on the position of the maximum/minimum which is being extracted.

Figure 54A:
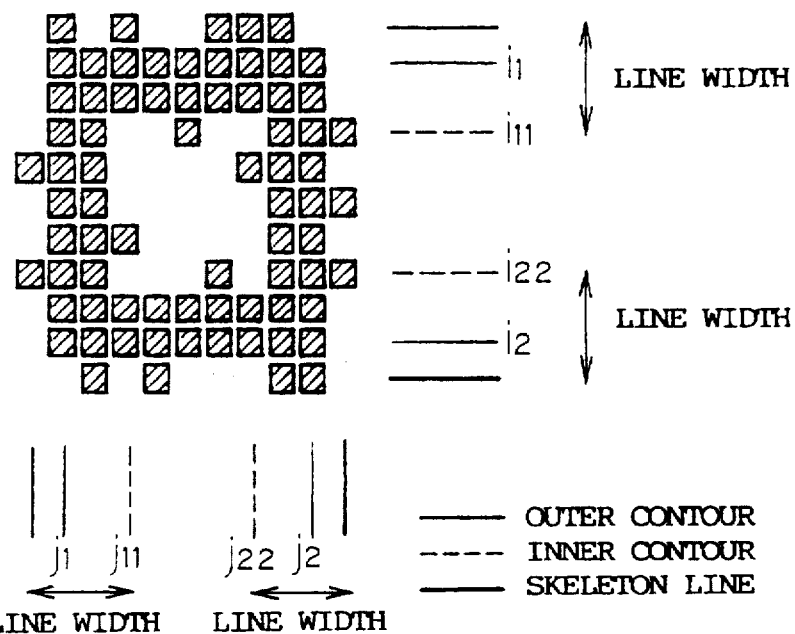
FIGS. 54A and 54B respectively are diagrams for explaining a skeleton line, an outer contour and the like of the frame having the large line width and the frame having the small line width.
Figure 54B:
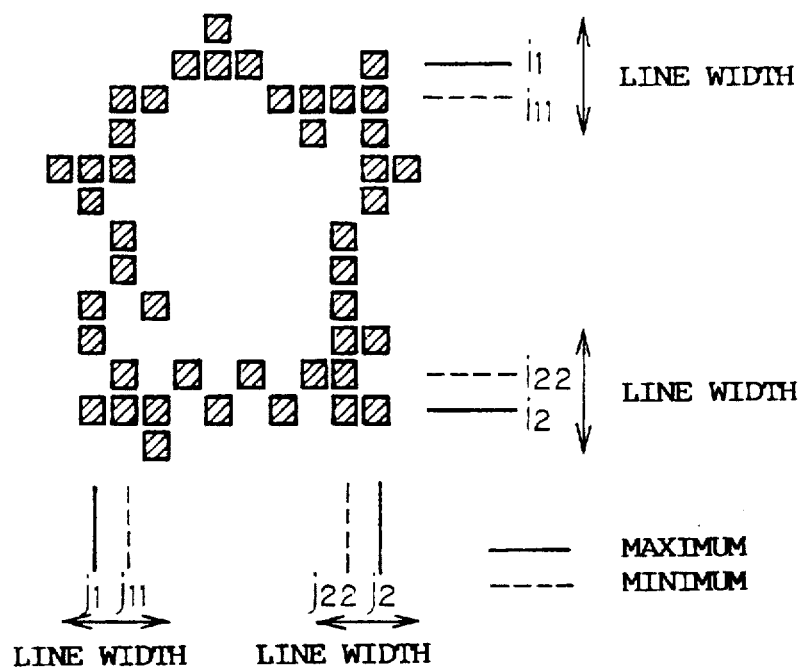

FIGS. 54A and 54B respectively are diagrams showing the skeleton line, the outer contour, the inner contour and the line width of the frame having the wide line width and the frame having the narrow line width. FIG. 54A shows the frame having the wide line width, and FIG. 54B shows the frame having the narrow line width. In FIGS. 54A and 54B, the "wide (or fat) line" indicates the outer contour, the "dotted line" indicates the inner contour, and the "narrow (or thin) line" indicates the skeleton line. The side width calculator 24a determines the coordinate values of the outer contour and the inner contour of the frame for the frame having the wide line width and the frame having the narrow line width, as shown in FIGS. 54A and 54B.

Figure 55:
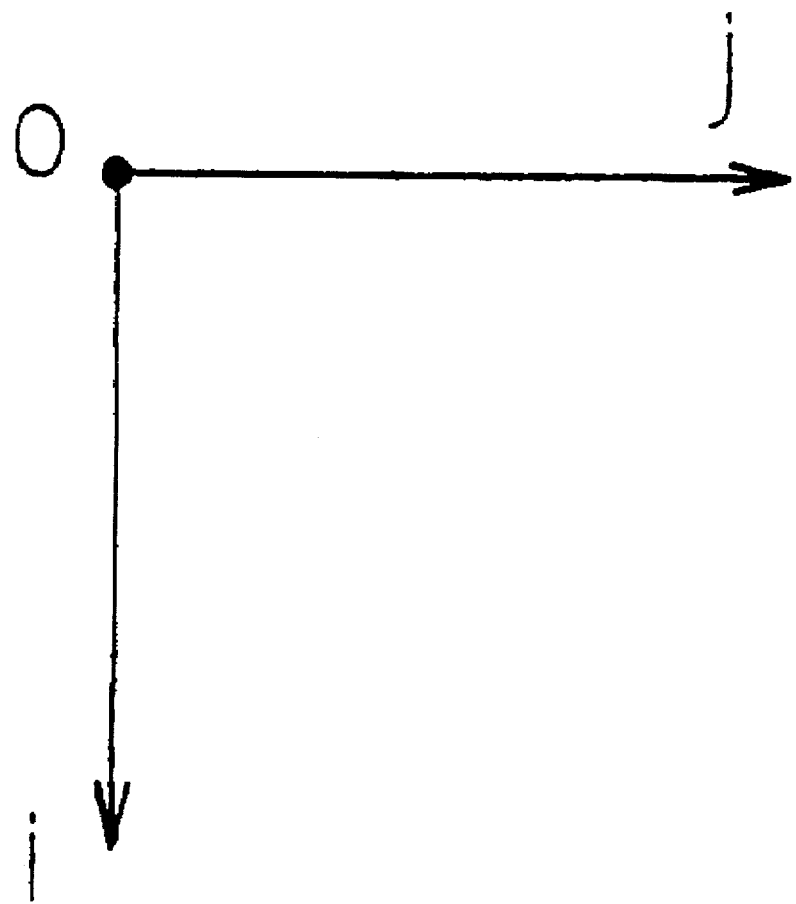

When it is assumed that the coordinate system shown in FIG. 55 is used, the side width calculator 24a sets the frame coordinate of the upper frame portion to (i1−1, i11+1) and the width of the side to w1+2 when the coordinate of the outer contour of the upper frame portion is (i1, i11) and the width is w1. In addition, when the coordinate of the outer contour of the lower frame portion is (i2, i22) and the width is w2, the side width calculator 24a sets the frame coordinate of the lower frame portion to (i2+1, i22−1) and the width of the side to w2+2. Similarly, when the coordinate of the outer contour of the left frame portion is (j1, j11) and the width is w3, the side width calculator 24a sets the frame coordinate of the left frame portion to (j1−1, j11+1) and the width of the side to w3+2. Furthermore, when the coordinate of the outer contour of the right frame portion is (j2, j22) and the width is w4, the side width calculator 24a sets the frame coordinate of the right frame portion to (j2+1, j22−1) and the width of the side to w4+2.

Returning now to the description of the frame separating part 24 shown in FIG. 42, the frame eliminating part 24b eliminates the pattern existing between the outer contour and the inner contour based on the coordinate values of the outer contour and the inner contour of the frame obtained in the side width calculator 24a.

The frame noise eliminating part 24c carries out a labeling again with respect to the pattern which is eliminated of the frame, and eliminates the pattern which remains as a portion of the frame due to the characteristics such as small area for each label.

The attribute adder 24d focuses the attention on the pattern which is not added with an attribute in the connected pattern attribute adder 23, and adds an attribute of a pattern indicating that the pattern is either the contact character pattern or a portion of the character if the pattern exists after elimination of the frame and adds an attribute of a pattern indicating only the frame if no pattern exists after elimination of the frame.

As will be described later, the connected pattern integrating part 34 decides whether the contact character pattern or the portion of the character is to be integrated with other contact character patterns or portions of the character or is to be regarded as an independent pattern, after the character portion within the frame is interpolated.

(5) Calculation of the Contact Frequency:

The contact frequency calculator 51 shown in FIG. 39 calculates the proportion of the contact character with respect to the average frame width, the inclination of the frame, and the number of all characters. The contact frequency calculator 51 judges that the contact frequency is small when one of the calculated values is less than or equal to a predetermined threshold value, and judges that the contact frequency is large when one of the calculated values is greater than the predetermined threshold value.

Figure 56:
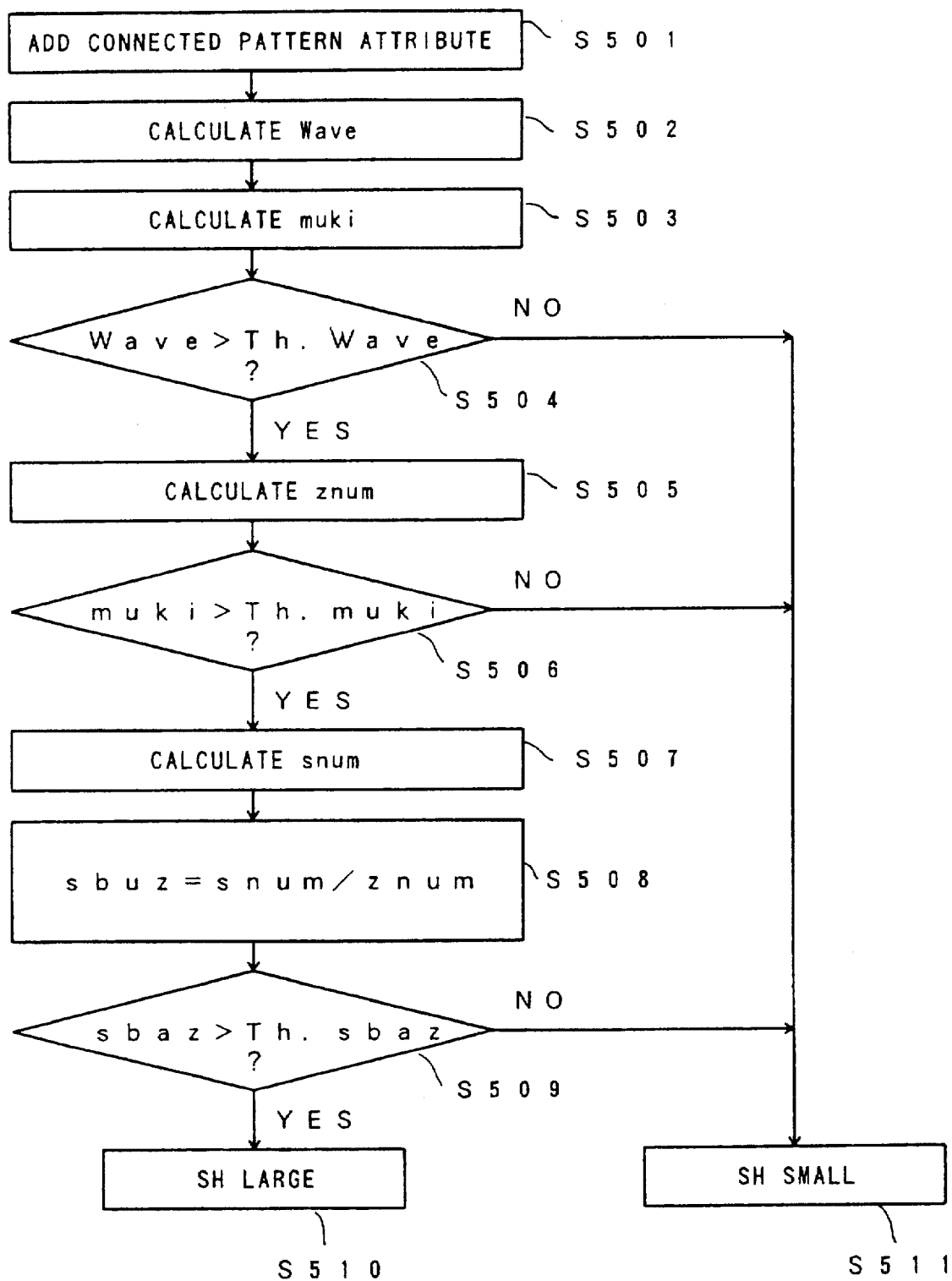
FIG. 56 is a flow chart for explaining an embodiment of a process of a contact frequency calculator 51.

FIG. 56 shows a flow chart for the case where the process of the contact frequency calculator 51 is carried out by software, in order to describe an embodiment of the process of the contact frequency calculator 51 in more detail.

In FIG. 56, a step S501 receives the attribute information and the like from the connected pattern attribute adder 23, and a step S502 calculates an average frame width Wave based on the received attribute information and the like. A step S503 calculates an inclination muki of the frame. A step S504 decides whether or not $W_{ave}$>Th.$W_{ave}$, where Th.$W_{ave}$ denotes a threshold value of the average frame width $W_{ave}$. If the decision result in the step S504 is YES, a step S505 calculates znum which denotes the total number of characters. A step S506 decides whether or not muki>Th.muki, where Th.muki denotes a threshold value of the inclination muki of the frame. If the decision result in the step S506 is YES, a step S507 calculates snum which denotes the number of contact characters. A step S508 calculates a proportion sbaz of the number of contact characters with respect to the total number of characters, where sbaz=snum/znum. A step S509 decides whether or not sbaz>Th.sbaz, where Th.sbaz denotes a threshold value of the proportion sbaz. If the decision result in the step S509 is YES, a step S510 judges that a frequency SH of the contact characters is large. On the other hand, if the decision result in the step S504, S506 or S509 is NO, a step S511 judges that the frequency SH of he contact characters is small.

(6) Calculation of the Character/Frame Intersection:

The character/frame intersection calculator 25a shown in FIG. 39 calculates the intersections of the pattern and the frame with respect to the contact character pattern or the portion of the character. In other words, using the outer contour and the inner contour obtained in the frame separating part 24, a straight line 1 pixel on the outer side of the outer contour and a straight line 1 pixel on the inner side of the inner contour are obtained. Then, transition points where the pixel changes from black to white or from white to black are obtained at the points where these straight lines and the contact character pattern or the portion of the character intersect, and these points are extracted as intersections.

Figure 57:
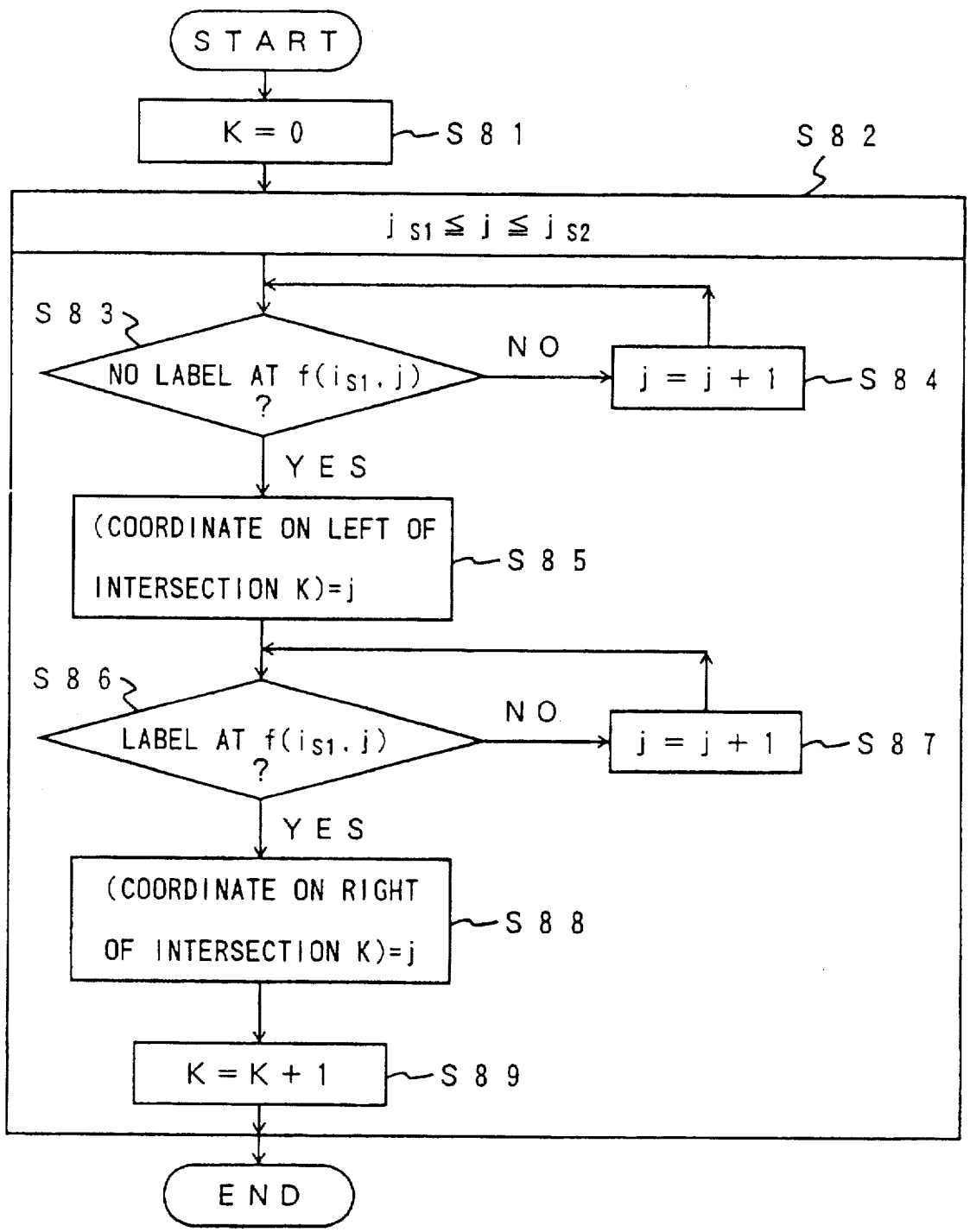

FIG. 57 shows a flow chart for the case where the process of the character/frame intersection calculator 25a is carried out by software, in order to describe an embodiment of the process of the character/frame intersection calculator 25a in more detail. In this case, the same coordinate system shown in FIG. 55 is used, and the following process is carried out by setting the coordinate on the outer side of the outer contour of the upper frame portion to is1, the coordinate on the inner side of the inner contour of the upper frame portion to iu1, the coordinate on the outer side of the outer contour of the lower frame portion to is2, the coordinate on the inner side of the inner contour of the lower frame portion to iu2, the coordinate on the outer side of the outer contour of the left frame portion to js1, the coordinate on the inner side of the inner contour of the left frame portion to ju1, the coordinate on the outer side of the outer contour of the right frame portion to js2, and the coordinate on the inner side of the inner contour of the right frame portion to ju2.

FIG. 57 shows the process of calculating the intersection of the outer contour of the upper frame portion and the character. In FIG. 57, a step S81 sets a number K of intersections to K=0, and a step S82 sets j to js1<j<js2. In other words, the following steps S83 through S89 are carried out for j=js1 to js2 by the setting of the step S82. A step S83 decides whether or not no label exists at f(is1, j). When no label exists at f(is1, j) and the decision result in the step S83 is NO, a step S84 increments j by 1 and the process returns to the step S83. On the other hand, if the decision result in the step S83 is YES, a step S85 sets the coordinate on the left side of the intersection to j. In addition a step S86 decides whether or not a label exists at f(is1, j). If the decision result in the step S86 is NO, a step S87 increments j by 1 and the process returns to the step S86. On the other hand, if the decision result in the step S86 is YES, a step S88 sets the coordinate on the right side of the intersection to j. Thereafter, a step S89 increments K by 1. After carrying out the above described steps S83 through S89 for j=js1 to js2, the process of calculating the intersection of the outer contour of the upper frame portion and the character ends.

The intersection of the inner contour of the upper frame portion, and the intersections of the character and the outer and inner contours of each of the lower, right and left frame portions can be calculated by processes similar to the process shown in FIG. 57, and a description and illustration thereof will be omitted in this specification.

(7) Calculation of Intersections of Characters Inside Frame:

The frame interior character intersection calculator 52-1 within the 3-intersection calculator 5-1 obtains the area of the character line segment while tracing the contour of the character line segment from the intersection of the frame and the character towards the inside of the frame. If the character line segment breaks or ends before the tracing of the frame width ends, it is judged that the obtained intersection is not an intersection of the character and the frame.

Figure 58:
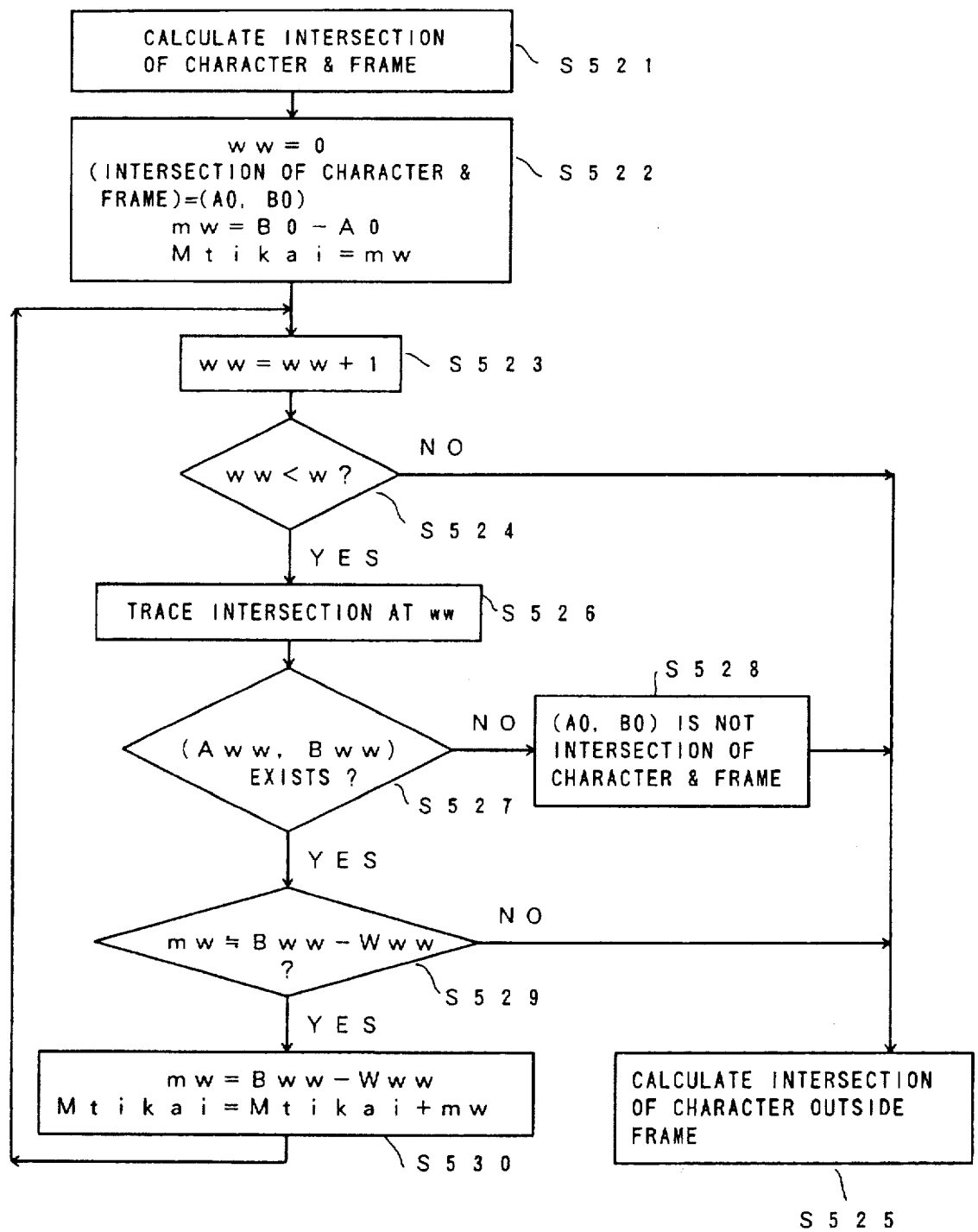
FIG. 58 is a flow chart for explaining an embodiment of a process of a frame interior character intersection calculator 52-1.

FIG. 58 shows a flow chart for the case where the process of the frame interior character intersection calculator 52-1 is carried out by software, in order to describe an embodiment of the process of the frame interior character intersection calculator 52-1 in more detail.

In FIG. 58, a step S521 receives the intersections and the like from the character/frame intersection calculator 52a, and a step S522 makes the initial settings. The step S522 sets ww to ww=0, the intersection of the character and the frame to (A0, B0), a character width mw to mw=B0−A0, and an area $M_{tikai}$ of the character line segment to $M_{tikai}$=mw. A step S523 sets ww to ww=ww+1, and a step S524 decides whether or not ww<w, where w denotes the frame width. If the decision result in the step S524 is NO, a step S525 advances the process to the process of the frame exterior character intersection calculator 53-1. On the other hand, if the decision result in the step S524 is YES, a step S526 traces the intersections at the point ww. In addition, a step S527 decides whether or not an intersection $(A_{ww}, B_{ww})$ inside the frame exists.

Figure 59:
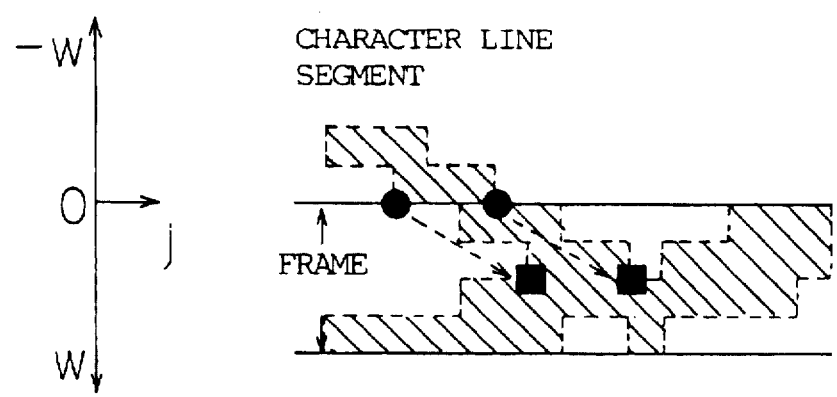
FIG. 59 is a diagram for explaining tracing of intersections inside the frame.
Figure 60:
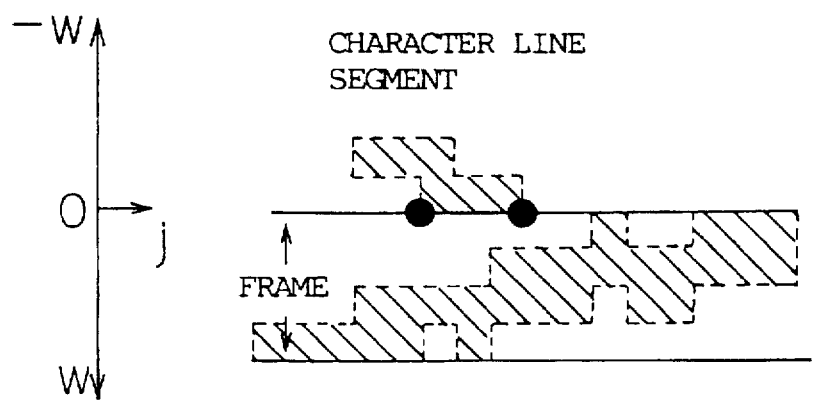
FIG. 60 is a diagram for explaining a process for a case where no intersection exists inside the frame.

FIG. 59 shows a particular example of the tracing of the intersections inside the frame, and the tracing is carried out as indicated by the arrow. In FIG. 59, a "black circular mark" indicates an intersection of the frame and the character, a "black rectangular mark" indicates an intersection inside the frame, and the "hatching" indicates the black pixels. If the decision result in the step S527 is NO, a step S528 judges that an intersection (A0, B0) is not an intersection of the character and the frame, and the process advances to the step S525. In other words, if no intersection exists inside the frame as shown in FIG. 60, it is judged that the obtained intersection (A0, B0) is not an intersection of the character and the frame. On the other hand, if the decision result in the step S527 is YES, a step S529 decides whether or not mw is approximately equal to $B_{ww}-W_{ww}$. If the decision result in the step S529 is NO, the process advances to the step S525. On the other hand, if the decision result in the step S529 is YES, a step S530 sets mw to mw=$B_{ww}-W_{ww}$ and $M_{tikai}$ to $M_{tikai}=M_{tikai}+1$, and the process returns to the step S523.

(8) Calculation of Intersections of Frame Exterior Characters:

The frame exterior character intersection calculator 53-1 within the 3-intersection calculator 25-1 obtains the area of the character line segment while tracing the contour of the character line segment from the intersection of the frame and the character towards the outside of the frame. But if the character line segment breaks before the frame width is traced, the intersection at this point is judged as being an intersection that is distant from the frame.

Figure 61:
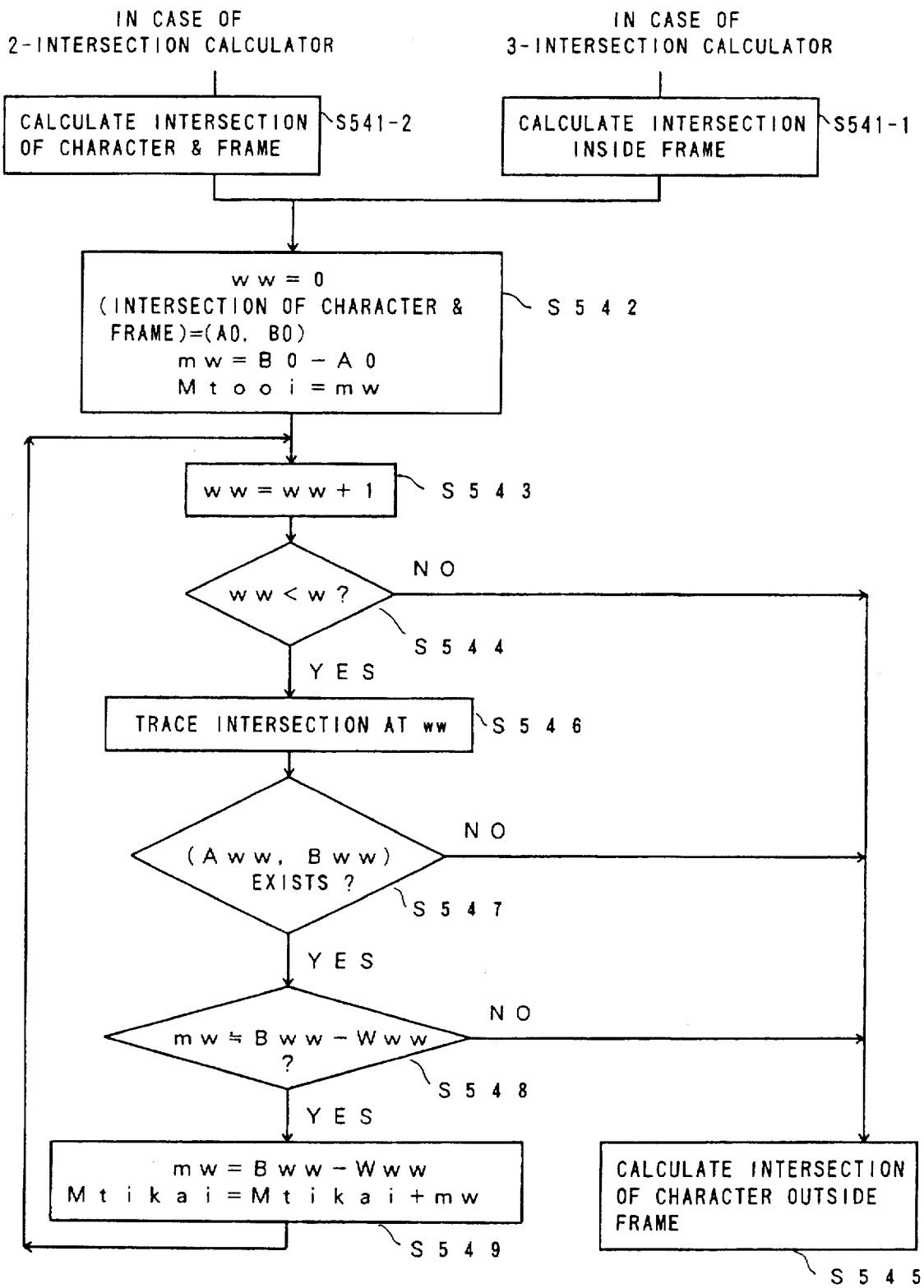
FIG. 61 is a flow chart for explaining an embodiment of a process of a frame exterior character intersection calculator 25-1.

FIG. 61 shows a flow chart for the case where the process of the frame exterior character intersection calculator 53-1 is carried out by software, in order to describe an embodiment of the process of the frame exterior character intersection calculator 53-1 in more detail.

In FIG. 61, a step S541-1 receives the intersections and the like via the frame interior character intersection calculator 53-1, and a step S542 makes the initial setting. A step S542 sets ww to ww=0, an intersection of the character and the frame to )A0, B0), a character width mw to wm=B0−A0, and an area $M_{tooi}$ of the character line segment to $M_{tooi}$=mw. A step S543 sets ww to ww=ww+1, and a step S544 decides whether or not ww<w, where w denotes the frame width. If the decision result in the step S544 is NO, a step S545 advances the step to the process of the character/frame intersection judging part 54-1. On the other hand, if the decision result in the step S544 is YES, a step S546 traces the intersections at the point ww. In addition, a step S547 decides whether or not an intersection $(A_{ww}, B_{ww})$ outside the frame exists, that is, whether or not an intersection outside the frame exists.

Figure 62:
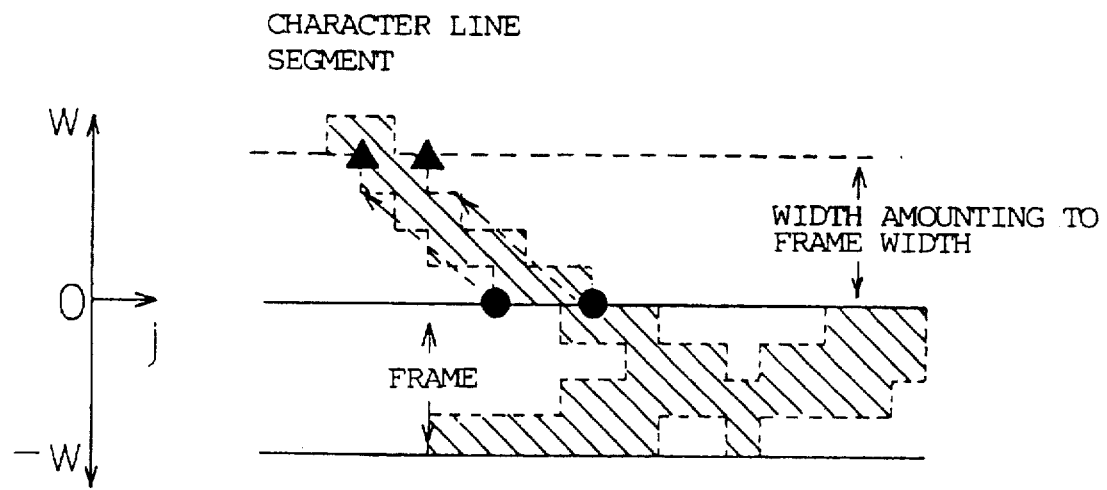
FIG. 62 is a diagram for explaining tracing of intersections distant from the frame.
Figure 63:
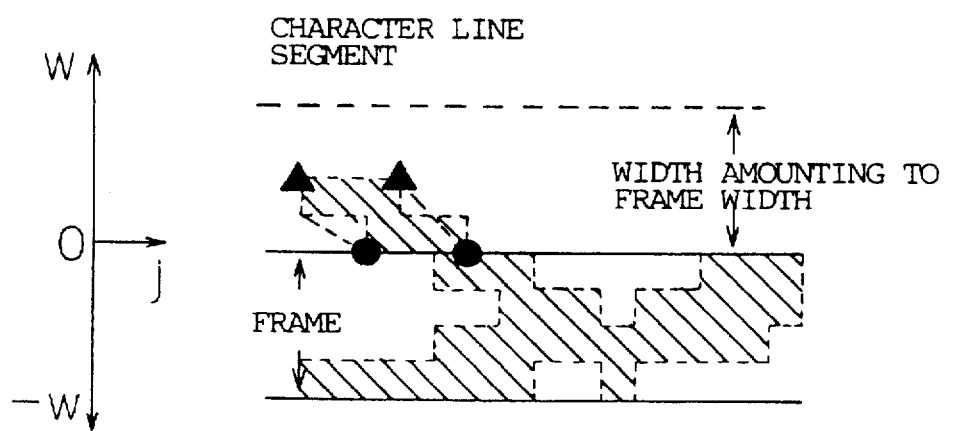
FIG. 63 is a diagram for explaining a process for a case where the character line segment ceases or breaks during the tracing.

FIG. 62 shows a particular example of the tracing of the intersections outside the frame, that is, the intersections distant from the frame, and the tracing is carried out as indicated by the arrow. In FIG. 62, a "black circular mark" indicates an intersection of the frame and the character, and a "black triangular mark" indicates an intersection outside the frame, and the "hatching" indicates a black pixel. If the decision result in the step S547 is NO, the process advances to the step S545. However, if the character line segment breaks (that is, no longer exists) during the search as shown in FIG. 63, it is judged that the intersection (A0, B0) at this point is an intersection distant from the frame. On the other hand, if the decision result in the step S547 is YES, a step S548 decides whether or not mw is approximately equal to $B_{ww}-W_{ww}$. If the decision result in the step S548 is NO, the process advances to the step S545. However, if the decision result in the step S548 is YES, a step S549 sets mw to mw=$B_{ww}-W_{ww}$ and $M_{tooi}$ to $M_{tooi}=M_{tooi}+$mw, and the process returns to the step S543.

In the case of the process of the frame exterior character intersection calculator 53-2 within the 2-intersection calculator 25-2, a step S541-2 shown in FIG. 61 is carried out in place of the step S541-1, but the process is otherwise the same as that of the frame exterior character intersection calculator 53-1. The step S541-2 receives the intersections and the like via the character/frame intersection calculator 25a within the 2-intersection calculator 25-2, instead of via the frame interior character intersection calculator 53-1.

(9) Judging Character/Frame Intersections:

When the sum of the areas of the character line segments outside the frame and inside the frame is less than or equal to a predetermined threshold value, the character/frame intersection judging part 54-1 within the 3-intersection calculator 25-1 or the character/frame intersection judging part 54-2 within the 2-intersection calculator 25-2 judges that the obtained intersection is not an intersection of the character and the frame.

Figure 64:
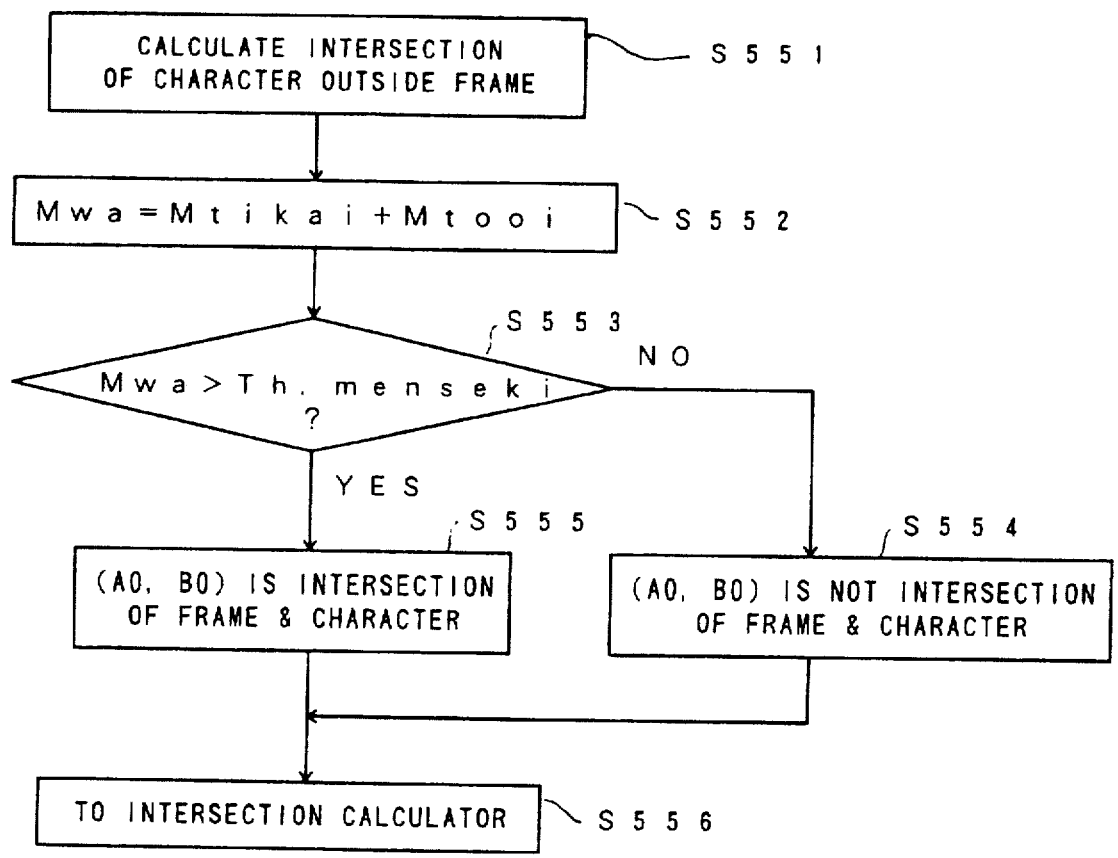
FIG. 64 is a flow chart for explaining an embodiment of a process of a character/frame intersection judging part 54-1 or 54-2.

FIG. 64 shows a flow chart for the case where the process of the character/frame intersection judging part 54-1 or 54-2 is carried out by software, in order to describe an embodiment of the process of the character/frame intersection judging part 54-1 or 54-2 in more detail.

In FIG. 64, a step S551 receives the intersections and the like from the frame exterior character intersection calculator 53-1 or 53-2, and a step S552 sets a sum $M_{wa}$ of the areas of the character line segments inside and outside the frame to $M_{wa}=M_{tikai}+M_{tooi}$. A step S553 decides whether or not $M_{wa}$>Th.menseki, where Th.menseki denotes a threshold value of the sum $M_{wa}$ of the areas. If the decision result in the step S553 is NO, a step S554 judges that the intersection (A0, B0) is not an intersection of the frame and the character, and the process advances to a step S556. On the other hand, if the decision result in the step S553 is YES, a step S555 judges that the intersection (A0, B0) is an intersection of the frame and the character, and the process advances to the step S556. The step S556 supplies the obtained information related to the intersection to the character/frame intersection calculator 25a.

(10) Association of 3-Intersections:

The 3-intersection associating part 55 shown in FIG. 40 calculates the directions of the patterns among the candidates of the intersections to be associated, from the intersections distant from the frame, the intersections inside the frame and the intersections of the character and the frame. The 3-intersection associating part 55 associates the intersections if approximately the same directions are calculated therefor. Even if the directions do not match, the intersections of the character and the frame are associated when the associating conditions including the distance between the intersections inside the frame and the continuity are satisfied. It is possible to make correct association of the intersections because the associating conditions are judged with respect to the intersections inside the frame.

Figure 65:
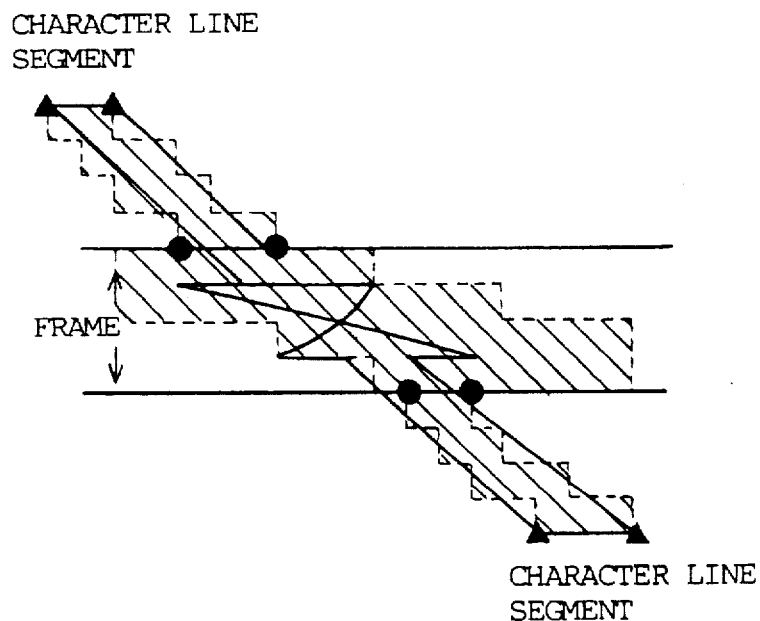
FIG. 65 is a diagram for explaining associating the intersections when the directions match.
Figure 66:
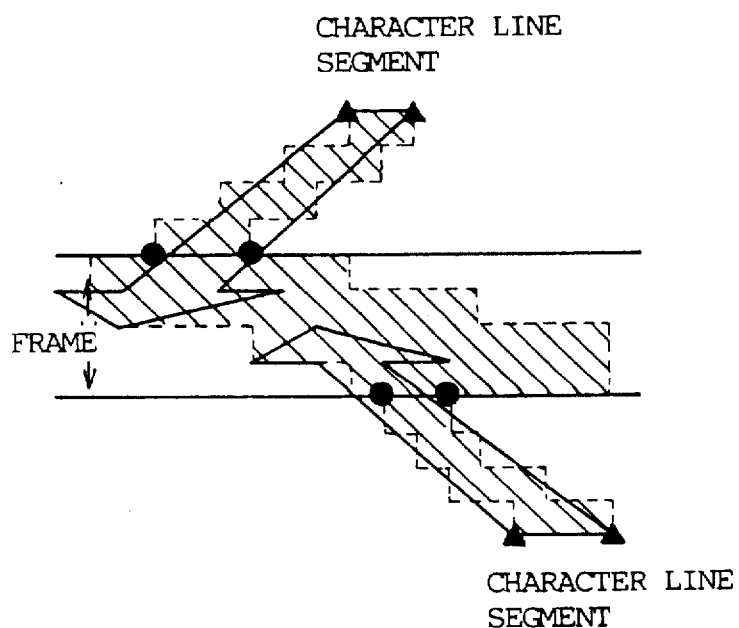
FIG. 66 is a diagram for explaining associating the intersections when the directions do not match.

FIG. 65 is a diagram showing the association of the intersections for a case where the directions match. In FIG. 65, the "hatching" indicates the black pixel, a "black circular mark" indicates an intersection of the frame and the character, a "black triangular mark" indicates an intersection distant from the frame, and the arrow indicates the direction. On the other hand, FIG. 66 is a diagram showing the association of the intersections for a case where the directions do not match. In FIG. 66, the "hatching" indicates the black pixel, a "black circular mark" indicates an intersection of the frame and the character, a "black triangular mark" indicates an intersection distant from the frame, and the arrow indicates the direction.

Figure 67:
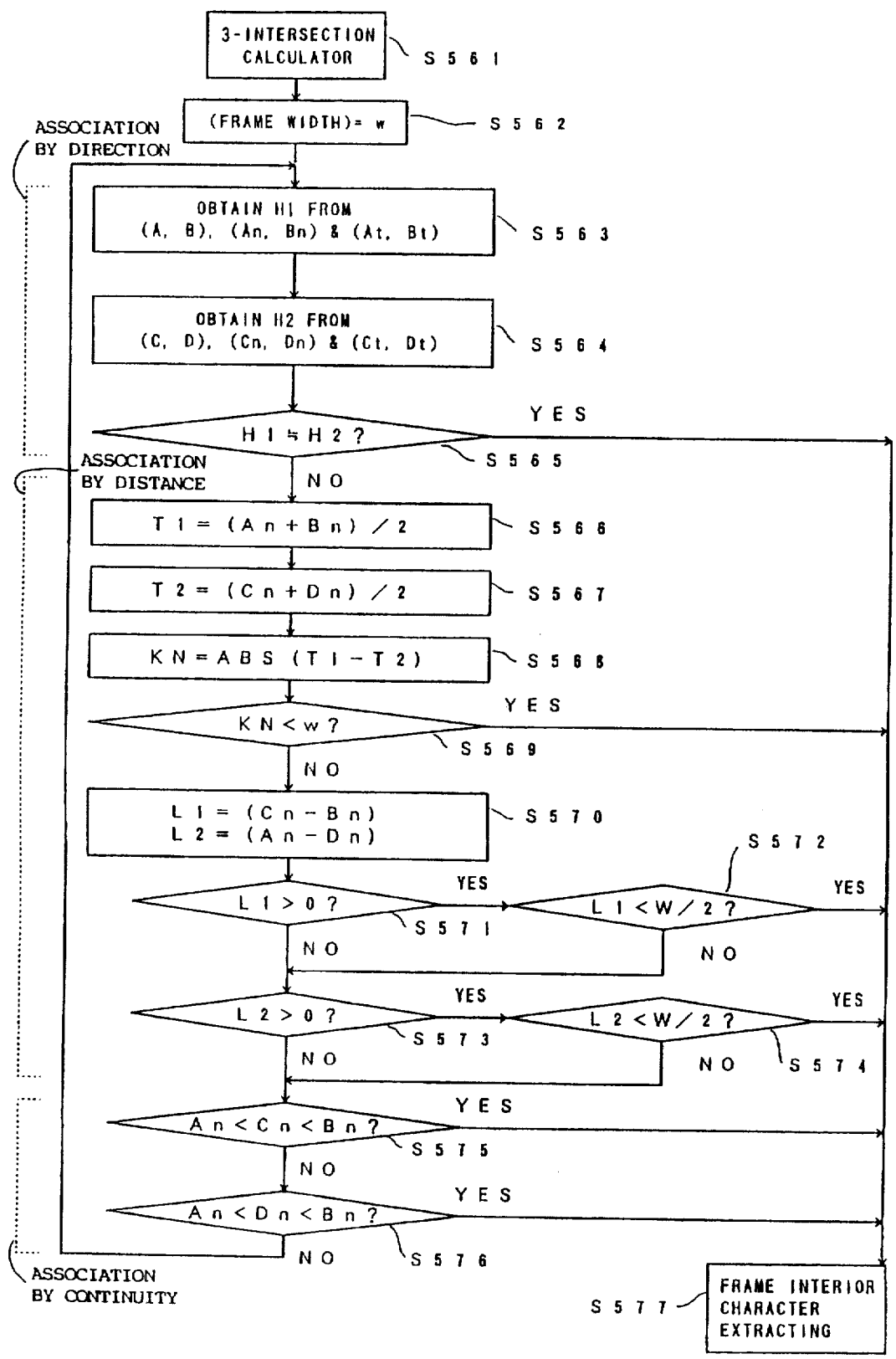
FIG. 67 is a flow chart for explaining an embodiment of a process of a 3-intersection associating part 55.

FIG. 67 shows a flow chart for the case where the process of the 3-intersection associating part 55 is carried out by software, in order to describe an embodiment of the process of the 3-intersection associating part 55 in more detail.

In FIG. 67, a step S561 receives the information related to the intersections and the like from the 3-intersection calculator 25-1, and a step S562 sets the frame width to w. A step S563 obtains a direction H1 of the pattern based on a first intersection (A, B) of the character and the frame, a first intersection $(A_n, B_n)$ inside this frame, and a first intersection $(A_t, B_t)$ distant from the frame. A step S564 obtains a direction H2 of the pattern based on a second intersection (C, D) of the character and the frame, a second intersection $(C_n, D_n)$ inside this frame, and a second intersection $(C_t, D_t)$ distant from the frame. A step S565 decides whether or not the direction H1 is approximately equal to the direction H2. Accordingly, the association of the direction is confirmed by the steps S563 through S565.

If the decision result in the step S565 is NO, a step S566 obtains a middle point T1 of the first intersection inside the frame from $T1=(A_n+B_n)/2$. In addition, a step S567 obtains a middle point T2 of the second intersection inside the frame from $T2=(C_n+D_n)/2$. A step S568 obtains a distance KN between the intersections inside the frame from KN=ABS (T1−T2). A step S569 decides whether or not KN<w. If the decision result in the step S569 is NO, a step S570 obtains distances L1 and L2 between the intersections from $L1=(C_n-B_n)$ and $L2=(A_n-D_n)$. A step S571 decides whether or not L1>0, and a step S572 decides whether or not L1<w/2 if the decision result in the step S571 is YES. If the decision result in the step S571 or S572 is NO, a step S573 decides whether or not L2>0. If the decision result in the step S573 is YES, a step S574 decides whether or not L2<w/2. Accordingly, association of the distance is confirmed by the steps S566 through S574.

If the decision result in the step S573 or S574 is NO, a step S575 decides whether or not $A_n<C_n<B_n$. If the decision result in the step S575 is NO, a step S576 decides whether or not $A_n<D_n<B_n$. If the decision result in the step S576 is NO, the process returns to the step S563. Accordingly, the association of the continuity is confirmed by the steps S575 and S576.

On the other hand, if the decision result in the step S565, S569, S572, S574 or S576 is YES, the process advances to a step S577 to carry out the process of the frame interior character extracting part 56.

Since the associating conditions are judged with respect to the intersections inside the frame, it is possible to correctly make the association as shown in FIGS. 68A through 68C and FIGS. 69A and 69B.

Figure 68A:
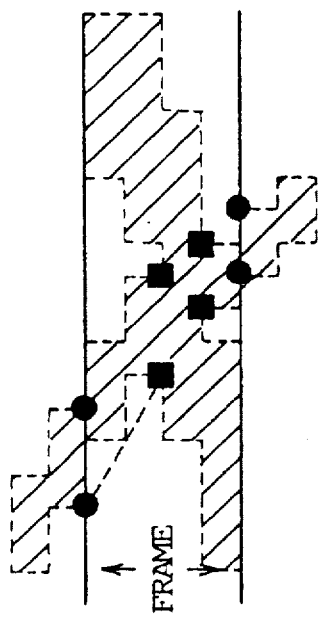
FIGS. 68A, 68B and 68C respectively are diagrams for explaining associating the intersections inside the frame.
Figure 68B:
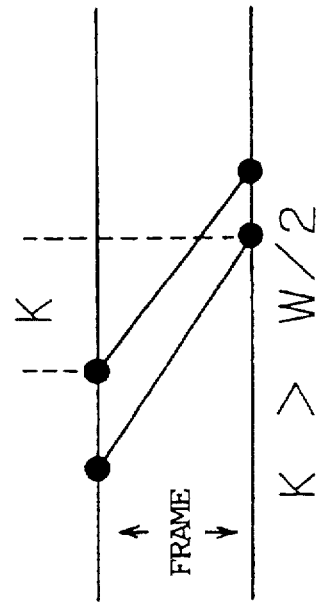
Figure 68C:
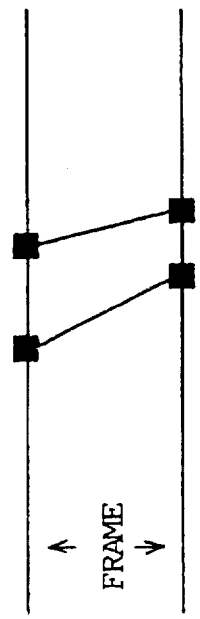

FIGS. 68A through 68C show a case where the association is made by the intersections within the frame. In FIGS. 68A through 68C, the "hatching" indicates a black pixel, a "black circular mark" indicates an intersection of the frame and the character, and a "black rectangular mark" indicates an intersection inside the frame. FIG. 68A shows the actual pattern, FIG. 68B shows that no association is made at the intersection of the character and the frame, and FIG. 68C shows that the association is made by the intersection inside the frame.

Figure 69A:
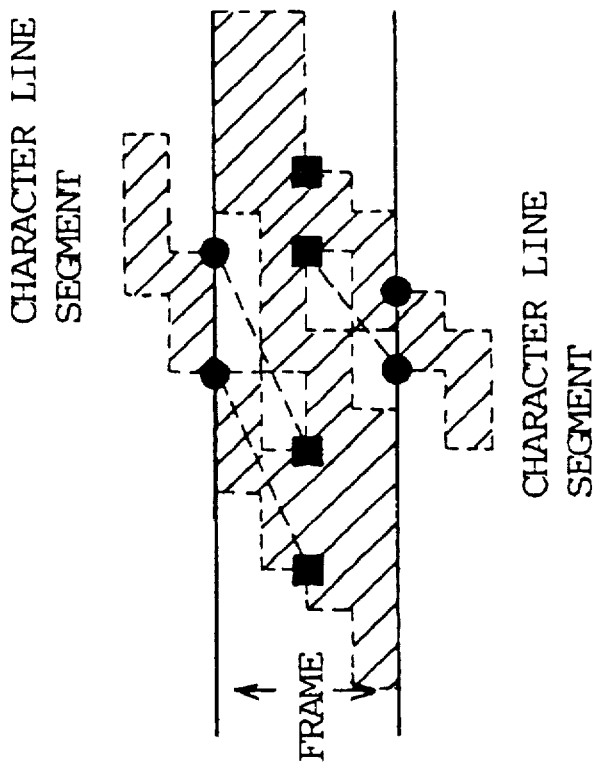
FIGS. 69A and 69B respectively are diagrams for explaining a case where the intersections inside the frame are not associated.
Figure 69B:
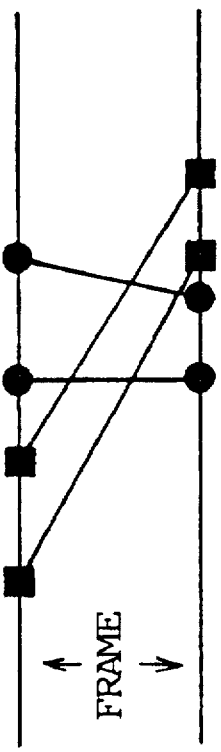

On the other hand, FIGS. 69A and 69B shows a case where no association is made by the intersections inside the frame. In FIGS. 69A and 69B, the "hatching" indicates a black pixel, a "black circular mark" indicates an intersection of the frame and the character, and a "black rectangular mark" indicates an intersection inside the frame. FIG. 69A shows the actual pattern, FIG. 69B shows that no association is made by the intersection inside the frame.

(11) Association of 2-Intersections:

The 2-intersection associating part 61 shown in FIG. 40 calculates the directions of the patterns among the candidates of the intersections to be associated, from the intersections distant from the frame, the intersections inside the frame and the intersections of the character and the frame. The 2-intersection associating part 61 associates the intersections if approximately the same directions are calculated therefor. Even if the directions do not match, the intersections of the character and the frame are associated when the associating conditions including the distance between the intersections inside the frame and the continuity are satisfied.

Figure 70:
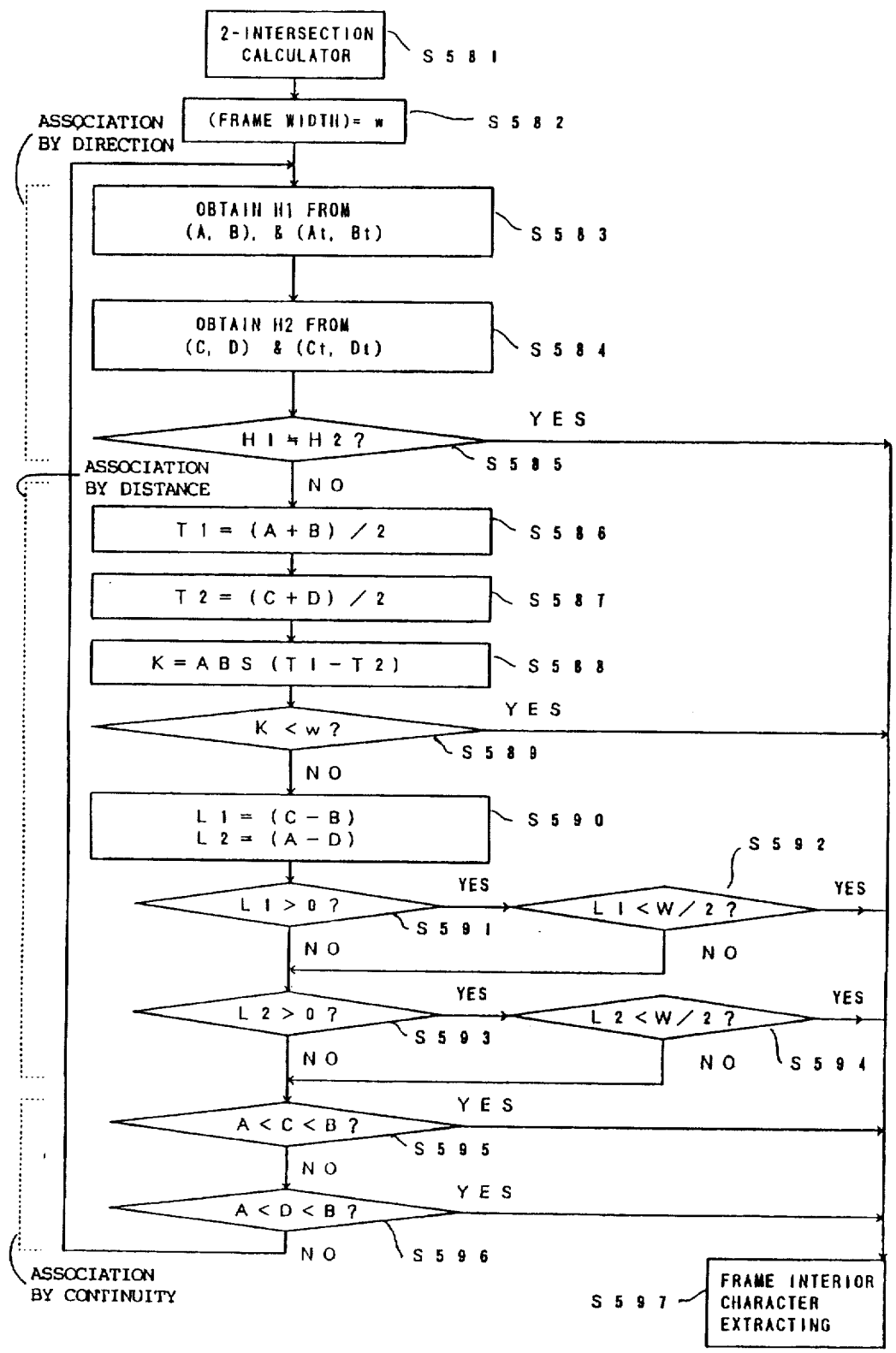
FIG. 70 is a flow chart for explaining an embodiment of a process of a 2-intersection associating part 61.

FIG. 70 shows a flow chart for the case where the process of the 2-intersection associating part 61 is carried out by software, in order to describe an embodiment of the process of the 2-intersection associating part 61 in more detail.

In FIG. 70, a step S581 receives the information related to the intersections and the like from the 2-intersection calculator 25-2, and a step S582 sets the frame width to w. A step S583 obtains a direction H1 of the pattern based on a first intersection (A, B) of the character and the frame and a first intersection $(A_t, B_t)$ distant from the frame. A step S584 obtains a direction H2 of the pattern based on a second intersection (C, D) of the character and the frame and a second intersection $(C_t, D_t)$ distant from the frame. A step S585 decides whether or not the direction H1 is approximately equal to the direction H2. Accordingly, the association of the direction is confirmed by the steps S583 through S585.

If the decision result in the step S585 is NO, a step S586 obtains a middle point T1 of the first intersection of the character and the frame from T1=(A+B)/2. In addition, a step S587 obtains a middle point T2 of the second intersection of the character and the frame from T2=(C+D)/2. A step S588 obtains a distance K between the intersections of the character and the frame from K=ABS(T1−T2). A step S589 decides whether or not K<w. If the decision result in the step S589 is NO, a step S590 obtains distances L1 and L2 between the intersections from L1=(C−B) and L2=(A−D). A step S591 decides whether or not L1>0, and a step S592 decides whether or not L1<w/2 if the decision result in the step S591 is YES. If the decision result in the step S591 or S592 is NO, a step S593 decides whether or not L2>0. If the decision result in the step S593 is YES, a step S594 decides whether or not L2<w/2. Accordingly, association of the distance is confirmed by the steps S586 through S594.

If the decision result in the step S593 or S594 is NO, a step S595 decides whether or not A<C<B. If the decision result in the step S595 is NO, a step S596 decides whether or not A<D<B. If the decision result in the step S596 is NO, the process returns to the step S583. Accordingly, the association of the continuity is confirmed by the steps S595 and S596.

On the other hand, if the decision result in the step S585, S589, S592, S594 or S596 is YES, the process advances to a step S597 to carry out the process of the frame interior character interpolator 32.

Figure 71A:
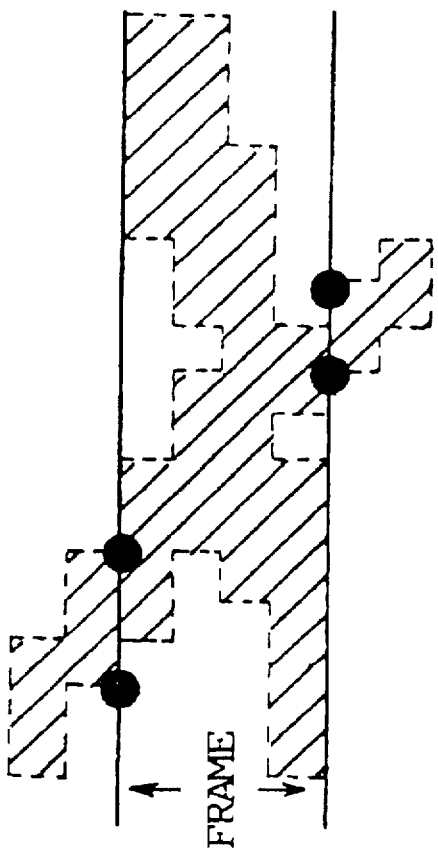
FIGS. 71A and 71B respectively are diagrams for explaining extraction of the character inside the frame.
Figure 71B:
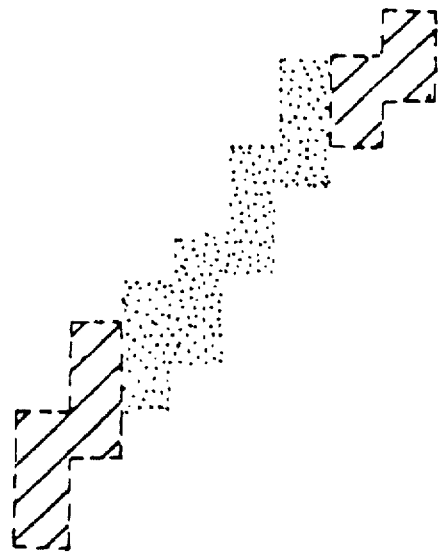

(12) Extraction of Frame Interior Character:

The frame interior character extracting part 56 shown in FIG. 40 judges that a range surrounded by the associated intersections and inside the frame is a character component. The part that is judged as being the character component is extracted, and other parts are eliminated because they form the frame. In other words, in the case of a pattern shown in FIG. 71A, a character component shown in FIG. 71B is extracted. In FIGS. 71A and 71B, the "hatching" indicates the black pixel, a "black circular mark" indicates the intersection of the character and the frame, and a "dotted region" indicates the extracted character component.

Figure 72:
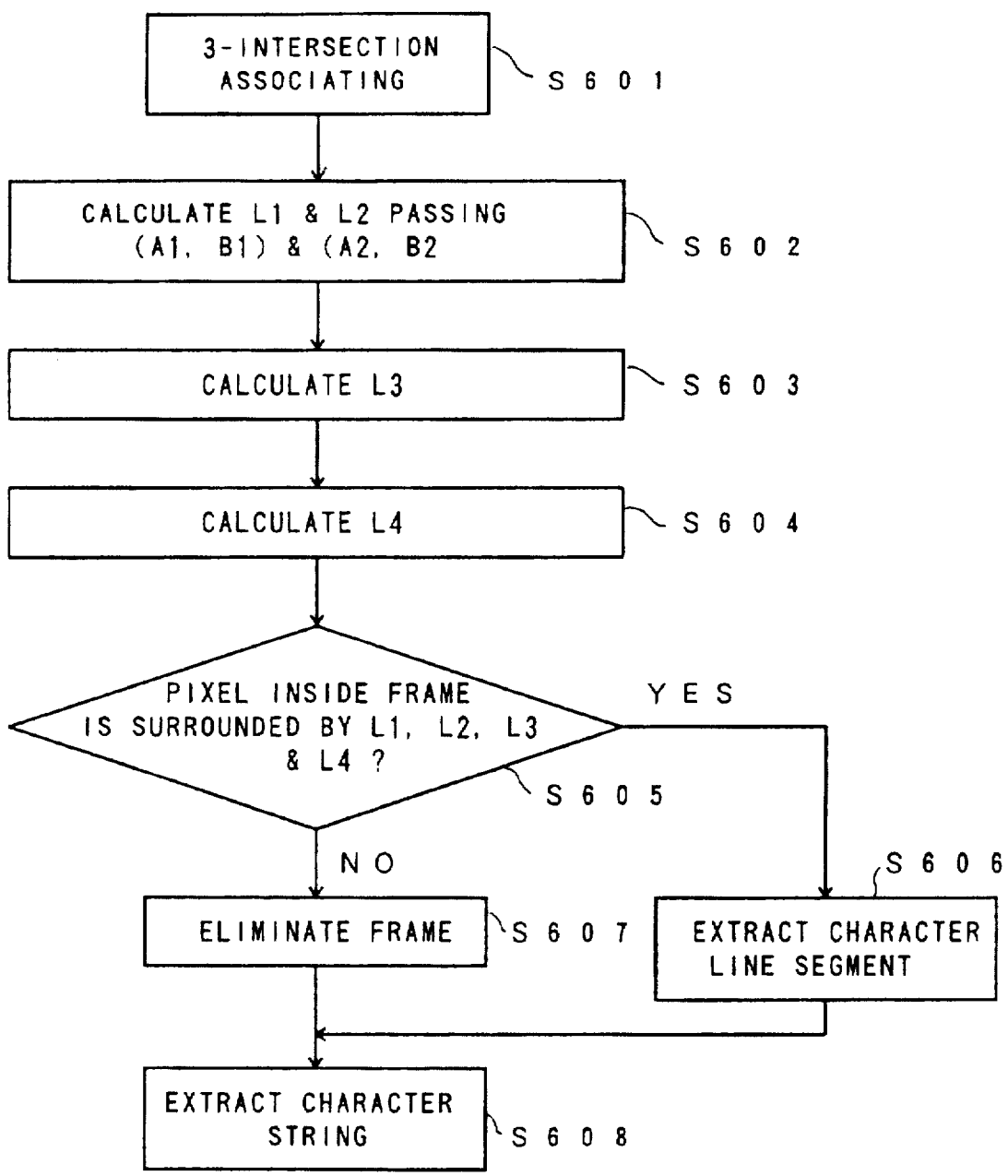
FIG. 72 is a flow chart for explaining an embodiment of a process of a frame interior character extracting part 56.

FIG. 72 shows a flow chart for the case where the process of the frame interior character extracting part 56 is carried out by software, in order to describe an embodiment of the process of the frame interior character extracting part 56 in more detail.

In FIG. 72, a step S601 receives the information related to the associated intersections and the like from the 3-intersection associating part 55, and a step S602 calculates straight lines L1 and L2 respectively passing between the associated first intersection (A1, B1) and second intersection (A2, B2). A step S603 calculates a straight line L3 of the frame on which the first intersection exists, and a step S604 calculates a straight line L4 of the frame on which the second intersection exists. A step S605 decides whether or not there exists a black pixel inside the frame and surrounded by the 4 straight lines L1, L2, L3 and L4. If the decision result in the step S605 is YES, a step S606 extracts the character line segment, and the process advances to a step S608 which carries out the process of the character string extracting part 12-1. On the other hand, if the decision result in the step S605 is NO, a step S607 eliminates the frame, and the process advances to the step S608.

Figure 43:
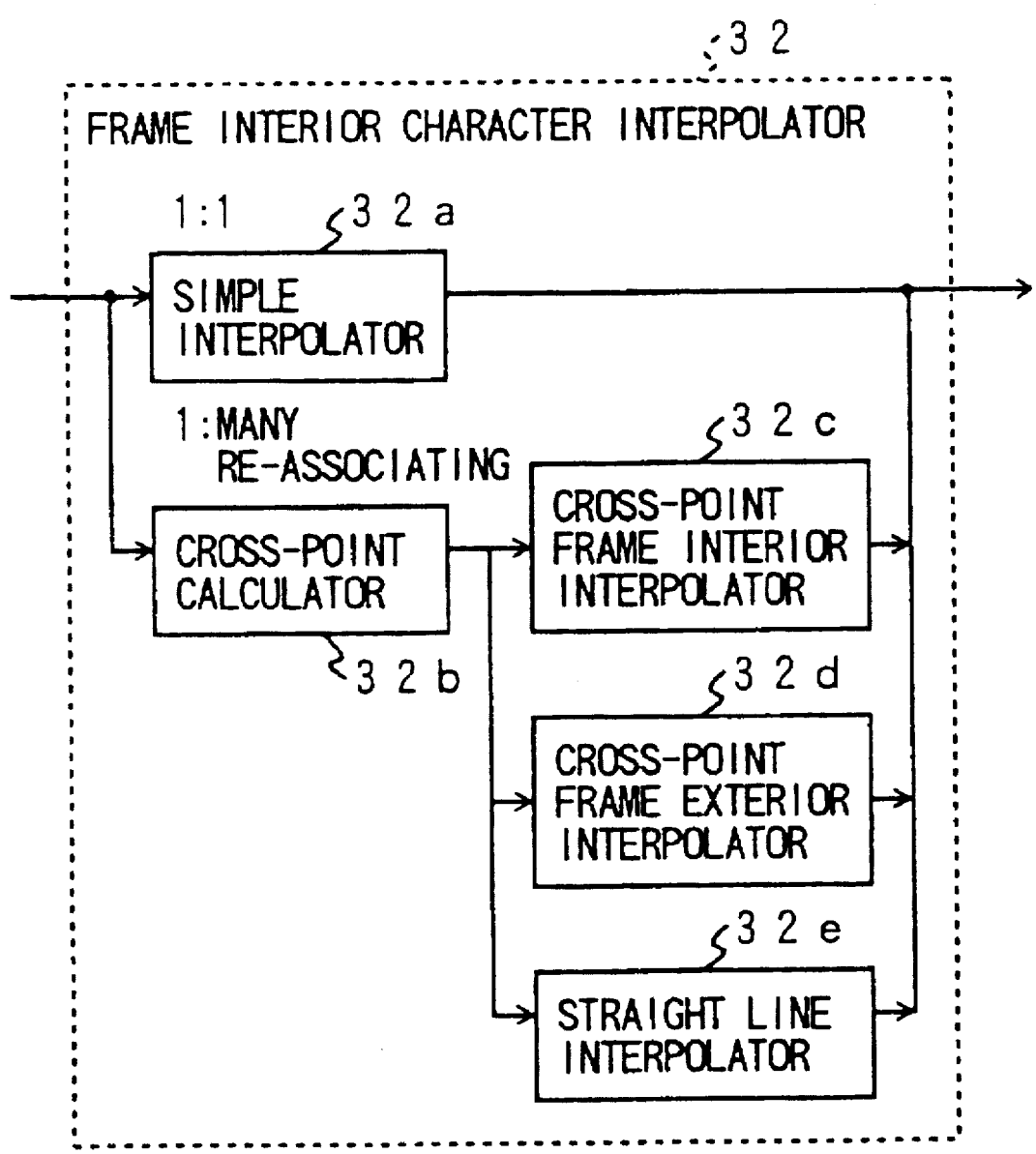
FIG. 43 is a system block diagram showing an embodiment of a frame interior character interpolator 32.

(13) Interpolation of Frame Interior Character:

The frame interior character interpolator 32 shown in FIGS. 40 and 43 distinguishes the case where the intersections have the one-to-one association and the case where the intersections have the one-to-many association. The frame interior interpolator 32 smoothly connects the intersections of the contact character pattern or a portion thereof, and interpolates the character portion which dropped out (or chipped) when separating the frame. The term "frame interior character" refers to the character written inside the frame.

The simple interpolator 32a shown in FIG. 43 is provided as a means for smoothly connecting the intersections of the contact character pattern or a portion thereof which has the one-to-one association. Basically, when making the one-to-one interpolation, the direction vector of the contour of the character line segment between the intersections is calculated. A straight line is drawn from each intersection depending on the direction vector, and the character line segments are connected at the point where such straight lines intersect. In addition, in order to omit the trouble of calculating the direction vector, it is possible to carry out the interpolation by connecting each of the associated intersections.

Figure 73:
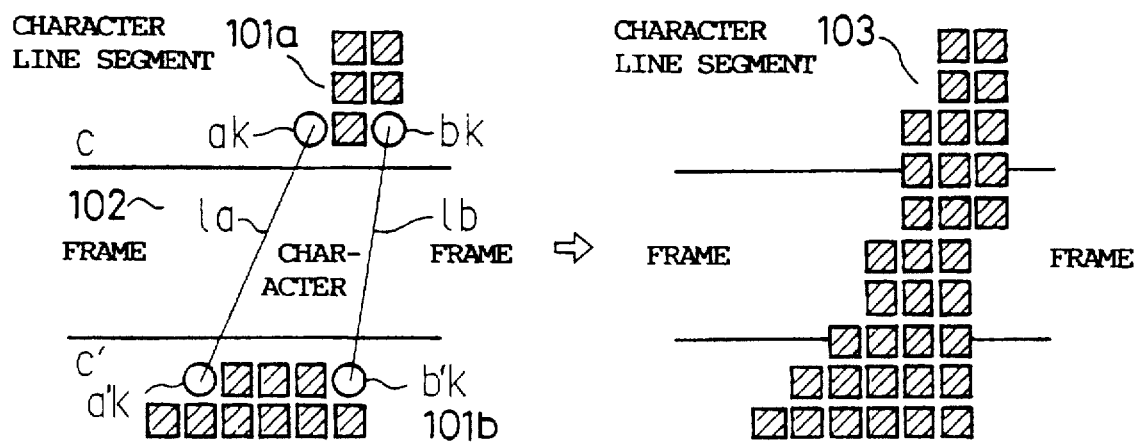
FIG. 73 is a diagram for explaining a one-to-one simple interpolation.

FIG. 73 shows an example of the one-to-one simple interpolation. In FIG. 73, there are shown character line segments 10a and 10b which are to be interpolated, a frame 102, and an interpolated line segment 103. FIG. 73 shows a case where the interpolation is carried out by connecting each of the associated intersections. The intersections of the character line segment 101a and the intersections of the character line segment 101b are connected by straight lines as shown on the left side of FIG. 73, and the area between the two straight lines is filled by black pixels so as to obtain the interpolated character line segment 103 shown on the right side of FIG. 73.

Figure 74:
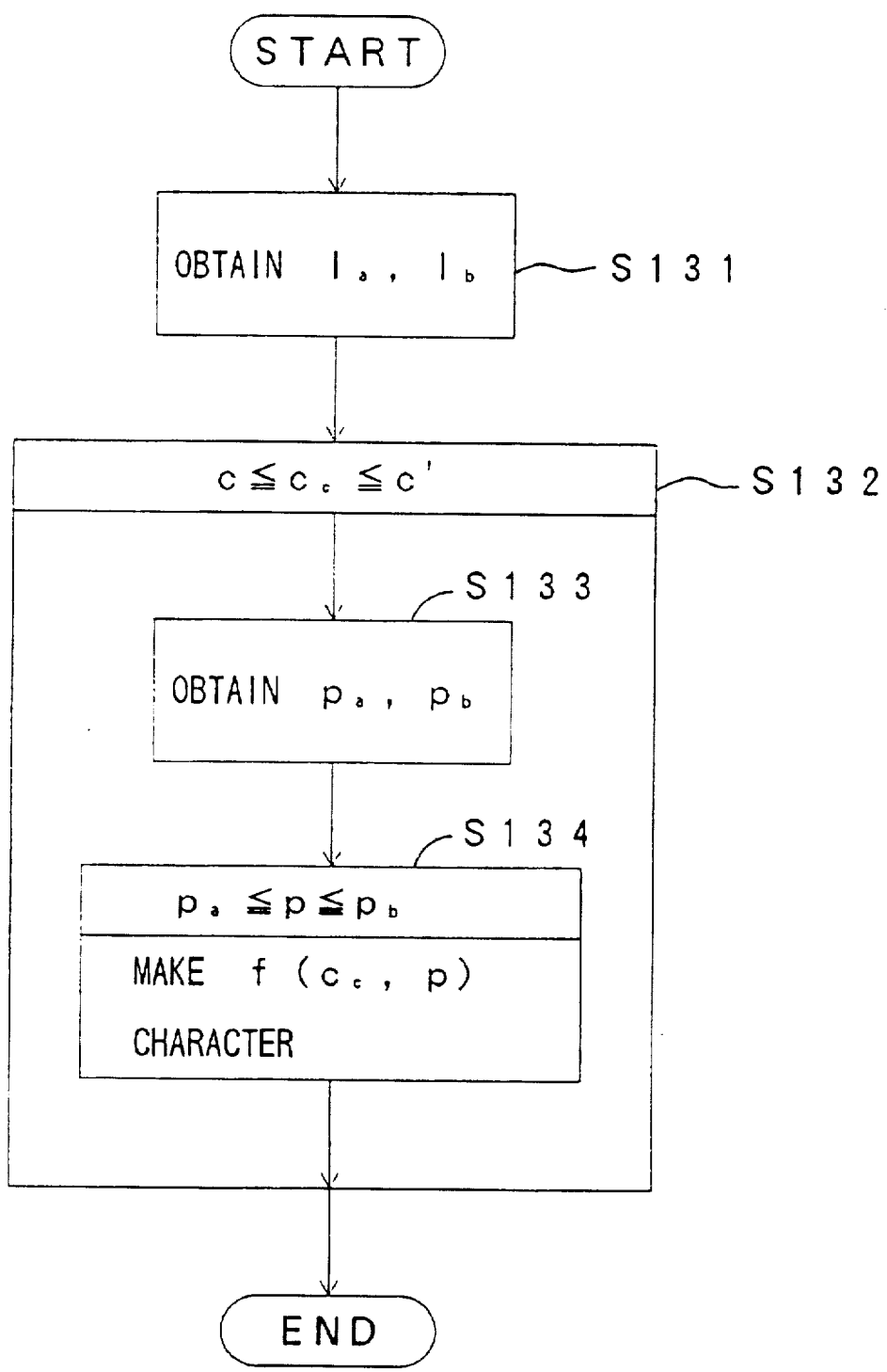

FIG. 74 shows a flow chart for the case where the process of the simple interpolator 32a is carried out by software, in order to describe an embodiment of the process of the simple interpolator 32a in more detail.

In FIG. 74, a step S131 obtains a straight line la connecting the intersections $a_k$ and $a'_k$ and a straight line lb connecting the intersections $b_k$ and $b'_k$ in FIG. 73. A step S132 sets cc to $c \leq cc \leq c'$ for coordinates c and c' which respectively are 1 pixel to the character side from the frame 102 in FIG. 73. A step S133 obtains an intersection pa of the straight line la and the frame 102, and an intersection pb of the straight line lb and the frame 102. A step S134 sets p to $pa \leq p \leq pb$, and regards f(cc, p) as the character. The steps S133 and S134 are repeated within a range of cc such that $c \leq cc \leq c'$.

In the case of the one-to-many interpolation, the cross-point calculator 32b first calculates the direction vector of the contour of the character line segment at each intersection. A straight line is drawn from each intersection depending on the direction vector, and the intersection of such straight lines is calculated. In order to omit the trouble of calculating the direction vector, the direction vector may be substituted by the straight line which connect the associated intersections.

After the cross-points are calculated in the cross-point calculator 32b, the cross-point frame interior interpolator 32c carries out the interpolation when the calculated cross-point exists within the frame.

Figure 75A:
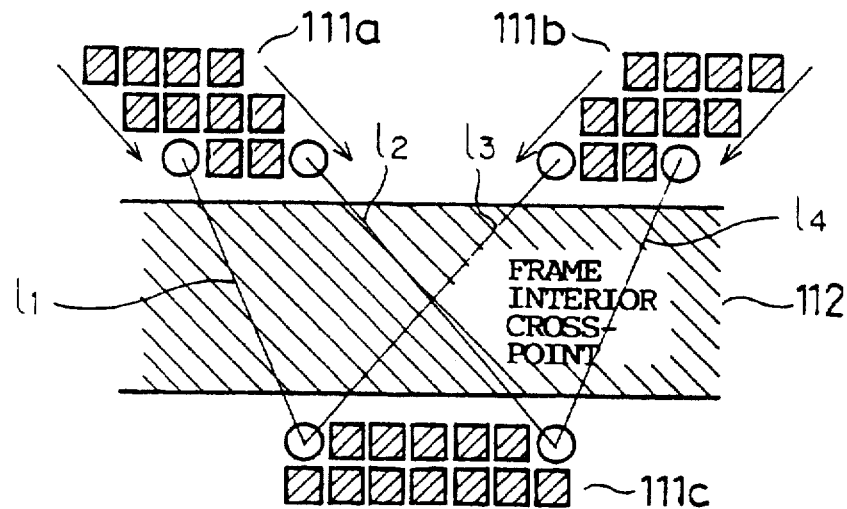
FIGS. 75A and 75B respectively are diagrams for explaining a cross-point frame interior interpolation.
Figure 75B:
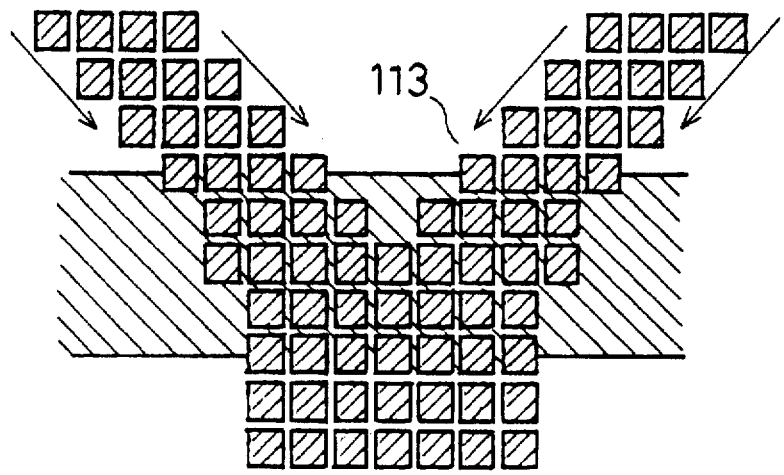

FIGS. 75A and 75B are diagrams showing an example of the cross-point frame interior interpolation. FIG. 75A shows character line segments 111a, 111b and 111c before the interpolation and a frame 112, and FIG. 75B shows the frame 112 and an interpolated character line segment 113. FIGS. 75A and 75B show a case where the direction vector is substituted by the straight line connecting the associated intersections. When the associated intersections are connected by the straight line and a cross-point of such straight lines exists within the frame 112 as shown in FIG. 75A, the area between the straight lines is filled by black pixels as shown in FIG. 75B so as to interpolate the character line segments 111a, 111b and 111c.

Figure 76:
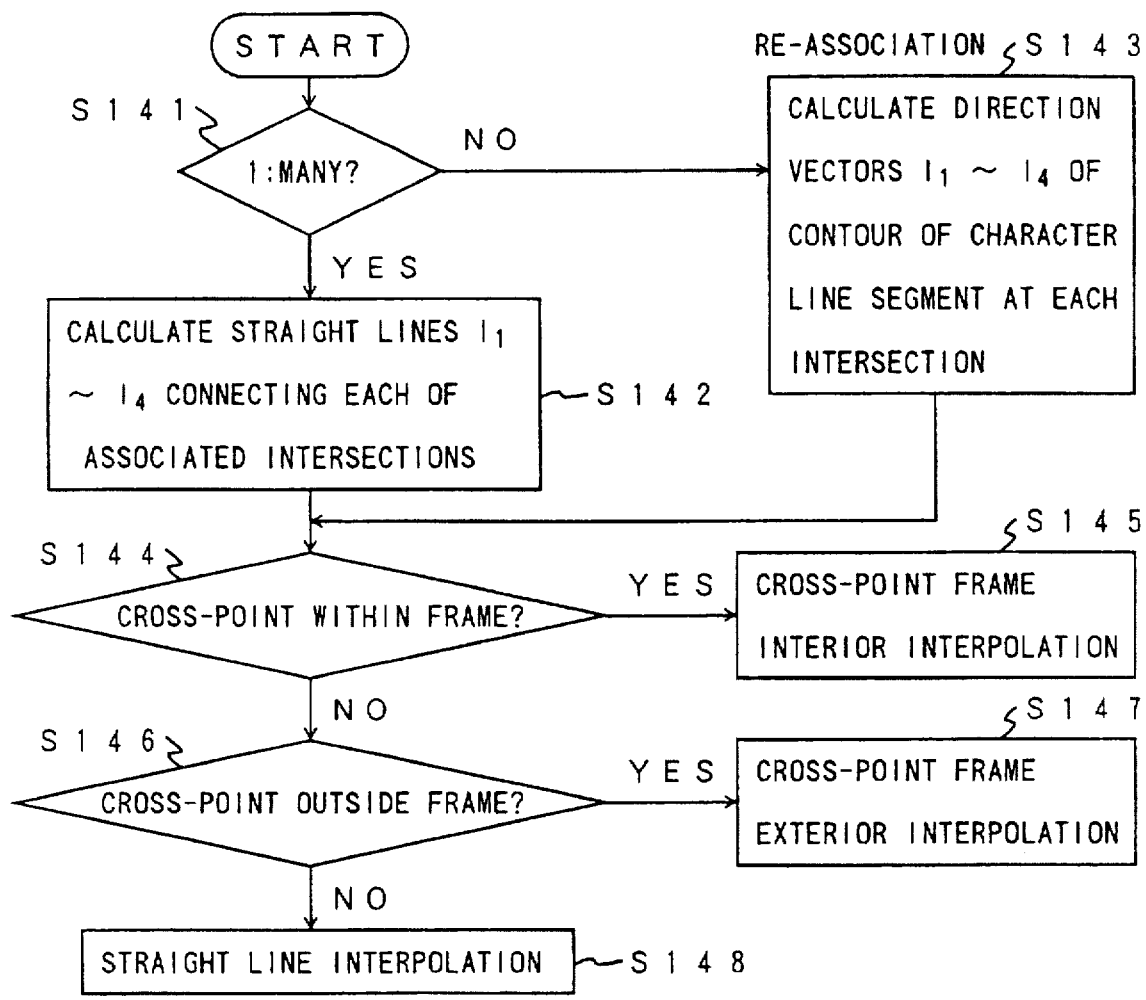
FIG. 76 is a flow chart for explaining a process of a cross-point calculator 32b.

FIG. 76 shows a flow chart for the case where the process of the cross-point calculator 32b is carried out by software, in order to describe an embodiment of the process of the cross-point calculator 32b in more detail.

In FIG. 76, a step S141 decides whether or not the interpolation is the one-to-many interpolation. If the decision result in the step S141 is YES, a step S142 calculates straight lines l1 through l4 which connect each of the associated intersections. On the other hand, if the decision result in the step S141 is NO, a step S143 calculates direction vectors $l_1$ through $l_4$ of the contour of the character line segment at each of the intersections. After the step S142 or S143, a step S144 decides whether or not the cross-point exists within the frame 122. If the decision result in the step S144 is YES, a step S145 advances to the process of the cross-point frame interior interpolator 32c which will be described later. On the other hand, if the decision result in the step S144 is NO, a step S146 decides whether or not the cross-point exists outside the frame 112. If the decision result in the step S146 is YES, a step S147 advances to the process of the cross-point frame exterior interpolator 32*d* which will be described later. In addition, if the decision result in the step S146 is NO, a step S148 advances to the process of the straight line interpolator 32*e*.

Figure 77:
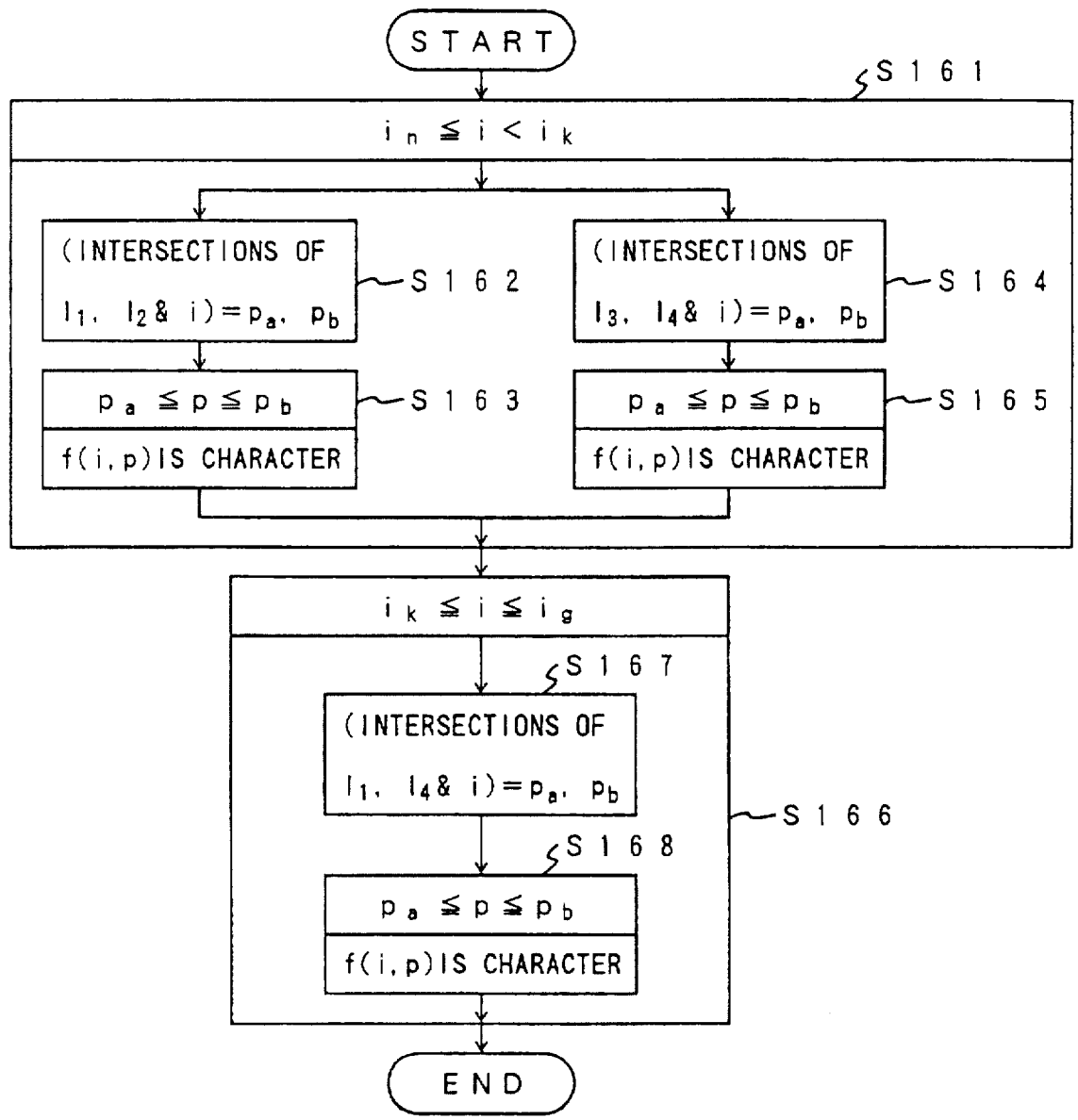
FIG. 77 is a flow chart for explaining a process of a cross-point frame interior interpolator 32c.

FIG. 77 shows a flow chart for the case where the process of the cross-point frame interior interpolator 32*c* is carried out by software, in order to describe an embodiment of the process of the cross-point frame interior interpolator 32*c* in more detail. In FIG. 77 and FIGS. 78 through 81 which will be described later, it is assumed for the sake of convenience that $(i_k, i_k)$ denotes the cross-point and the intersection of the straight lines 11 and 12 in FIG. 75A, $i_n$ denotes the associate of the inner contour of the frame 112, $i_g$ denotes the associate of the outer contour of the frame 112, w denotes the line width of the character, and $i_{g-w}$ denotes the associate on the inside of the outer contour of the frame 112 by an amount corresponding to the character line width w.

In FIG. 77, a step S161 sets i to $i_n \leq i \leq i_k$. A step S162 sets the intersections of the straight lines 11 and 12 and i to Pa and Pb, and a step S163 regards f(i, P) as the character if P satisfies $Pa \leq P \leq Pb$. In addition, steps S164 and 165 are carried out simultaneously as the steps S162 and S163. The step S164 sets the intersections of the straight lines 13 and 14 and i to Pa and Pb, and the step S165 regards f(i, P) as the character if P satisfies $Pa \leq P \leq Pb$. The above described steps S162 through S165 are repeated within a range of $i_n \leq i \leq i_k$. In addition, a step S166 sets i to $i_k \leq i \leq i_g$. A step S167 sets the intersections of the straight lines 11 and 14 and i to Pa and Pb, and a step S168 regards f(i, P) as the character if P satisfies $Pa \leq P \leq Pb$. The steps S167 and S168 are repeated within a range of $i_k \leq i \leq i_g$, and the process thereafter ends.

Figure 78:
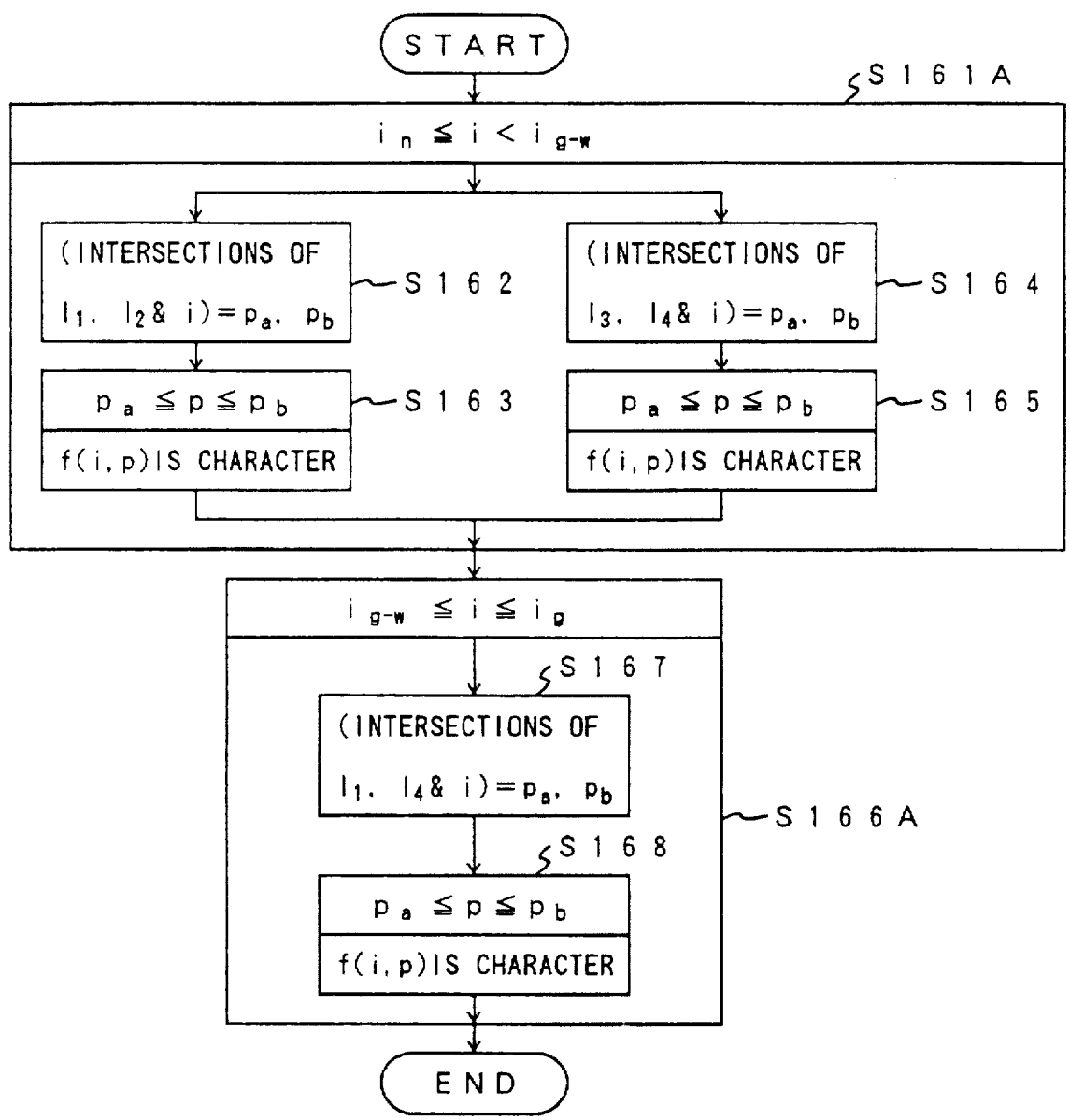
FIG. 78 is a flow chart for explaining a process of a cross-point frame exterior interpolator 32d.

FIG. 78 shows a flow chart for the case where the process of the cross-point frame exterior interpolator 32*d* is carried out by software, in order to describe an embodiment of the process of the cross-point frame exterior interpolator 32*d* in more detail.

In FIG. 78, those steps which are the same as those corresponding steps in FIG. 77 are designated by the same reference numerals, and a description thereof will be omitted.

The process shown in FIG. 78 is basically the same as that shown in FIG. 77 except that in FIG. 78, a step S161A sets i to $i_n \leq i_{g-w}$ and a step S166A sets i to $i_{g-w} \leq i \leq i_g$.

Figure 79:
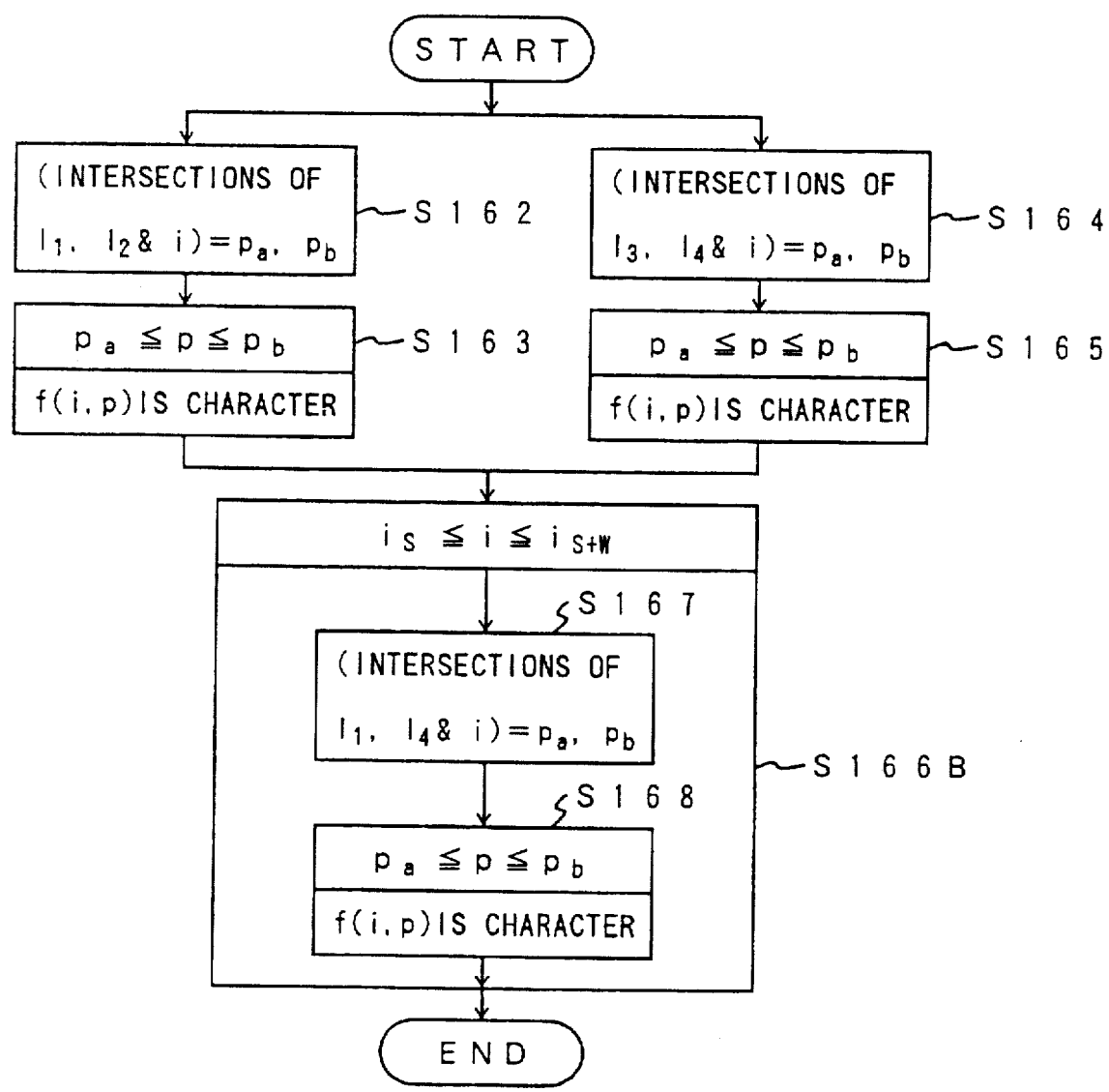
FIG. 79 is a flow chart for explaining a process of a straight line interpolator 32e.

FIG. 79 shows a flow chart for the case where the process of the straight line interpolator 32*e* is carried out by software, in order to describe an embodiment of the process of the straight line interpolator 32*e* in more detail. In FIG. 79, those steps which are the same as those corresponding steps in FIG. 77 are designated by the same reference numerals, and a description thereof will be omitted.

The process shown in FIG. 79 is basically the same as that shown in FIG. 77 except that in FIG. 79, no step S161 is provided and a step S166B sets i to $i_s \leq i \leq i_{s+w}$.

Figure 80:
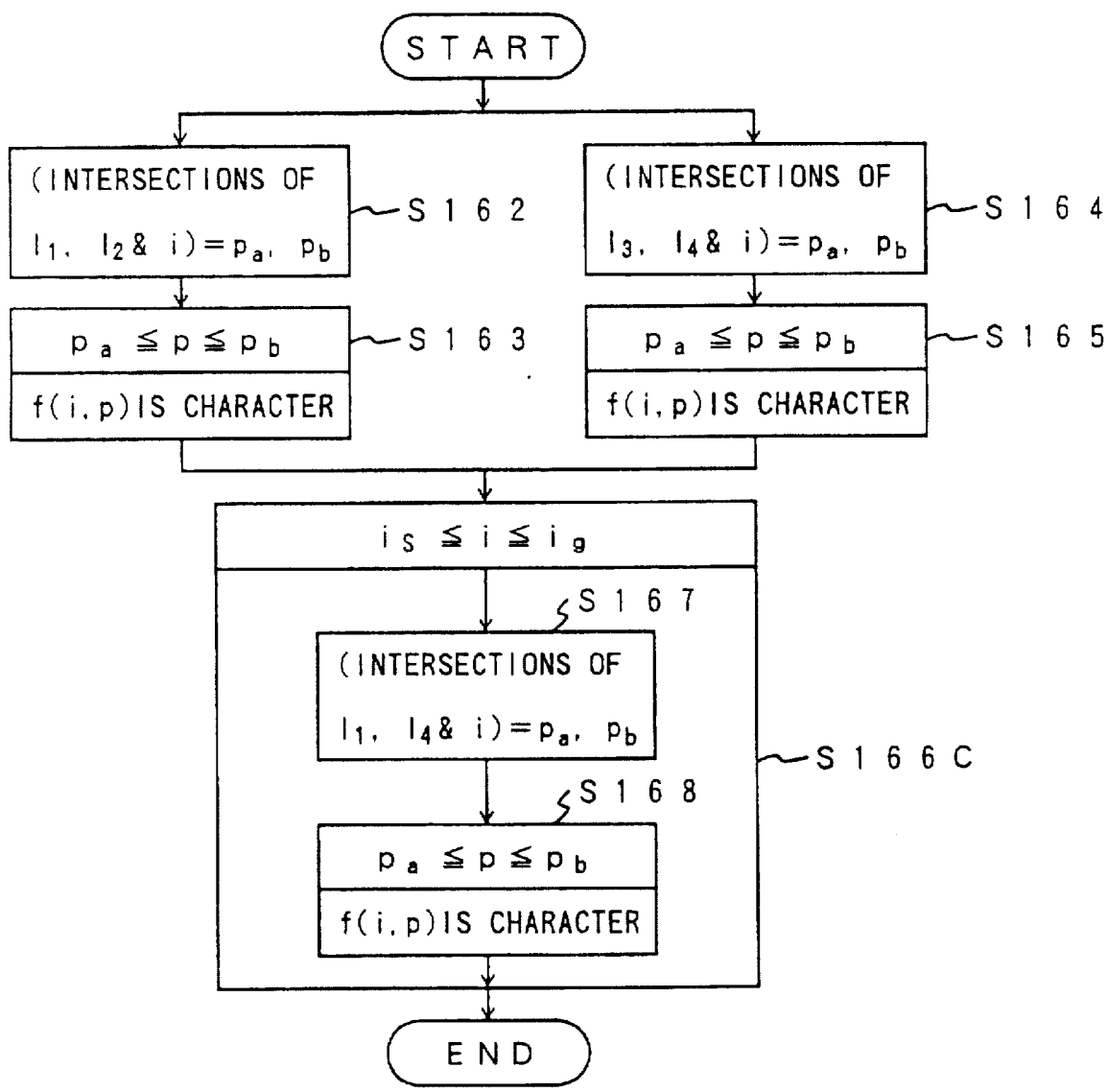
FIG. 80 is a flow chart for explaining a process with respect to interpolations which cannot be associated.

With respect to the intersection which cannot be associated, a software processing such as that shown in FIG. 80 may be carried out. In FIG. 80, those steps which are the same as those corresponding steps in FIG. 77 are designated by the same reference numerals, and a description thereof will be omitted.

The process shown in FIG. 80 is basically the same as that shown in FIG. 77 except that in FIG. 80, no step S161 is provided and a step S166C sets i to $i_s < i \leq i_{ig}$.

(14) Integration of the Connected Pattern:

The connected pattern integrating part 34 integrates the contact character pattern which is interpolated in the frame interior character interpolator 32, the character pattern or a portion thereof added with the attribute in the connected pattern attribute adder 23, and the patterns obtained from the plural continuity confirming parts 57-1 and 57-2 which will be described later.

Figure 44:
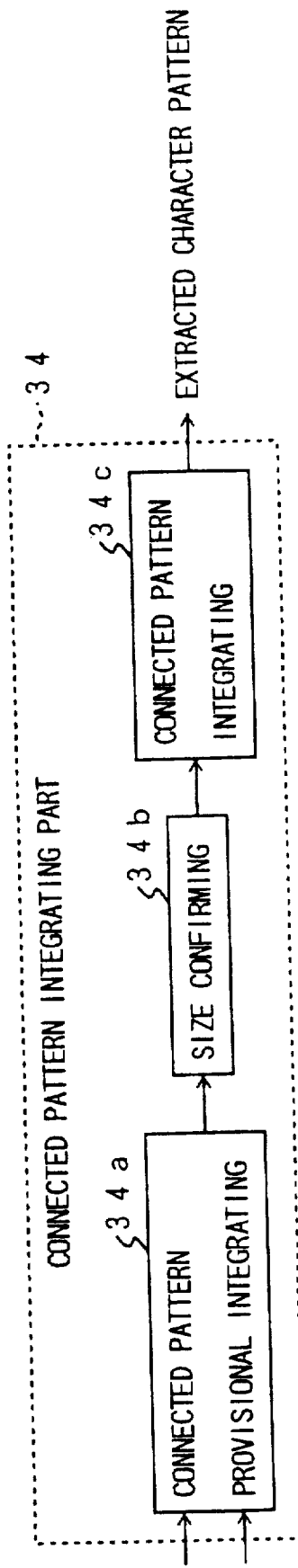
FIG. 44 is a system block diagram showing an embodiment of a connected pattern integrating part 34

In the case where the frame is a 1-character frame, integration is taken into consideration with regard to the interpolated pattern and the character pattern added with the attribute or even a portion thereof if this portion belongs to the same character frame. Hence, the provisional integration is made in the connected pattern provisional integrating part 34*a* shown in FIG. 44, and the size of the pattern which is obtained by the integration of the two is confirmed in the size confirming part 34*b*. The two are integrated in the connected pattern integrating part 34*c* if the confirmed size is appropriate, and no integration is made if the confirmed size is not appropriate.

In other words, based on the position of the extracted 1-character frame, the partial patterns are integrated as elements forming 1 character if a portion of the partial patterns exist within 1-character frame. The size of the pattern obtained by this integration is obtained, and the size ratio between this size and the size of 1-character frame is calculated. A judgement is then made to determine whether or not the calculated size ratio falls within a predetermined range of the threshold value. The pattern is employed as it is if the calculated size ratio falls within the predetermined range of the threshold value. On the other hand, no integration is made and the character is extracted for each of the original partial patterns if the calculated size ratio falls outside the predetermined range of the threshold value.

According to this embodiment, it is possible to accurately extract the character which conventionally could not be accurately extracted, because the character extraction is made in the above described manner.

Figure 81:
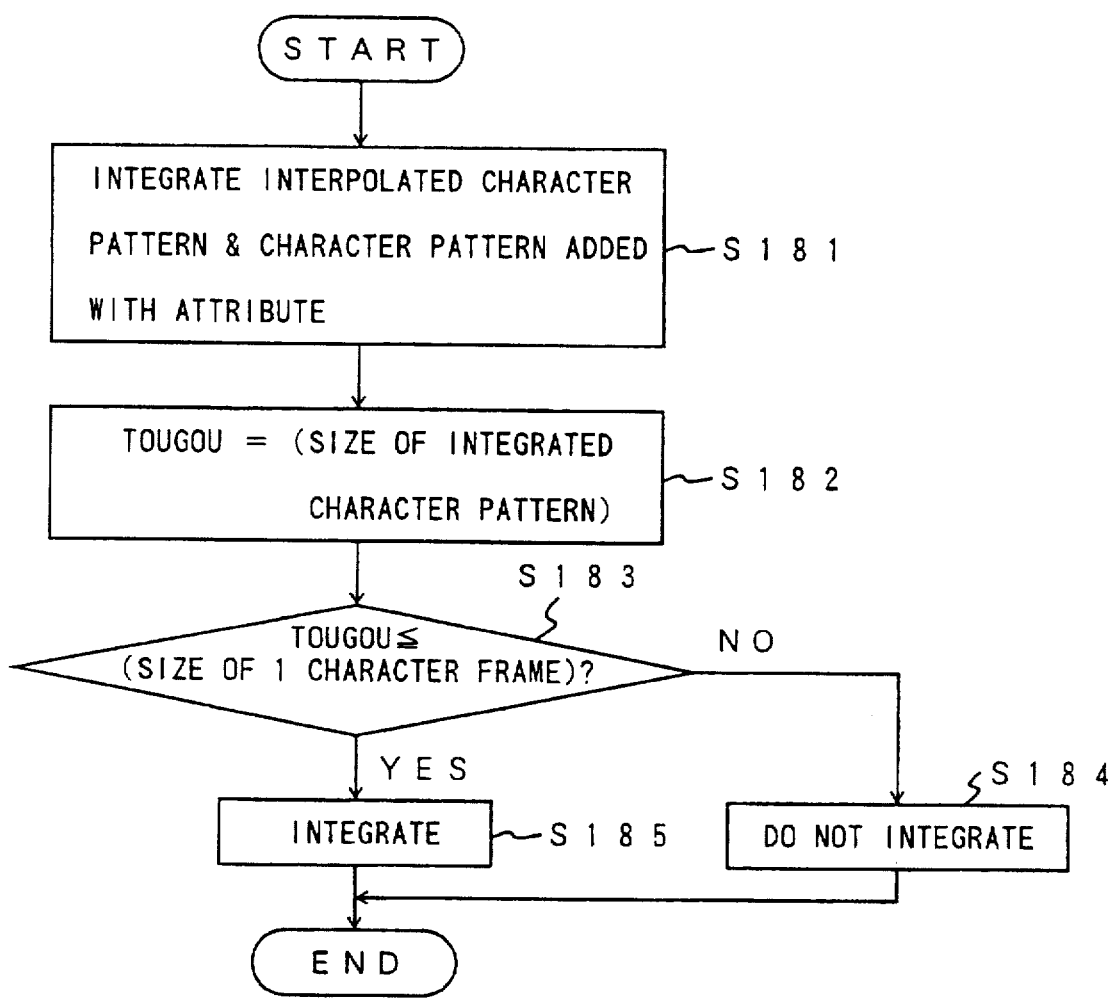
FIG. 81 is a flow chart for explaining a process of a connected pattern integrating part 34.

FIG. 81 shows a flow chart for the case where the process of the connected pattern-integrating part 34 is carried out by software, in order to describe an embodiment of the process of the connected pattern integrating part 34 in more detail.

In FIG. 81, a step S181 integrates the interpolated character pattern and the character pattern added with the attribute, an a step S182 sets TOUGOU which indicates the size of the integrated character pattern. A step S183 decides whether or not TOUGOU is less than the size of 1-character frame. If the decision result in the step S183 is NO, a step S184 does not carry out the integration, and the process ends. On the other hand, if the decision result in the step S183 is YES, a step S185 carries out the integration, and the process ends thereafter.

(15) Extraction of Character String:

The character string extracting part 12-1 shown in FIG. 40 extracts the labelled character string based on the information related to the character obtained from the frame interior character extracting part 56. In addition, the character string extracting part 12-2 shown in FIG. 40 extracts the labelled character string based on the information related to the character obtained from the frame interior character interpolator 32, similarly to the character string extracting part 12-1.

(16) Integration of Average Character Size and Pitch:

The average character size and pitch integrating part 16-1 shown in FIG. 40 integrates the character based on information related to the pitch dispersion value, the size dispersion value, the average character size, the average character pitch and the small separated stroke extracted based on the information obtained via the character string extracting part 12-1, and the information related to the average character size, the size dispersion value and the pitch dispersion value.

Figure 82:
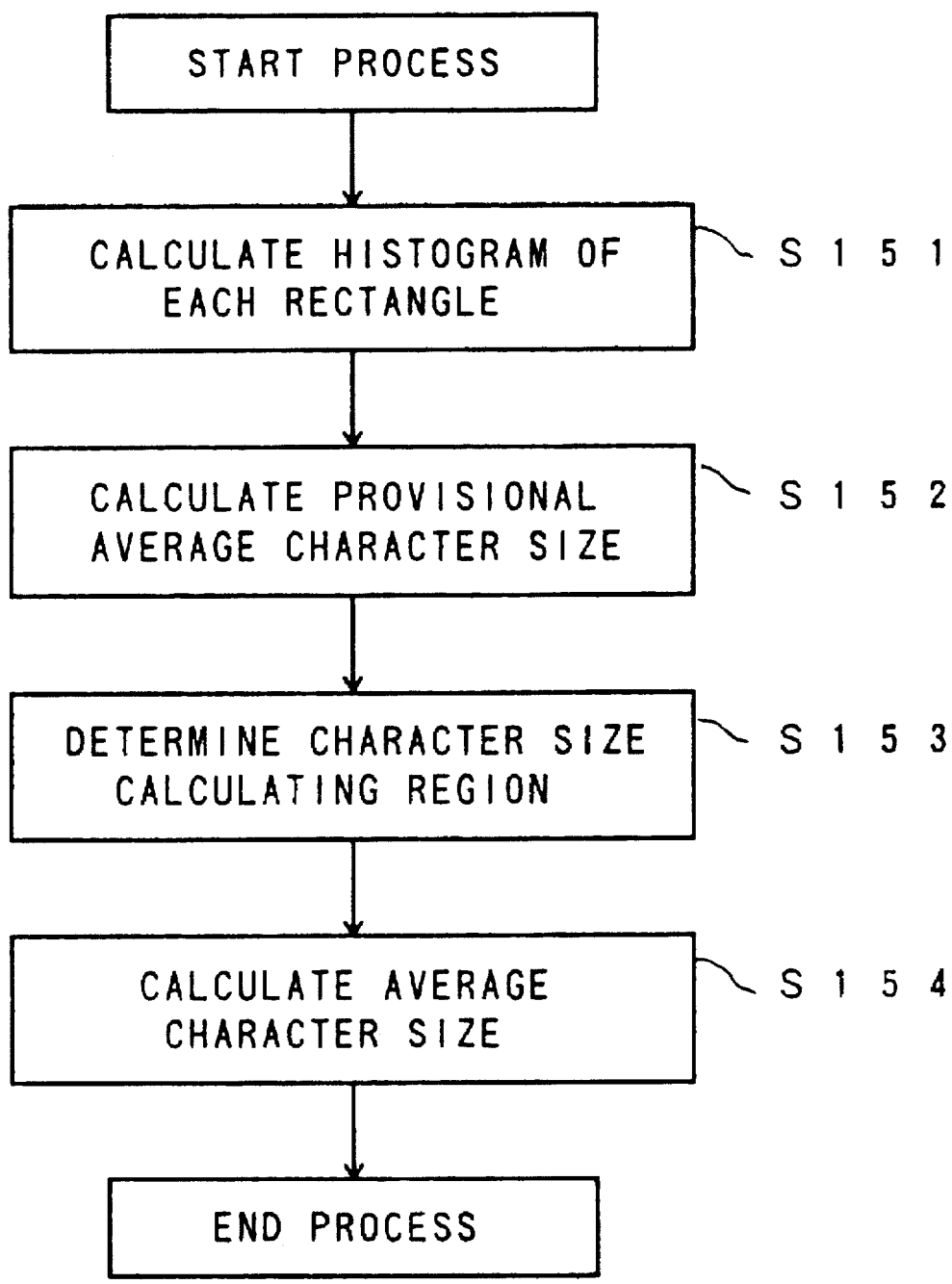
FIG. 82 is a flow chart for explaining an average character size calculating process.
Figure 83A:
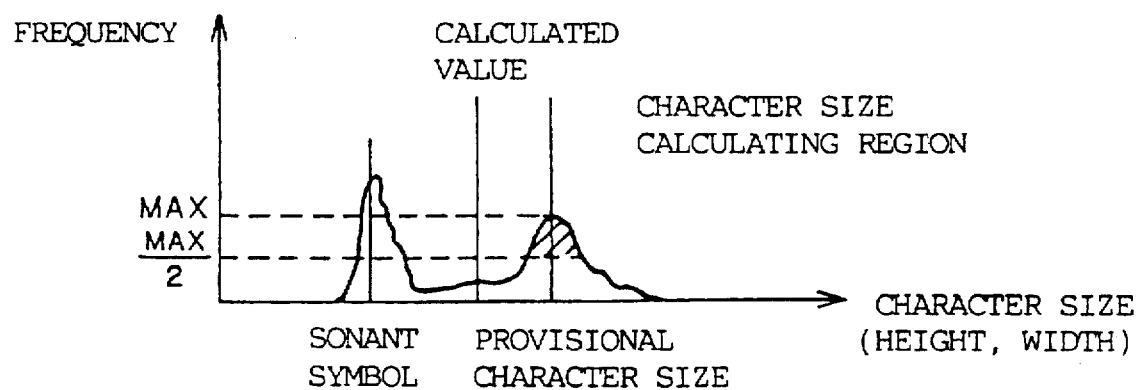
FIGS. 83A and 83B respectively are diagrams for explaining a method of calculating an average character size.

FIG. 82 is a flow chart showing a process of calculating the average character size. As shown in FIG. 82, a step S151 calculates a histogram of the length in the vertical (horizontal) direction of the respective rectangles. A step S152 calculates the average vertical (horizontal) character size based on this histogram, and regards this size as a provisional average character size. In this state, if the character is a Japanese Katakana character, the histogram includes two peaks as shown in FIG. 83A due to the small separated stroke caused by the Japanese sonant (voiced sound) symbol, and the Japanese Katakana character "ha", "ri", "ku" which may appear to resemble each other depending on the handwriting. The Japanese sonant symbol looks similar to an apostrophe mark ("). Similarly, the histogram also includes two peaks in the case of the numerals "5" and "7" due to the small separated stroke caused thereby or, in the case of the alphabets "A" and "E" due to the small separated stroke caused thereby. For this reason, the calculated provisional average character size is calculated to be smaller than the average character size.

A step S153 calculates the character size in a region to the right of the provisional average character size such that the histogram takes a maximum value MAX, and determines a region in which the histogram has a value MAX/2 or greater in the directions to the right and left of this character size. If the peak portion of the histogram is leaned towards one side as shown in FIG>84B, the histogram for the provisional character size is set to the maximum value MAX, and a region in which the histogram has the value MAX/2 or greater is determined. A step S154 calculates the average character size again in this region.

Figure 83B:
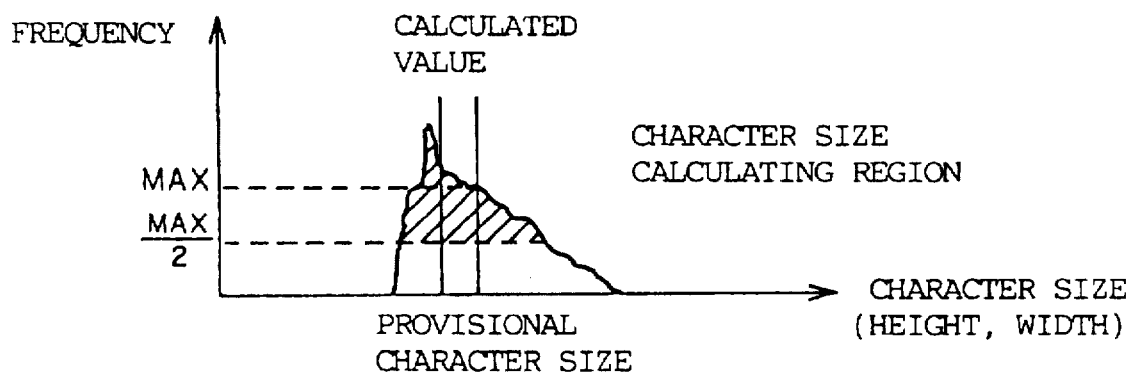

According to the above described method, it is possible to calculate the average character size without being affected by the small separated stroke such as the sonant symbol, and without being dependent on the distribution of the histogram as shown in FIGS. 83A and 83B.

Next, a description will be given of the process of extracting the small separated stroke. First, using the externally touched rectangle which is already extracted for each stroke, a decision is made to determine whether or not the area of the externally touched rectangle is ½ or less than the area of the average character size or, whether or not the height of the externally touched rectangle is ⅘ or less than the height of the average character size. If the condition related to the area ratio and/or the height ratio is satisfied, the partial pattern of the externally touched rectangle is extracted as the small separated stroke. The horizontal size (width) is not taken into consideration in this case because there exists a small separated stroke having a size which is not much different from the average size even though it is a small separated stroke, such as the case of the small separated stroke of the numeral "5".

Figure 84:
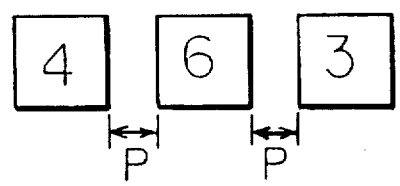
FIG. 84 is a diagram for explaining a method of calculating a pitch.

Next, a description will be given of the process of calculating the character pitch. With regard to the pattern which is not judged as being a small separated stroke (that is, the pattern which is judged as being 1 character by itself) in the process of extracting the small separated stroke, a distance p between each 2 adjacent externally touched rectangles is regarded as the pitch as shown in FIG. 84, and a histogram of the pitches is calculated. The calculation of the average character pitch and the calculation of the pitch dispersion value are made based on the result obtained by calculating the histogram of the pitches.

The process of calculating the average character pitch will now be described. First, a histogram of the pitches between each 2 adjacent rectangles is calculated. Then, the average character pitch is calculated based on this histogram, and this average character pitch is regarded as the provisional average character pitch. In addition, the character pitch is calculated in the region on the right of the provisional average character pitch such that the histogram has the maximum value MAX, the region in which the histogram has the value MAX/2 or greater is determined to the right and left of this character pitch, and the average character pitch is calculated again in this determined region. Next, the average character size and pitch integrating part 16-1 decides whether or not the following evaluation function F is greater than or equal to zero, and the integration using the size and pitch average and the size and pitch dispersion is made when the evaluation function F is greater than or equal to zero. In the following evaluation function F, MP denotes the pitch average, MW denotes the size average, VP denotes the pitch dispersion, α is 1.6, and β is 0.5, for example. These parameters α and β are of course not limited to such values.

$$F=(MP/MW)-(\alpha * VP+\beta)$$

Figure 85A:
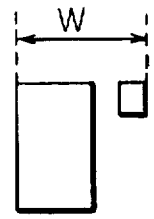
FIGS. 85A, 85B and 85C respectively are diagrams for explaining integration.

In other words, the integration that is carried out is dependent on the extent of the blank (white) between the characters ("pitch average"/"size average") and the pitch dispersion value. An integration width W of the character is the width amounting to the partial pattern to which the integration should be made and the partial pattern which should be integrated, as shown in FIG. 85A.

The average character size and pitch integrating part 16-2 shown in FIG. 40 integrates the character similarly to the above average character size and pitch integrating part 16-1, based on the information related to the pitch dispersion value, the size dispersion value, the average character size, the average character pitch and the small separated stroke extracted based on the information obtained via the character string extracting part 12-2.

Figure 86A:
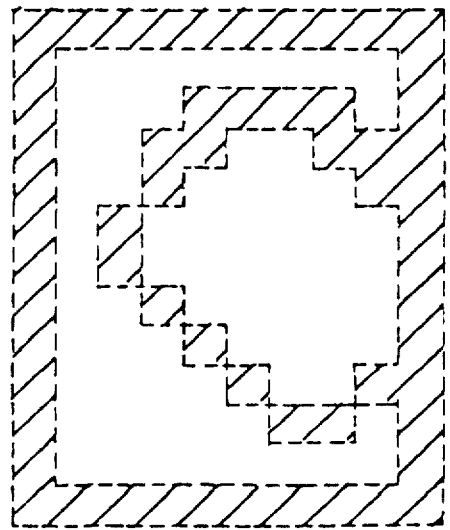
FIGS. 86A, 86B and 86C respectively are diagrams for explaining a case where the number of connected components does not change between an original image and a processed image but the number of holes and the Euler number change.
Figure 86B:
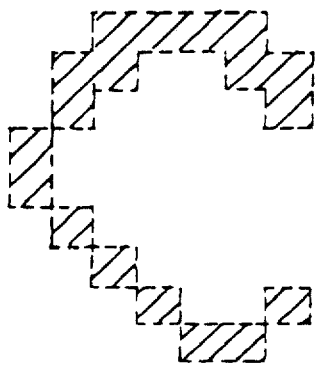
Figure 86C:
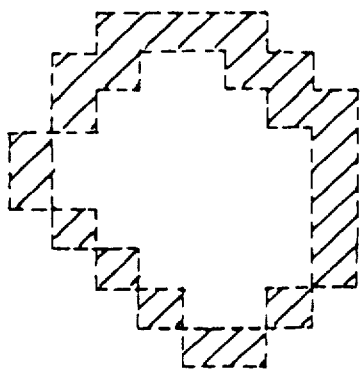

(17) Confirmation of Plural Continuities:

In FIG. 40, the plural continuity confirming part 57-1 calculates the range of the frame to be re-interpolated from the positional deviation (or error) between the position of the extracted frame and the position of the character line segment. In addition, within the calculated range, the number of connected components, the number of holes and the Euler number for the original image and the presently processed image are compared. If the compared results do not match, the 3-intersection associating part 55 makes the re-association to maintain the same connection or continuity of the character component as the original image depending on the magnitude of the contact frequency calculated in the contact frequency calculator 51. Accordingly, when the portion between of the re-associated intersections is interpolated by the frame interior character interpolator 32, it is possible to extract the numeral "0" as may be seen from FIGS. 86A through 86C, for example. FIGS. 86A through 86C show a case where the number of connected components does not change but the number of holes and the Euler number change between the original image and the processed image. More particularly, FIG. 86A shows the original image, FIG. 86B shows the character extracted by the frame interior character extracting part 56, and FIG. 86C shows the interpolated character which is obtained by making the interpolation in the frame interior character interpolator 32 after re-associating the intersections in the 3-intersection associating part 55 based on the comparison results obtained from the plural continuity confirming part 57-1.

Figure 87:
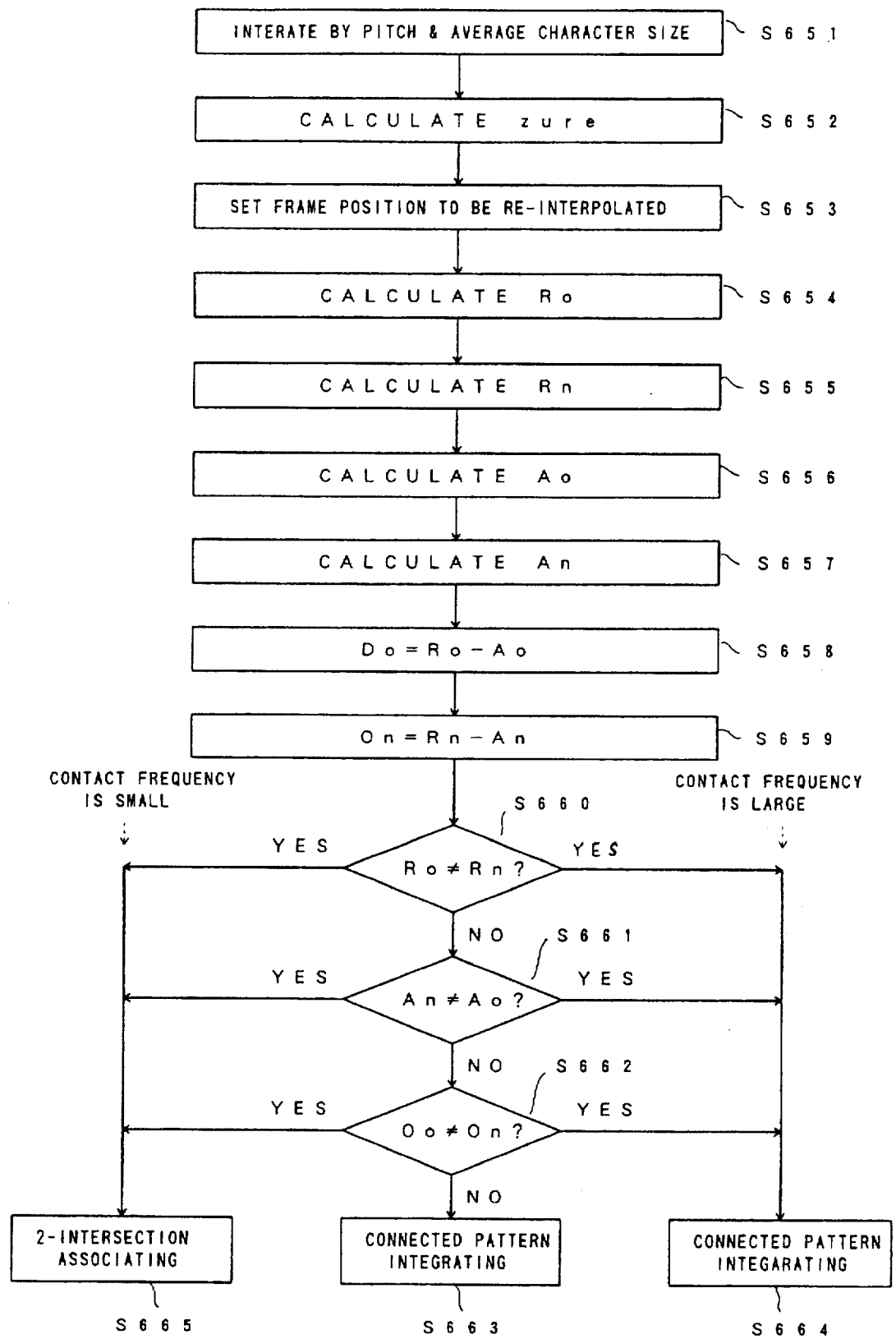
FIG. 87 is a flow chart for explaining an embodiment of a process of a plural continuity confirming part 57-1.

FIG. 87 shows a flow chart for the case where the process of the plural continuity confirming part 57-1 is carried out by software, in order to describe an embodiment of the process of the plural continuity confirming part 57-1 in more detail.

In FIG. 87, a step S651 receives the results of the integration from the average character size and pitch integrating part 16-1, and a step S652 calculates the positional deviation (or error) between the position of the frame and the position of the extracted character. A step S653 sets the position of the frame with respect to which the re-interpolation is to be made. A step S654 calculates a number $R_o$ of connected components of the original image. A step S655 calculates a number $R_n$ of connected components of the presently processed image. A step S656 calculates a number $A_o$ of holes in the original image. A step S657 calculates a number $A_n$ of holes in the presently processed image. A step S658 calculates an Euler number $O_o$ of the original image from $O_o = R_o - A_o$. A step S659 calculates an Euler number $O_n$ of the presently processed image from $O_n = R_n - A_n$. A step S660 decides whether or not $R_o$ and $R_n$ are unequal. If $R_o$ and $R_n$ are equal and the decision result in the step S660 is NO, a step S661 decides whether or not $A_n$ and $A_o$ are unequal. If $A_n$ and $A_o$ are equal and the decision result in the step S661 is NO, a step S662 decides whether or not $O_o$ and $O_n$ are unequal. If $O_o$ d $O_n$ are equal and the decision result in the step S662 is NO, a step S663 advances the process to the process of the connected pattern integrating part 34. On the other hand, if the decision result in the step S660, 661 or S662 is YES, a step S664 advances the process to the process of the 3-intersection associating part 55 and the intersections are re-associated.

The process carried out by the plural continuity confirming part 57-2 is essentially the same as that carried out by the plural continuity confirming part 57-1. However, in the case of the plural continuity confirming part 57-2, the step S651 shown in FIG. 87 receives the results of the integration from the average character size and pitch integrating part 16-2. Furthermore, if the decision result in the step S660, S661 or S662 is YES, the step S665 advances the process to the process of the 2-intersection associating part 61 and the intersections are re-associated.

(18) Judging Re-Interpolation:

The re-interpolation judging part 63 shown in FIG. 40 judges whether or not to advance to the process of the certainty integrating part 17 using the previous pitch and average character size when no re-interpolation is necessary or when the processed result does not change from the previous result even after the re-interpolation, and otherwise judges whether or not the pitch and average character size are to be obtained again in the average character size and pitch integrating part 16-3. Since the process carried out by the average character size and pitch integrating part 16-3 is essentially the same as that carried out by the average character size and pitch integrating part 16-1 or 16-2 described above, a description thereof will be omitted.

Figure 88:
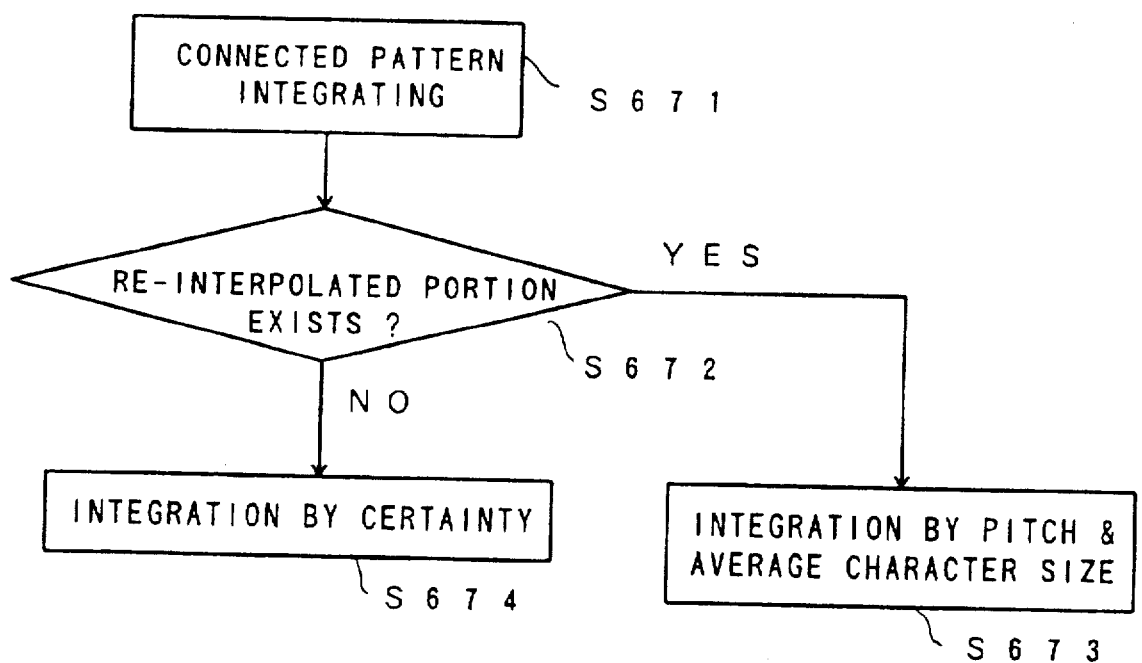
FIG. 88 is a flow chart for explaining an embodiment of a process of a re-interpolation judging part 63.

FIG. 88 shows a flow chart for the case where the process of the re-interpolation judging part 63 is carried out by software, in order to describe an embodiment of the process of the re-interpolation judging part 63 in more detail.

In FIG. 88, a step S671 receives information via the connected pattern integrating part 34, and a step S672 decides whether or not a re-interpolated portion exists. If the decision result in the step S672 is YES, the process advances to the process of the average character size and pitch integrating part 16-3 in order to obtain again the pitch and the average character size. On the other hand, if the decision result in the step S672 is NO, the process advances to the process of the certainty integrating part 17 using the previous pitch and average character size because the processed result does not change from the previous result even after the re-interpolation.

(19) Integration By Certainty:

The certainty integrating part 17 shown in FIG. 40 calculates the distances between the extracted small separated stroke and the character patterns located on the right and left thereof, and quantifies a ratio of these distances as a certainty of the integration, so that the integration is made when the certainty is high.

Figure 85B:
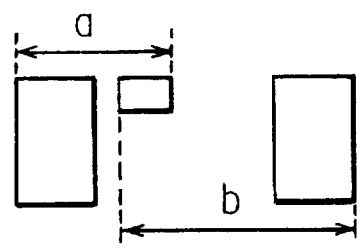
Figure 85C:
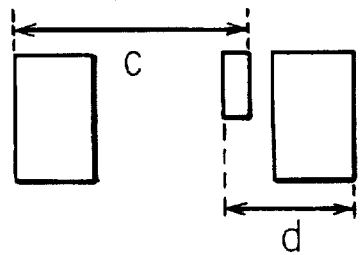

In other words, when the evaluation function F calculated in the average character size and pitch integrating part 16-1 is less than or equal to zero and a value obtained by dividing the pitch average by the size average is greater than 1, for example, the certainty integrating part 17 calculates the distances between the extracted small separated stroke and the patterns located on the right and left thereof, quantifies the ratio of these distances as the certainty of the integration, and carries out the integration when the certainty is high. For example, the certainty integrating part 17 uses distances a, b, c and d shown in FIGS. 85B and 85C, and integrates the partial patterns by the certainty when b is more than 2.6 times a and c is more than 2.6 times d. On the other hand, when b is less than or equal to 2.6 times a and c is less than or equal to 2.6 times d, the simple recognition process part 18 which will be described later integrates the small separated stroke by limiting the pattern to the numeral if the horizontal/vertical ratio of the small separated stroke is greater than 2.6.

(20) Integration By Simple Recognition:

The simple recognition process part 18 shown in FIG. 40 carries out a process with respect to the hand-written numeral having an overhang, and integrates the character by simply identifying the line density, inclination and character size with respect to the small separated stroke and the patterns located on the right and left thereof and the pattern obtained by integrating these patterns. In other words, with respect to the small separated stroke, the so-called pattern matching technique is not used, and instead, a judgement is made to determine whether or not it is 1 character or a partial pattern of the character. As a result, no complex process is required, and it is possible to carry out the process at a high speed.

Figure 89:
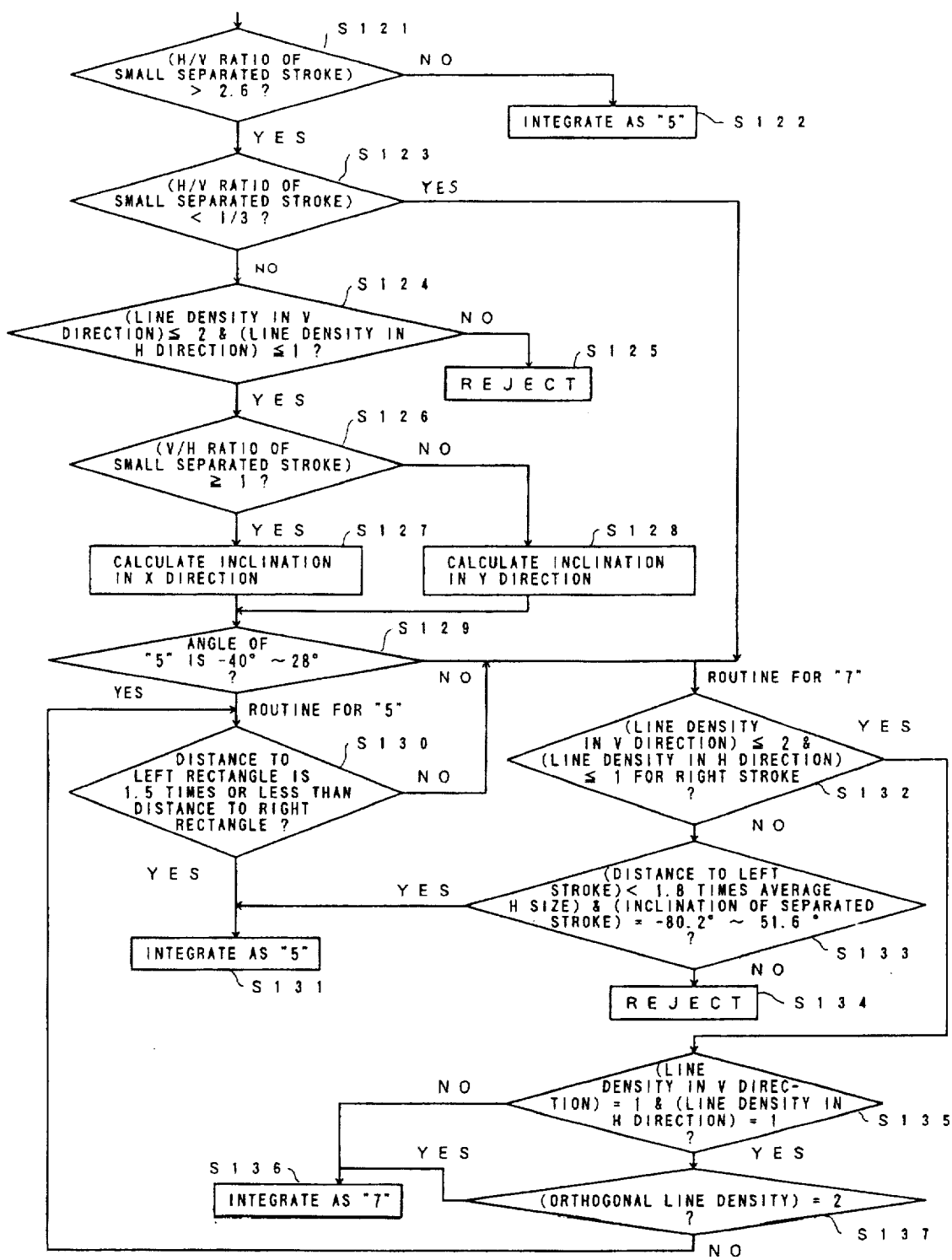
FIG. 89 is a flow chart for explaining an embodiment of a process of a simple recognition part 18.

FIG. 89 shows a flow chart for the case where the process of the simple recognition process part 18 is carried out by software, in order to describe an embodiment of the process of the simple recognition process part 18 in more detail.

In FIG. 89, a step S121 decides whether or not the horizontal/vertical ratio of the small separated stroke is greater than 2.6, and a step S122 integrates the small separated stroke as the numeral "5" if the decision result in the step S121 is NO. If the decision result in the step S121 is YES, a step S123 decides whether or not the horizontal/vertical ratio of the small separated stroke is less than ⅓. If the decision result in the step S123 is YES, a routine for the numeral "7" is carried out by a step S132 and following steps which will be described later. On the other hand, if the decision result in the step S123 is NO, a step S124 and following steps calculate the line density.

In the case of the numeral, the pattern which is extracted as the small separated stroke is limited to a small written character and the small separated stroke of the numeral "5" or "7". For this reason, the line density is calculated with respect to the small separated stroke so as to first judge whether the small separated stroke is the small written character or the small separated stroke of the numeral "5" or "7".

The line density may be calculated by a method shown in FIGS. 90A and 90B, for example. As shown in FIGS. 90A and 90B, a check is made to determine whether the externally touched rectangle is elongated in the horizontal direction or the vertical direction. If the externally touched rectangle is elongated in the vertical direction, the externally touched rectangle is horizontally divided into 4 equal parts, and the line density is calculated at the 2 lines excluding the center as shown in FIG. 90A. On the other hand, if the externally touched rectangle is elongated in the horizontal direction, the externally touched rectangle is vertically divided into 4 equal parts, and the line density is similarly calculated at the 2 lines excluding the center as shown in FIG. 90B. As another method of calculating the line density, it is possible to divide the externally touched rectangle into n equal parts and to obtain as the line density a maximum value of the line densities counted from the n-th line up to the (n−m)-th line.

If the line density is calculated in the horizontal direction with respect to the stroke which is elongated in the horizontal direction as shown in FIG. 91, an erroneous line density will be calculated. Hence, the method of calculating the line density is desirably changed depending on the change of the externally touched rectangle.

As a result, it is possible to accurately calculate the line density without being affected by the unevenness of the pattern.

Returning now to the description of FIG. 89, a step S124 decides whether or not the line density in the vertical direction is 2 or less and the line density in the horizontal direction is 1 or less. If the decision result in the step S124 is NO, a step S125 rejects the pattern as not being the small separated stroke. On the other hand, if the decision result in the step S124 is YES, a step S126 decides whether or not the vertical/horizontal ratio of the small separated stroke is 1 or less. If the decision result in the step S126 is YES, a step S127 calculates the inclination of the small separated stroke in the direction X. However, if the decision result in the step S126 is NO, a step S128 calculates the inclination of the small separated stroke in the direction Y.

The inclination may be calculated as shown in FIGS. 92A through 92C. In other words, the externally touched rectangle is divided into 4 equal parts as shown in FIGS. 92A through 92C, and the inclination is calculated between 2 intersections of the first and third lines and the stroke. Actually, the intersection is not a point and has a certain width, and a middle point of the intersection is selected.

Similarly as in the case of the method of calculating the line density, the method of calculating the inclination is also distinguished depending on whether the externally touched rectangle is elongated in the horizontal direction or the vertical direction. This is because the possibility of an error exists if the inclination is calculated in the horizontal direction with respect to the rectangle which is elongated in the horizontal direction.

Therefore, it is possible to appropriately calculate the inclination by changing the method of calculating the inclination depending on whether the externally touched rectangle is elongated in the horizontal direction or the vertical direction.

Figures 93A, 93B, 93C:
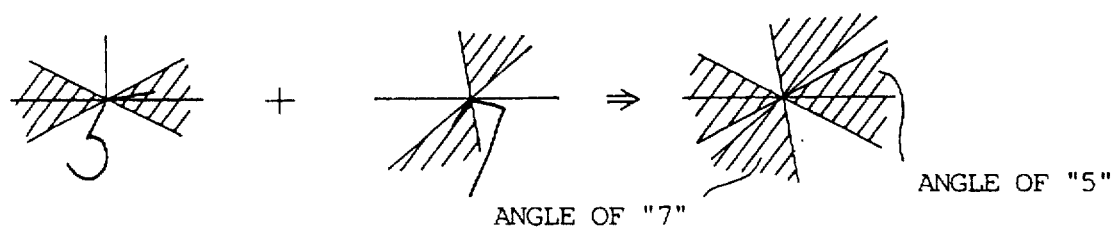
FIGS. 93A, 93B and 93C respectively are diagrams for explaining angles of separated strokes of the numerals "5" and "7"

Next, a step S129 shown in FIG. 89 decides whether the calculated inclination is within the angular range (−40° to 28°) of the separated stroke of the numeral "5" or within the angular range of the separated stroke of the numeral "7". As may be seen from FIGS. 93A and 93B, the angles of the separated stroke of the hand-written numerals "5" and "7" are in a complementary relationship. FIG. 93C shows both the angular ranges of the numerals "5" and "7".

The angular distribution of the small separated stroke of the numeral "5" is wider than the angular distribution of the small separated stroke of the numeral "7". Hence, when identifying the numerals "5" and "7", a step S130 decides whether or not the distance between the separated stroke and the rectangle on the left is less than 1.5 times the distance between the separated stroke and the rectangle on the right, with respect to the separated stroke which is calculated as positively having the angular range or distribution of the numeral "5". If the decision result in the step S130 is YES, a step S131 integrates the separated stroke as the numeral "5". If the decision result in the step S130 is NO, the process advances to the routine for the numeral "7" starting from a step S132.

Figure 94:
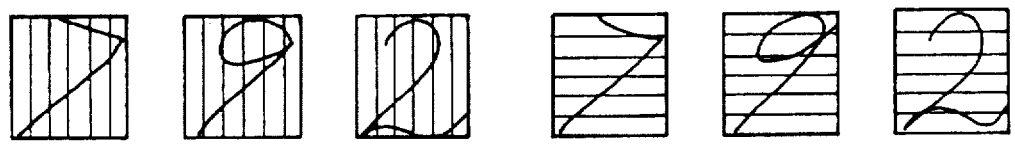
FIG. 94 is a diagram for explaining a method of calculating the line density.

On the other hand, the following process is carried out with respect to the separated stroke which is rejected depending on the character size and the separated stroke which is calculated as having the angular range or distribution of the numeral "7" in the step S129 described above. First, the line density of the stroke on the right of the small separated stroke is calculated, so as to judge whether or not the stroke on the right corresponds to the right portion of the numeral "7". In this case, the line density may be calculated as shown in FIG. 94. That is, in order to distinguish the right portion of the numeral "7" from the portions of the numerals "2" and "9", for example, the line density is checked for both the vertical direction and the horizontal direction as shown in FIG. 94.

A step S132 decides whether or not the line density of the stroke on the right is 2 or less in the vertical direction and is 1 or less in the horizontal direction. If the decision result in the step S132 is NO, a step S133 decides whether or not the distance between the separated stroke and the stroke on the left is smaller than 1.8 times the average horizontal size and the inclination of the separated stroke is −80° to 51.6°. If the decision result in the step S133 is YES, the step S131 integrates the separated stroke as the numeral "5". A step S34 rejects the separated stroke if the decision result in the step S133 is NO.

On the other hand, if the decision result in the step S132 is YES and the line density is 2 in the vertical direction and 1 in the horizontal direction as a result of the calculation made in a step S135, there is a possibility that the separated stroke is a portion of the numeral "7", and the character size is checked for the case where the small separates stroke is integrated. In other words, if the decision result in the step S135 is NO, a step S136 integrates the separated stroke as the numeral "7" when the checked character size is less than or equal to a threshold value multiple of the average character size. On the other hand, when the line density is calculated by this method, when the step S135 detects that the calculated line density is 1 in the vertical direction and 1 in the horizontal direction, the line density is calculated again according to the following method in order to confirm whether or not the separated stroke corresponds to the right portion of the numeral "7".

More particularly, if the decision result in the step S135 is YES, with respect to the separated stroke having the line density 1 in the horizontal direction and the line density 1 in the vertical direction as shown in FIG. 95 (a) and (b), a step S137 looks at the line density from the center along the horizontal width of the externally touched rectangle towards the vertical direction as shown in FIG. 95 (c), and looks at the line density in the horizontal direction when the line density in the vertical direction is counted as shown in FIG. 95 (c), so as to decides whether or not the orthogonal line density is 2. If the orthogonal line density is 2 and the decision result in the step S137 is YES, the step S136 integrates the separated stroke as the numeral "7". With respect to the separated stroke having the line density 1 in the vertical direction and the line density 1 in the horizontal direction as shown in FIG. 95 (d), the plural direction line density becomes 1.

Therefore, by looking at the line density in the orthogonal direction, it becomes possible to identify the pattern which conventionally could not be identified by the search in only one direction. In addition, with respect to a Japanese Katakana character "ku" shown in FIG. 95 (f) and the alphabet "L" shown in FIG. 95 (g), the orthogonal line density becomes 2. In the case of the numeral "4" shown in FIG. 95 (h), the plural direction need not be the orthogonal direction.

Furthermore, when the separated stroke is rejected from the character size or the orthogonal line density is other than 2 in the step S136, there is a possibility that the separated stroke is the small separated stroke of the numeral "5". Hence, in this case where the decision result in the step S137 is NO, the process returns to the routine for the numeral "5", and the character size is checked for the case where the separated stroke is integrated as the numeral "5". In other words, the process returns to the step S130 if the decision result in the step S137 is NO. Then, the character is integrated if the separated stroke satisfies the conditions, and is rejected if the conditions are not satisfied.

Accordingly, the average size and pitch of the character is strictly calculated with respect to the character string which includes irregular pitch and deviation of the character size, and the integrating conditions are adaptively changed at the time of the integration depending on the average values and the dispersion values of the size and pitch, thereby making it possible to extract the character with a high accuracy. Particularly with respect to the hand-written character string, it is possible to carry out the process accurately at a high speed because the simple recognition process part 18 which focuses on the small separated stroke is used without employing the pattern matching technique. In other words, the process is not carried out uniformly with respect to all of the patterns in the character string, but the process focuses on the small separated stroke, so that the process of extracting the character as a whole can be carried out at a high speed.

In addition, the histogram of the widths of all of the externally touched rectangles within the character string is calculated so as to first provisionally calculate the average character size, and the character size is accurately calculated based on this provisionally calculated average character size. For this reason, even if there is considerable deviation in the character size within the character string or the character string includes overhang, it is possible to accurately calculate the average character size. As a result, it is possible to precisely integrate the character.

Furthermore, by adaptively changing the conditions when integrating the small separated stroke depending on the character size in the character string, the average pitch and the dispersion value of the pitch, it becomes possible to more accurately carry out the integration without being dependent on the deviation in the character size and pitch.

Moreover, when the separated strokes of the numerals, the sonant symbol within the Japanese Katakana character or the like exist, a pitch which is smaller than the actual pitch is calculated by calculating the pitch between the characters including such patterns. By excluding such small separated strokes from consideration beforehand, it becomes possible to calculate a more accurate pitch.

In addition, it is possible to integrate the character mode accurately because the threshold value used when integrating the separated stroke is adaptively changed depending on the regularity of the arrangement of characters in the character string. Further, it is also possible to make accurate integration when there is no regularity in the arrangement of characters within the character string, because the ratio of the distances between the separated stroke and the patterns located on the right and left of this separated stroke is quantified as the certainty and the integration is carried out depending on the value of this certainty.

Next, a description will be given of particular examples of the characters which are extracted in this embodiment, by referring to FIGS. 96A through 99B. FIGS. 96A through 99B respectively correspond to FIGS. 35A through 38B described above.

Figure 96B:
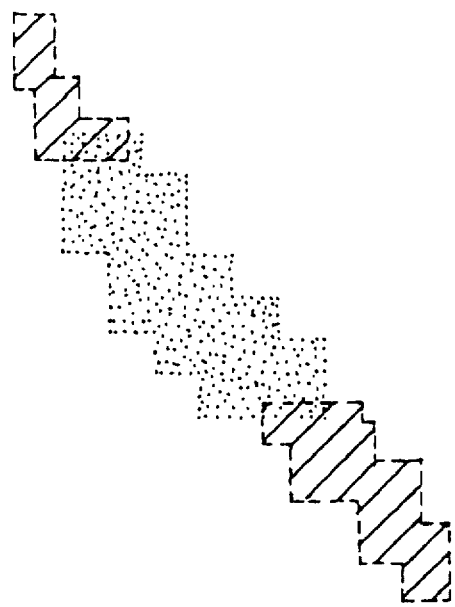
FIGS. 96A and 96B respectively are diagrams for explaining results obtained when the second embodiment is applied to the case shown in FIGS. 35A and 35B.
Figure 96A:
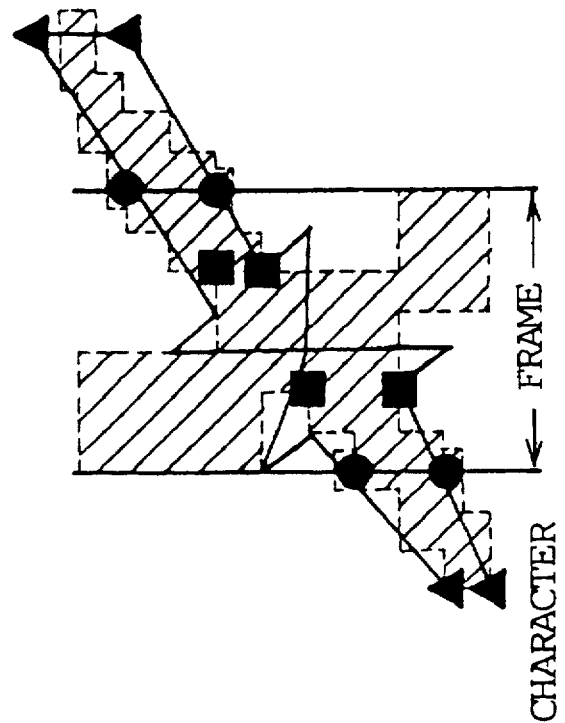

In FIGS. 96A and 96B, the hatching indicates the black pixel, the dotted region indicates the interpolated or extracted black pixel, the "black circular mark" indicates the intersection of the frame and the character, the "black triangular mark" indicates the intersection distant from the frame, and the "black rectangular mark" indicates the intersection inside the frame. In this case, the numeral "1" is separated to the right and left, and the intersections cannot be associated according to the method described above in conjunction with FIGS. 35A and 35B. But according to this embodiment, the intersections are correctly associated with respect to the original image shown in FIG. 96A, and it is possible to finally extract the numeral "1" as shown in FIG. 96B.

In FIGS. 97A and 97B, the hatching indicates the black pixel, the "black circular mark" indicates the intersection of the frame and the character, and the "white circular mark" indicates the intersection which is judges as not being an intersection of the frame and the character. In this case, the intersections of the numerals "1" and "7" are erroneously associated according to the method described above in conjunction with FIGS. 36A and 36B. However, according to this embodiment, the intersections are correctly associated with respect to the original image shown in FIG. 97A, and it is possible to finally extract the numerals "1" and "7" as shown in FIG. 97B.

Figures 98A, 98B:
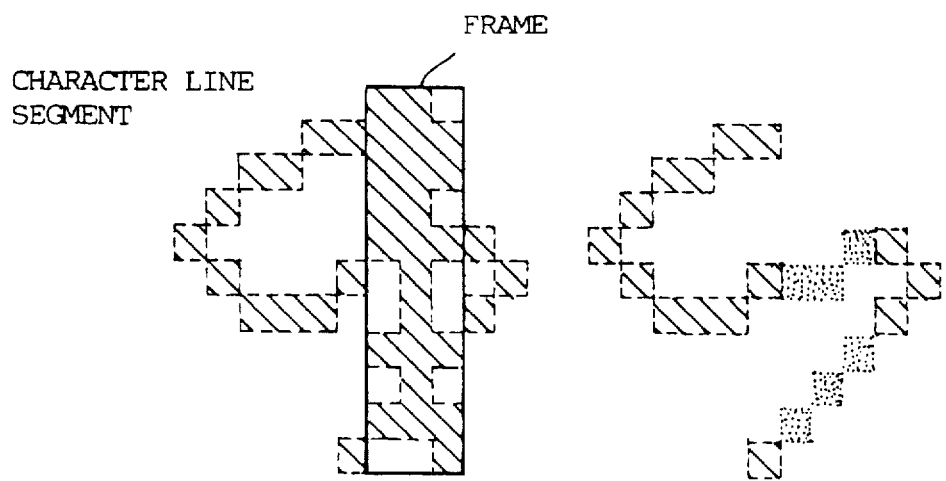
FIGS. 98A and 98B respectively are diagrams for explaining results obtained when the second embodiment is applied to the case shown in FIGS. 37A and 37B.

In FIGS. 98A and 98B, the hatching indicates the black pixel, and the dotted region indicates the interpolated black pixel. In this case, the intersections of the numeral "9" are erroneously associated according to the method described above in conjunction with FIGS. 37A and 37B. But according to this embodiment, the intersections are correctly associated with respect to the original image shown in FIG. 98A, and it is possible to finally extract the numeral "9" as shown in FIG. 98B.

Figures 99A, 99B:
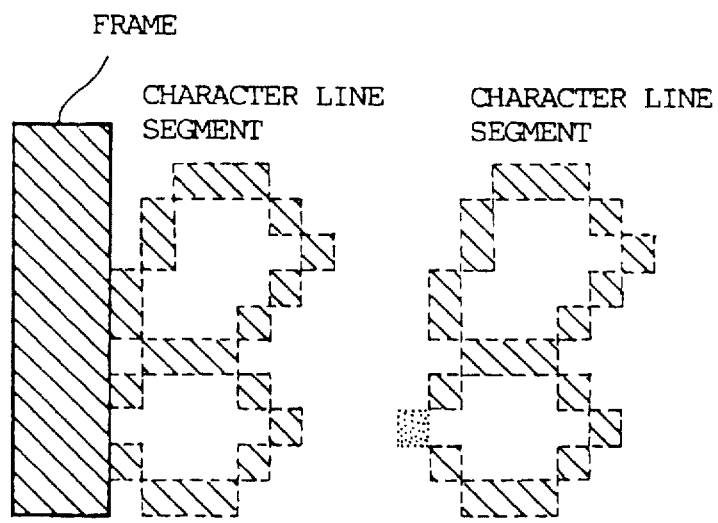
FIGS. 99A and 99B respectively are diagrams for explaining results obtained when the second embodiment is applied to the case shown in FIGS. 38A and 38B.

In FIGS. 99A and 99B, the hatching indicates the black pixel, and the dotted region indicates the interpolated black pixel. In this case, the re-interpolation of the numeral "8" is not made according to the method described above in conjunction with FIGS. 38A and 38B. However, according to this embodiment, the intersections are correctly re-associated with respect to the original image shown in FIG. 99A, and it is possible to finally extract the numeral "8" as shown in FIG. 99B.

Therefore, this embodiment described heretofore is characterized by the following advantageous features 1) through 23).

1) According to this embodiment, the character line segment inside the frame is extracted before eliminating the frame which excludes this character line segment. Hence, it is possible to extract the character having a high quality by calculating the line width of the character frame and evaluating the connection and continuity such as the direction of the character line segment, and the recognition rate of the contact character is improved.

2) The character line segment inside the frame, rule and the like is searched, and in order to more accurately grasp the contact portion of the character and the frame, rule or the like, the contacting character portion is restored even when the frame, rule or the like is inclined, when a large amount of noise is included in the frame, rule or the like, and when the width of the frame, rule or the like is wide compared to the character width. Hence, it is possible to extract the correct character pattern.

3) The character pattern will not be restored erroneously by providing the means for searching the character line segment inside the frame and for grasping that a portion is not a contact portion of the frame and the character.

4) It is possible to distinguish the noise included in the character line segment by providing the means for obtaining the area of the character line segment that is searched from the intersection side towards the center of the frame, rule or the like.

5) By searching the character line segment from the side of the intersection of the character line segment and the frame, rule or the like towards the direction opposite to the direction towards the center of the frame, rule or the like, it becomes possible to more accurately associate the intersections and an unwanted character pattern will not be restored.

6) It is possible to distinguish the noise included in the character line segment by providing the means for obtaining the area of the character line segment that is searched from the intersection side towards the direction opposite to the direction towards the center of the frame, rule or the like.

7) It is possible to eliminate the noise by comparing with an area threshold value a sum of the areas of the character line segments which are searched from the side of the intersection of the character line segment and the frame, rule or the like towards the direction opposite to the direction towards the center of the frame, rule or the like.

8) It is possible to eliminate the noise by comparing with an area threshold value a sum of the areas of the character line segments which are searched from the side of the intersection of the character line segment and the frame, rule or the like towards the direction towards the center of the frame, rule or the like and in the direction opposite to the direction towards the center of the frame, rule or the like.

9) By providing the means for determining the intersection distant from the frame, rule or the like to a value immediately before it ceases with respect to the case where a sum of the areas of the character line segments of the intersections of the frame, rule or the like is greater than or equal to a certain threshold value, the intersection with the character line segment that is not noise is calculated and it is therefore possible to restore an accurate pattern.

10) The direction of the character line segment can be found from the intersection of the character line segment and the frame, rule or the like and the intersection distant from the frame, rule or the like.

11) The direction of the character line segment can be found from 2 intersections, namely, the intersection inside the frame, rule or the like and the intersection distant from the frame, rule or the like.

12) The direction of the character line segment can be found from 3 intersections, namely, the intersection inside the frame, rule or the like, the intersection of the character line segment and the frame, rule or the like, and the intersection distant from the frame, rule or the like.

13) After calculating the intersection of the character line segment and the frame, rule or the like for the character pattern which includes the character line segment and touches the frame, rule or the like, the intersection associating means obtains the candidates of the intersections to be associated. More particularly, when the intersection of the character line segment and the frame, rule or the like exists on one side or both sides of the 2 contours forming the frame, rule or the like, the intersection of the character line segment and the frame, rule or the like existing on the opposite side from the frame, rule or the like and the frame, rule or the like adjacent thereto in the horizontal direction or, all of the frame, rule or the like adjacent to the adjacent frame, rule or the like is taken as the candidate of the intersection to be associated. Hence, it is possible to restore the pattern touching the corner and the pattern touching the plurality of 1-character frames within a table.

14) After calculating the intersection of the character line segment and the frame, rule or the like for the character pattern which includes the character line segment and touches the frame, rule or the like, the intersection associating means obtains the candidates of the intersections to be associated. More particularly, when the intersection of the character line segment and the frame, rule or the like exists on one side or both sides of the 2 contours forming the frame, rule or the like, the intersection of the character line segment and the frame, rule or the like existing at the contour on both sides of all of the frames, rules or the like adjacent to the frame, rule or the like in the vertical direction is taken as the candidate of the intersection to be associated. Hence, it is possible to restore the pattern touching the corner and the pattern touching the plurality of 1-character frames within a table.

15) By providing the intersection associating means that associates the intersections when their directions match, it becomes possible to restore the pattern of the character line segment which is approximately a straight line.

16) When the intersection exists inside the frame, rule or the like, such an intersection is regarded as a candidate and the closeness of the distance between the candidates is checked from the distance between the candidates and the line width of the frame, rule or the like. If the candidates are associated, it is possible to restore a more accurate pattern by associating the intersections of the character line segment and the frame, rule or the like.

17) When the intersection exists inside the frame, rule or the like, such an intersection is regarded as a candidate and the closeness of the intersections is checked from the distance between the candidates and the distance between the candidates in the direction perpendicular to the frame, rule or the like. If the candidates are associated, it is possible to restore a more accurate pattern by associating the intersections of the character line segment and the frame, rule or the like.

18) With respect to the pattern for which the continuity cannot be confirmed, the character size and pitch information calculated after extraction of the character string may be used to specify the range in which the re-continuance is to be made for each pattern. Hence, it is possible to restore the candidate of the pattern by making an accurate re-interpolation.

19) The integration of the patterns is determined based on the character size and pitch information calculated after extraction of the character string. Thus, it is possible to restore an accurate pattern, and prevent restoration of an unwanted pattern.

20) When the number of holes before or after the extraction changes with respect to the pattern for which the continuity is confirmed, the re-interpolation is made by associating, and it is possible to restore the pattern of the candidate.

21) When the Euler number before or after the extraction changes with respect to the pattern for which the continuity is confirmed, the re-interpolation is made by associating, and it is possible to restore the pattern of the candidate.

22) When the number of holes or the Euler number before or after the extraction changes with respect to the pattern for which the continuity is confirmed, the re-interpolation is made by associating, and it is possible to restore the pattern of the candidate.

23) The means for obtaining the width and unevenness of the width of the frame, rule or the like, the inclination angle, the line width of the written character and the graphic pattern, and the extent of contact with the frame, rule or the like, the means for calculating the frequency of the contact character based on such information, the means for associating and interpolating after elimination of the frame, rule or the like based on the above information or, the means for eliminating the frame after extracting the associated character line segment after extracting the frame, rule or the like is selected. Hence, the pattern can be accurately restored at a high speed with respect to the pattern having a small contact frequency and more carefully with respect to the pattern having a large contact frequency.

Further, the present invention is not limited to these embodiments, but various variations and modifications may be made without departing from the scope of the present invention.

What is claimed is:

1. An image extraction system comprising:

connected pattern extracting means for extracting partial patterns respectively having connected pixels from an image which is formed by one of a block frame having a table format including 1-character frames and a free format frame, and one of characters, graphics and symbols, said one of characters, graphics and symbols touching the one of the block frame and the free format frame, with the one of the block frame and the free format frame being part of the image;

1-character frame extracting means for extracting 1-character frames from said image based on the partial patterns extracted by said connected pattern extracting means;

straight line extracting means for extracting straight lines from the partial patterns which are extracted by said connected pattern extracting means and is eliminated from the 1-character frames by said 1-character frame extracting means;

frame detecting means for detecting straight lines forming the frame from the straight lines extracted by said straight line extracting means;

frame separating means for accurately separating the straight lines detected by said frame detecting means from the partial patterns so as to extract the characters, graphics or symbols, and to thereby separate the frame from the characters, graphics or symbols touching said frame; and distinguishing means for distinguishing characters, graphics, or symbols that touch the frame, wherein said straight line extracting means further comprises:

means for scanning an entire image of the partial patterns eliminated from the 1-character frames within two kinds of masks which are respectively elongated in horizontal and vertical directions, for each of the partial patterns extracted by said connected pattern extracting means and eliminated from the 1-character frames by said 1-character frame extracting means;

means for calculating a rate of an area occupied by the pattern within the mask; and means for extracting vertical and horizontal components by judging that inside of the mask in its entirety is a pattern when the calculated rate is greater than a predetermined value and deleting the pattern within the mask when the calculated ratio is less than or equal to the predetermined value.

2. The image extraction system as claimed in claim 1, wherein said straight line extracting means comprises:

means for forming a rectangular range by collecting a plurality of rows or columns if the plurality of rows or columns continue and the calculated rate is greater than the predetermined value, and for regarding a center line of the rectangular range as a processed result.

3. The image extraction system as claimed in claim 1, wherein said straight line extracting means comprises:

means for overlapping ranges in which a process using the mask is carried out.

4. An image extraction system comprising:

connected pattern extracting means for extracting partial patterns respectively having connected pixels from an image which is formed by one of a block frame having a table format including 1-character frames and a free format frame, and one of characters, graphics and symbols, said one of characters, graphics and symbols are touching one of the block frame and the free format frame, with the one of the block frame and the free format frame being part of the image;

1-character frame extracting means for extracting 1-character frames from said image based on the partial patterns extracted by said connected pattern extracting means;

straight line extracting means for extracting straight lines from the partial patterns which are extracted by said connected pattern extracting means and is eliminated from the 1-character frames by said 1-character frame extracting means;

frame detecting means for detecting straight lines forming the frame from the straight lines extracted by said straight line extracting means; and frame separating means for accurately separating the straight lines detected by said frame detecting means from the partial patterns so as to extract the characters, graphics or symbols, and to thereby accurately separate the frame from the characters, graphics or symbols; and distinguishing means for distinguishing characters, graphics or symbols that touch the frame, wherein said frame detecting means further comprises:

means for detecting as a horizontal frame portion a candidate of a straight line which forms a horizontal frame portion detected by said straight line detecting means and has a length greater than or equal to a predetermined value; and means for detecting, based on the detected horizontal frame portion, a block frame of one horizontal line or a free format frame when two adjacent horizontal frame portions exist and a block frame having a table format when three or more horizontal frame portions exist.

5. The image extraction system as claimed in claim 4, wherein said frame detecting means comprises:

means for checking whether a candidate of a straight line forming a vertical frame portion reaches the horizontal frame portions that are detected above and below or breaks at an intermediate part by making a search based on the candidate of the straight line forming the vertical frame portion and the horizontal frame portion which are detected by said straight line detecting means.

6. The image extraction system as claimed in claim 4, wherein said frame detecting means comprises:

means for excluding from a candidate of a vertical line which forms a vertical frame portion a vertical line forming an interval greatly different from others out of vertical lines within a range defined by the two adjacent horizontal frame portions that are detected when a regular block frame having the table format is to be processed, so as to detect the vertical line that is not excluded from the candidate of the vertical frame portion as the vertical frame portion.

7. The image extraction system as claimed in claim 4, wherein said frame detecting means comprises:

means for dividing a straight line having a length greater than a predetermined length into units of a specific length when extracting the frame.

8. The image extraction system as claimed in claim 7, wherein said frame detecting means comprises:

means for varying a number and position of frames to be eliminated depending on a position of each divided unit within the free format frame.

9. The image extraction system as claimed in claim 4, wherein said frame detecting means comprises:

means for separating each portion surrounded on four sides by a frame line one by one starting from left, and for treating each separated portion as a 1-character frame when a ratio of lengths of a horizontal line and a vertical line is less than or equal to a predetermined value.

10. An image extraction system comprising:

connected pattern extracting means for extracting partial patterns respectively having connected pixels from an image which is formed by one of a block frame having a table format including 1-character frames and a free format frame, and one of characters, graphics and symbols, said one of characters, graphics and symbols are touching one of the block frame and the free format frame, with the one of the block frame and the free format frame being part of the image;

1-character frame extracting means for extracting 1-character frames from said image based on the partial patterns extracted by said connected pattern extracting means;

straight line extracting means for extracting straight lines from the partial patterns which are extracted by said connected pattern extracting means and is eliminated from the 1-character frames by said 1-character frame extracting means;

frame detecting means for detecting straight lines forming the frame from the straight lines extracted by said straight line extracting means;

frame separating means for accurately separating the straight lines detected by said frame detecting means from the partial patterns so as to extract the characters, graphics or symbols, and to thereby accurately separate the frame from the characters, graphics or symbols;

frame extraction and elimination means for carrying out a frame extraction and elimination process with respect to a partial pattern for which the detection of the horizontal frame portion failed in said straight line extracting means; and distinguishing means for distinguishing characters, graphics or symbols that touch the frame.

11. The image extraction system as claimed in claim 10, wherein said frame extraction and elimination means comprises:

means for integrating line segments including a line segment that breaks at an intermediate part, with respect to the partial pattern for which the detection of the horizontal frame portion failed in said straight line extracting means;

means for detecting the integrated horizontal line as a horizontal frame portion when the integrated horizontal line has a length greater than or equal to a predetermined value compared to a size of the partial pattern, and for detecting out of vertical lines between two adjacent horizontal lines a vertical line which reaches the horizontal lines above and below as a candidate of a vertical frame portion; and means for extracting ranges of 1-character frames by matching rectangular ranges formed by the frames and the candidates of the frame that are obtained with the 1-character frames within the same image as the rectangular ranges and extracted by said 1-character frame extracting means, so as to carry out a process of extracting and eliminating the frame with respect to each range of the 1-character frame similarly the process carried out with respect to each 1-character frame.

12. An image extraction system comprising:

connected pattern extracting means for extracting partial patterns respectively having connected pixels from an image which is formed by one of a block frame having a table format including 1-character frames and a free format frame, and one of characters, graphics and symbols, said one of characters, graphics and symbols are touching one of the block frame and the free format frame, with the one of the block frame and the free format frame being part of the image;

1-character frame extracting means for extracting 1-character frames from said image based on the partial patterns extracted by said connected pattern extracting means;

straight line extracting means for extracting straight lines from the partial patterns which are extracted by said connected pattern extracting means and is eliminated from the 1-character frames by said 1-character frame extracting means;

frame detecting means for detecting straight lines forming the frame from the straight lines extracted by said straight line extracting means;

frame separating means for accurately separating the straight lines detected by said frame detecting means from the partial patterns so as to extract the characters, graphics or symbols, and to thereby accurately separate the frame from the characters, graphics or symbols; and distinguishing means for distinguishing characters, graphics, or symbols that touch the frame, wherein said straight line extracting means further comprises means for starting a search of a line segment for detecting the straight lines from the partial patterns from a starting point located at a narrowest portion within a rectangular line segment that is detected as the frame.

13. An image extraction system for extracting a frame from an image which is formed by a rectangular frame having one of separated rectangles, characters, graphics and symbols, said one of characters, graphics and symbols are touching the rectangular frame, with the rectangular frame being part of the image, said image extraction system comprising:

connected pattern extracting means for extracting partial patterns respectively having connected pixels from patterns forming the image;

frame extracting means for extracting the frame based on each partial pattern extracted by said connected pattern extracting means;

intersection calculating means for calculating intersections of a character and a frame based on the partial pattern extracted by said connected pattern extracting means and the frame extracted by said frame extracting means;

intersection associating means for associating the intersections based on a distance between character line segments containing the frame in-between and a continuity of an inclination of the character line segments, by adaptively changing a judging reference of said distance and said continuity of the inclination depending on a line width of the frame;

frame interior character extracting means for extracting character line segments inside the frame based on the intersections associated by said intersection associating means to thereby accurately separate the frame from the character line segments; and distinguishing means for distinguishing characters that touch the frame from the frame.

14. The image extraction system as claimed in claim 13, wherein said intersection calculating means comprises:

means for searching the character line segment from a side of the intersection towards a center of the frame for all of the calculated intersections of the frame and the character; and means for judging whether or not an intersection inside the frame obtained as a result of the search is an extension of the character line segment.

15. The image extraction system as claimed in claim 14, wherein said intersection calculating means comprises:

means for judging that an arbitrary intersection inside the frame is not an intersection of the frame and the character line segment if said arbitrary intersection ceases to exist during the search for the character line segment from the side of the intersection of the frame and the character line segment towards the center of the frame.

16. The image extraction system as claimed in claim 14, wherein said intersection calculating means comprises:

means for obtaining an area of the character line segment which is searched from the side of the intersection of the frame and the character line segment towards the center of the frame during the search for the character line segment.

17. The image extraction system as claimed in claim 13, wherein said intersection calculating means comprises:

means for obtaining an area of the character line segment which is searched from the side of the intersection of the frame and the character line segment towards a direction opposite to a direction towards the center of the frame during the search for the character line segment.

18. The image extraction system as claimed in claim 17, wherein said intersection calculating means comprises:

means for judging that searched character line segments are noise if a sum of areas of the character line segments searched in a direction opposite to a direction towards a center of the frame is less than a predetermined threshold value when an arbitrary intersection outside the frame ceases to exist during the search for the character line segment from the side of the intersection of the frame and the character line segment in the direction opposite to the direction towards the center of the frame.

19. The image extraction system as claimed in claim 13, which further comprises:

contact frequency calculating means for calculating a contact frequency of the character and the frame from widths of the frame and the character and an extent of contact between the character and the frame, and for distinguishing a case where the contact frequency is small and a case where the contact frequency is large, a character width being greater than a frame width and the contact between the character and the frame being relatively small when the contact frequency is small, the character width and the frame width being approximately the same or the contact between the character and the frame being large when the contact frequency is large.

20. The image extraction system as claimed in claim 19, wherein said intersection associating means comprises:

means for associating the intersections of the character and the frame based on a direction and a condition of continuity of the line segment based on direction and distance between the character line segments at the intersection inside the frame, by obtaining the direction of the character line segment from three kinds of intersections when the contact frequency calculated by said contact frequency calculating means is large, said three kinds of intersections including an intersection outside the frame, an intersection of the character and the frame, and an intersection inside the frame.

21. The image extraction system as claimed in claim 20, wherein said intersection associating means associates the intersections having approximately the same direction.

22. The image extraction system as claimed in claim 20, which further comprises:

frame interior character extracting means for extracting as a character component a range surrounded by the frame and the intersections which are associated by said means of said intersection associating means that associate the intersections of the character and the frame based on the three kinds of intersections.

23. The image extraction system as claimed in claim 19, wherein said intersection associating means comprises:

means for associating the intersections of the character and the frame based on a direction by obtaining the direction of the character line segment from two kinds of intersections when the contact frequency calculated by said contact frequency calculating means is small, said two kinds of intersections including an intersection outside the frame and an intersection of the character and the frame.

24. The image extraction system as claimed in claim 23, wherein said intersection associating means associates the intersections having approximately the same direction.

25. The image extraction system as claimed in claim 23, which further comprises:

frame interior character interpolator means for interpolating a character region inside the frame by connecting the intersections which are associated by said means of said intersection associating means that associates the intersections of the character and the frame based on the two kinds of intersections.

26. The image extraction system as claimed in claim 23, which further comprises:

character string extracting means for extracting a character string after associating the intersections by said intersection associating means;

integrating means for integrating the character based on information at least related to an average character pitch and an average character size; and continuity confirming means for confirming continuity of the character component based on a positional deviation of a position of the frame and a position of the character line segment which are extracted and for calculating a range of the frame to be re-interpolated.

27. The image extraction system as claimed in claim 26, wherein said intersection associating means re-associates the intersections so as to restore the continuity when the continuity of the character component cannot be confirmed by said continuity confirming means.

28. The image extraction system as claimed in claim 23, which further comprises:

integrating means for integrating the character based on information related to at least an average character pitch and an average character size; and re-interpolation judging means for making the integration depending on existence of a re-interpolated character pattern.

29. An image extraction system, comprising:

connected pattern extracting means for extracting one of a printable matter and a frame from an image, wherein the printable matter is in connection with the frame, and the frame forms part of the image, thus accurately separating the frame and the image, and distinguishing means for distinguishing the printable matter that touches the frame from the frame.

30. An image extraction system, comprising:

connected pattern extracting means for extracting a plurality of partial patterns each having a plurality of connected pixels from an image, which image is formed by one of a block frame having a table format including a plurality of one-character frames and a free format frame, and one of a plurality of characters, a plurality of graphics, and a plurality of symbols, wherein one of the plurality of characters, the plurality of graphics, and the plurality of symbols are touching one of the block frame and the free format frame;

one-character frame extracting means for extracting the plurality of one-character frames from the image based on the extracted plurality of partial patterns, becoming a plurality of frame patterns;

straight line extracting means for extracting a plurality of straight lines from the plurality of frame patterns;

frame detecting means for detecting a plurality of straight lines forming a frame from the extracted plurality of straight lines;

frame separating means for accurately separating the detected plurality of straight lines from the plurality of partial patterns so as to extract one of the plurality of characters, the plurality of graphics and the plurality of symbols, and to accurately separate the frame from the characters, graphics, or symbols; and distinguishing means for distinguishing characters, graphics or symbols that touch the frame from the frame, wherein the straight line extracting means further comprises:

scanning means for scanning an entire image of each of the plurality of frame patterns within at least two types of masks each respectively are elongated in horizontal and vertical directions;

calculating means for calculating a rate of an area occupied by each of the plurality of patterns within each of the at least two types of masks; and extracting means for extracting vertical and horizontal components by deciding that inside one of the at least two types of masks is one of the plurality of patterns when the calculated rate is greater than a predetermined value and deleting the pattern from the one of the at least two types of masks when the calculated rate is one of less than and equal to the predetermined value.

31. An image extraction system, comprising:

connected pattern extracting means for extracting partial patterns each having connected pixels from an image, which image is formed by one of a block frame having a table format including one-character frames and a free format frame, and one of characters, graphics, and symbols, where the one of characters, graphics, and symbols are in contact with the one of the block frame and the free format frame;

one-character frame extracting means for extracting the one-character frames from the image based on the extracted partial patterns, becoming frame patterns;

straight line extracting means for extracting straight lines from the frame patterns;

frame detecting means for detecting straight lines forming a frame from the extracted straight lines; and frame separating means for accurately separating the detected straight lines from the partial patterns to extract one of the characters, the graphics and the symbols, and to thereby separate the frame from the characters, graphics, or symbols touching said frame; and distinguishing means for distinguishing characters, graphics, or symbols that touch said frame;

the straight line extracting means comprising:

scanning means for scanning an entire image of each of the frame patterns within at least two types of masks each respectively elongated in horizontal and vertical directions;

calculating means for calculating a rate of an area occupied by each of the patterns within each of the at least two types of masks:

extracting means for extracting vertical and horizontal components by deciding that inside one of the at least two types of masks is one of the patterns when the calculated rate is greater than a predetermined value and deleting the one of the patterns from the one of the at least two types of masks when the calculated rate is one of less than and equal to the predetermined value.

* * * * *